United States Patent [19]

Suman et al.

[11] Patent Number: 6,028,537
[45] Date of Patent: Feb. 22, 2000

[54] VEHICLE COMMUNICATION AND REMOTE CONTROL SYSTEM

[75] Inventors: Michael J. Suman; Thomas L. Welling; Mark L. Zeinstra; Ruskin T. Lhamon, all of Holland; Matthew T. Nichelson, Zeeland, all of Mich.

[73] Assignee: Prince Corporation, Holland, Mich.

[21] Appl. No.: 08/874,210

[22] Filed: Jun. 13, 1997

Related U.S. Application Data

[60] Provisional application No. 60/019,773, Jun. 14, 1996.

[51] Int. Cl.[7] .................................................. G08G 1/123
[52] U.S. Cl. ......................... 340/988; 340/426; 342/457; 455/422
[58] Field of Search .................................... 340/426, 988; 342/457, 357; 701/213; 455/422

[56] References Cited

U.S. PATENT DOCUMENTS

| | | |
|---|---|---|
| 4,311,876 | 1/1982 | Endo et al. . |
| 4,466,125 | 8/1984 | Kanayama ............................... 340/990 |
| 4,590,568 | 5/1986 | Barske et al. ............................. 73/114 |
| 4,747,122 | 5/1988 | Bhagat et al. ...................... 340/825.44 |
| 4,849,750 | 7/1989 | Andros et al. ..................... 340/825.48 |
| 4,951,212 | 8/1990 | Kurihara et al. ......................... 340/990 |
| 4,954,958 | 9/1990 | Savage et al. . |
| 5,003,317 | 3/1991 | Gray et al. ............................... 342/457 |
| 5,113,427 | 5/1992 | Ryoichi et al. ..................... 340/825.44 |
| 5,146,215 | 9/1992 | Drori .................................. 340/825.32 |
| 5,153,582 | 10/1992 | Davis .................................... 340/311.1 |
| 5,172,321 | 12/1992 | Ghaem et al. .......................... 340/995 |
| 5,206,641 | 4/1993 | Grant et al. .............................. 340/988 |
| 5,223,844 | 6/1993 | Mansell et al. ......................... 342/457 |
| 5,243,528 | 9/1993 | Lefebvre ................................. 340/990 |
| 5,262,775 | 11/1993 | Tamai et al. ............................ 340/988 |
| 5,283,575 | 2/1994 | Kao et al. ............................... 340/990 |
| 5,291,412 | 3/1994 | Tamai et al. ............................ 340/990 |
| 5,291,413 | 3/1994 | Tamai et al. ............................ 340/990 |
| 5,293,163 | 3/1994 | Kakihara et al. ....................... 340/995 |
| 5,293,484 | 3/1994 | Dabbs, III et al. ................. 340/825.44 |
| 5,334,974 | 8/1994 | Simms et al. ........................... 340/426 |
| 5,335,246 | 8/1994 | Yokev et al. ....................... 340/825.44 |
| 5,418,537 | 5/1995 | Bird ........................................ 342/457 |
| 5,459,666 | 10/1995 | Casper et al. ........................... 340/973 |
| 5,504,482 | 4/1996 | Schreder ................................. 340/988 |
| 5,515,043 | 5/1996 | Berard et al. ........................... 340/426 |
| 5,515,285 | 5/1996 | Garrett, Sr. et al. .................... 340/426 |
| 5,526,265 | 6/1996 | Nakhla ................................... 294/183 |
| 5,543,789 | 8/1996 | Behr et al. .............................. 340/995 |
| 5,544,225 | 8/1996 | Kennedy, III et al. ................. 455/456 |
| 5,568,390 | 10/1996 | Hirota et al. ........................... 340/990 |
| 5,572,204 | 11/1996 | Timm et al. ............................ 340/988 |
| 5,629,693 | 5/1997 | Janky ...................................... 340/426 |
| 5,638,280 | 6/1997 | Nishimura et al. ..................... 340/990 |
| 5,682,133 | 10/1997 | Johnson et al. ......................... 340/426 |
| 5,712,899 | 1/1998 | Pace, II .................................. 340/988 |

*Primary Examiner*—Brent A. Swarthout
*Attorney, Agent, or Firm*—Price, Heneveld, Cooper, DeWitt & Litton

[57] ABSTRACT

The vehicle communication and control system of the present invention includes a transceiver for sending and receiving RF signals, a processor coupled to the transceiver, a location identifying sensor coupled to the processor for supplying vehicle location data, a user interface coupled to the processor for providing information to a user and for enabling a user to input commands to be executed by the processor, and a vehicle accessory interface for coupling the processor to a vehicle accessory control circuit to enable the processor to issue commands to a vehicle accessory. The processor is preferably adapted to perform a wide variety of functions in response to user input commands, received RF signals, and other commands received from other vehicle accessories and components coupled to the system of the present invention through the vehicle system bus. Some of these functions include establishing a two-way communication link, requesting and providing location-specific information, enabling remote tracking of the vehicle, issuing an emergency request or a request for roadside assistance, requesting and receiving navigational information, remote control of vehicle functions, enabling remote diagnostics of the vehicle, and enabling reprogramming of various vehicle accessories and components.

28 Claims, 62 Drawing Sheets

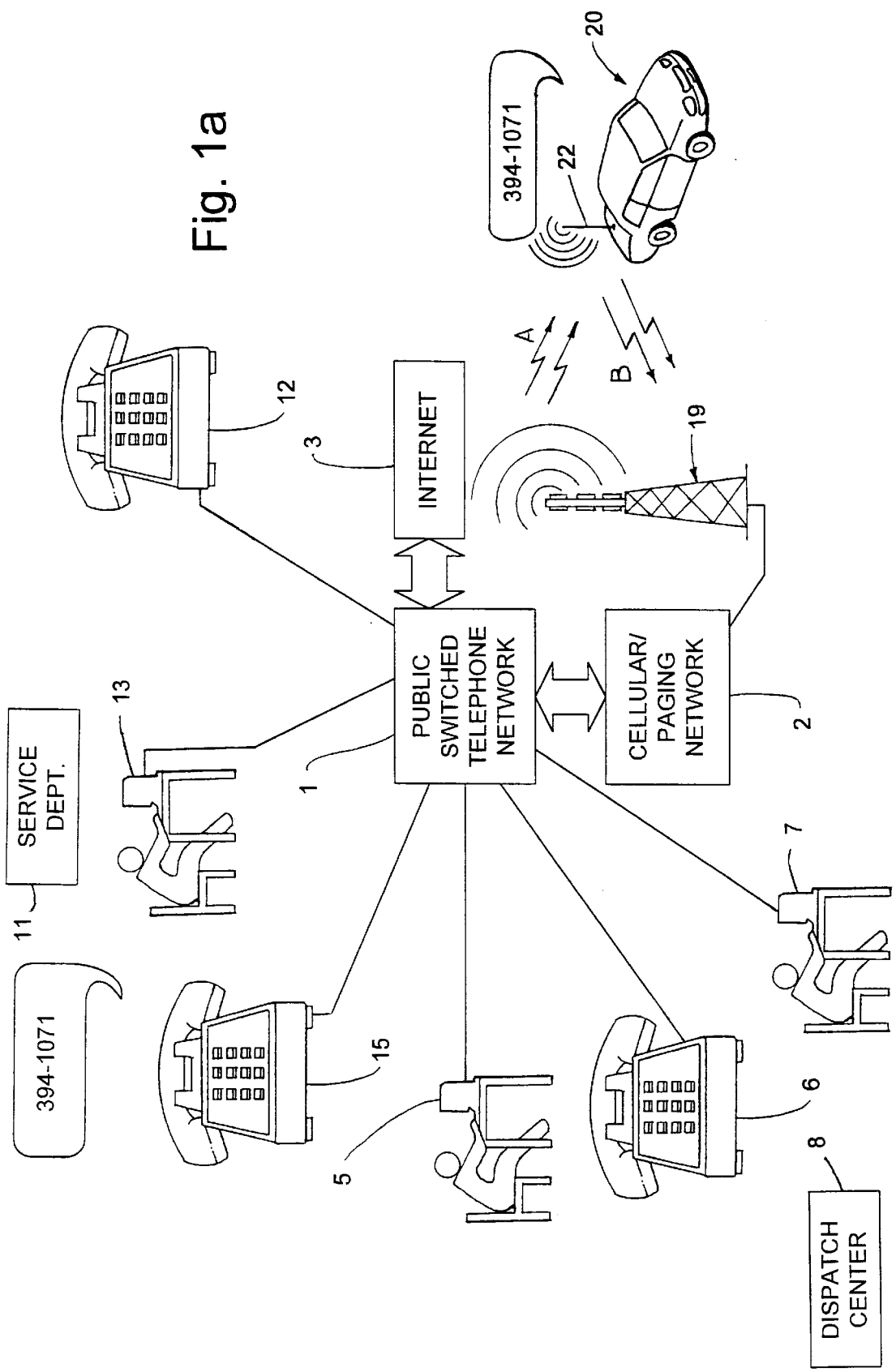

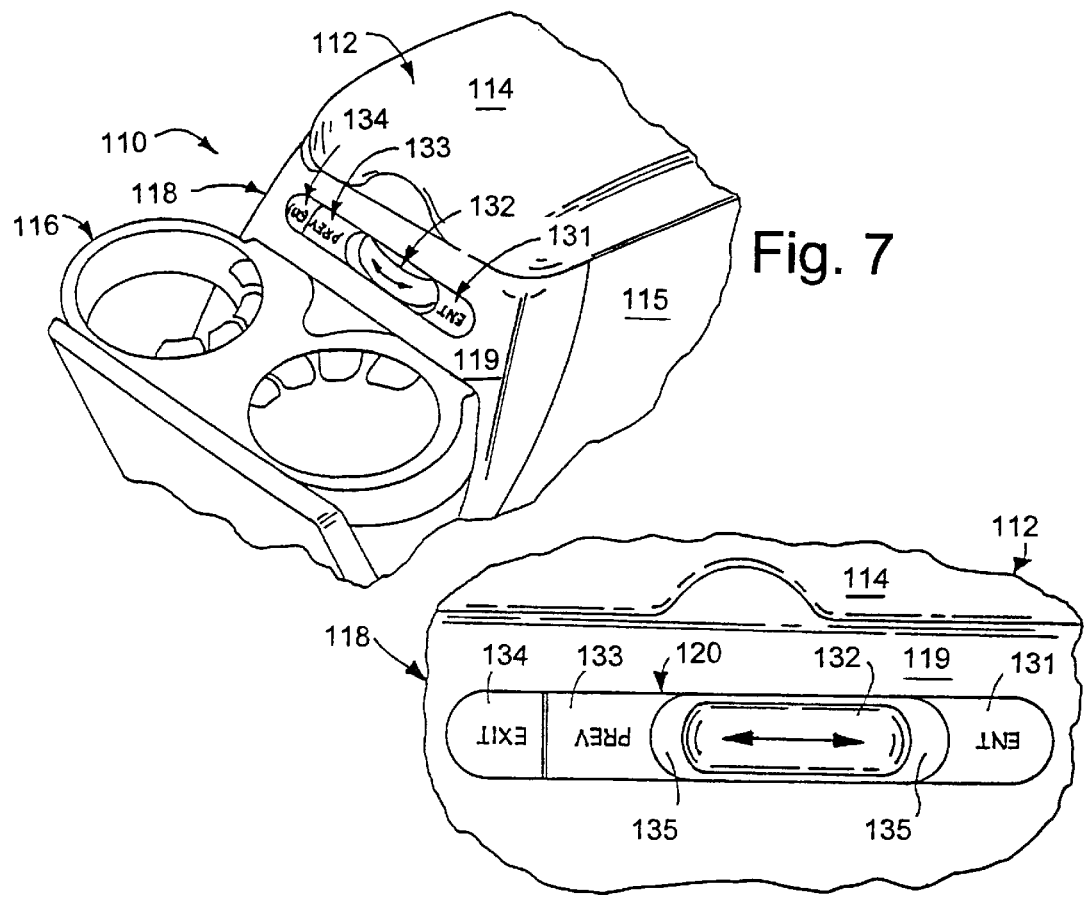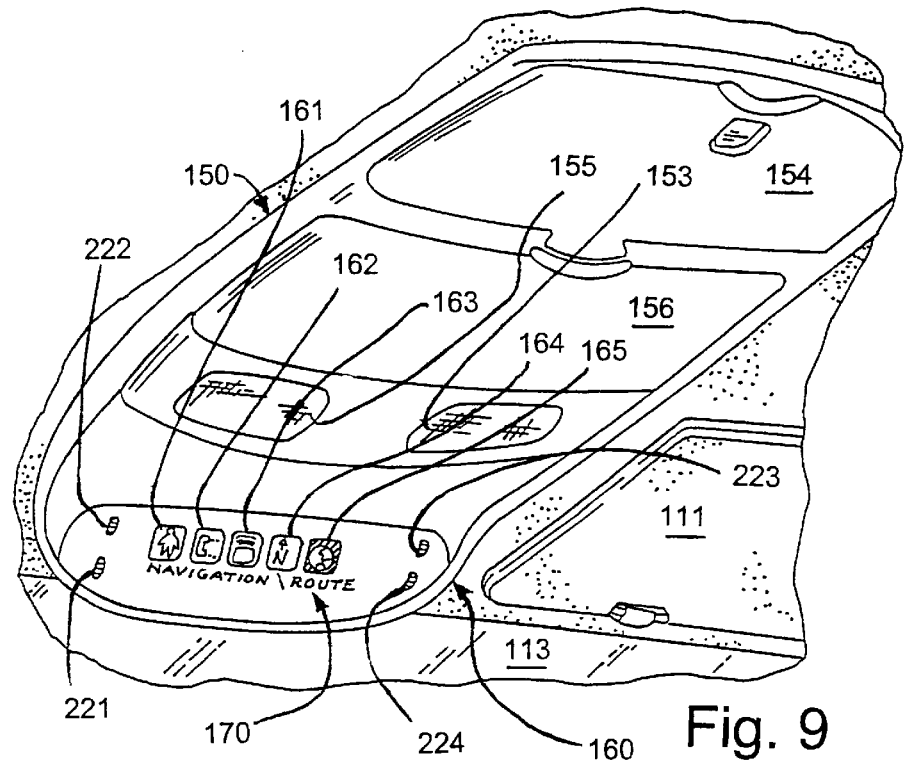

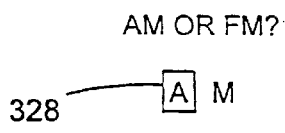
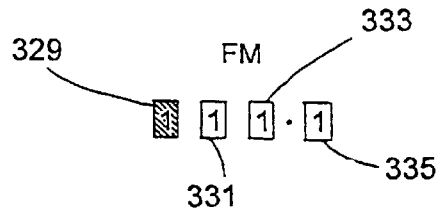
Fig. 13          Fig. 15
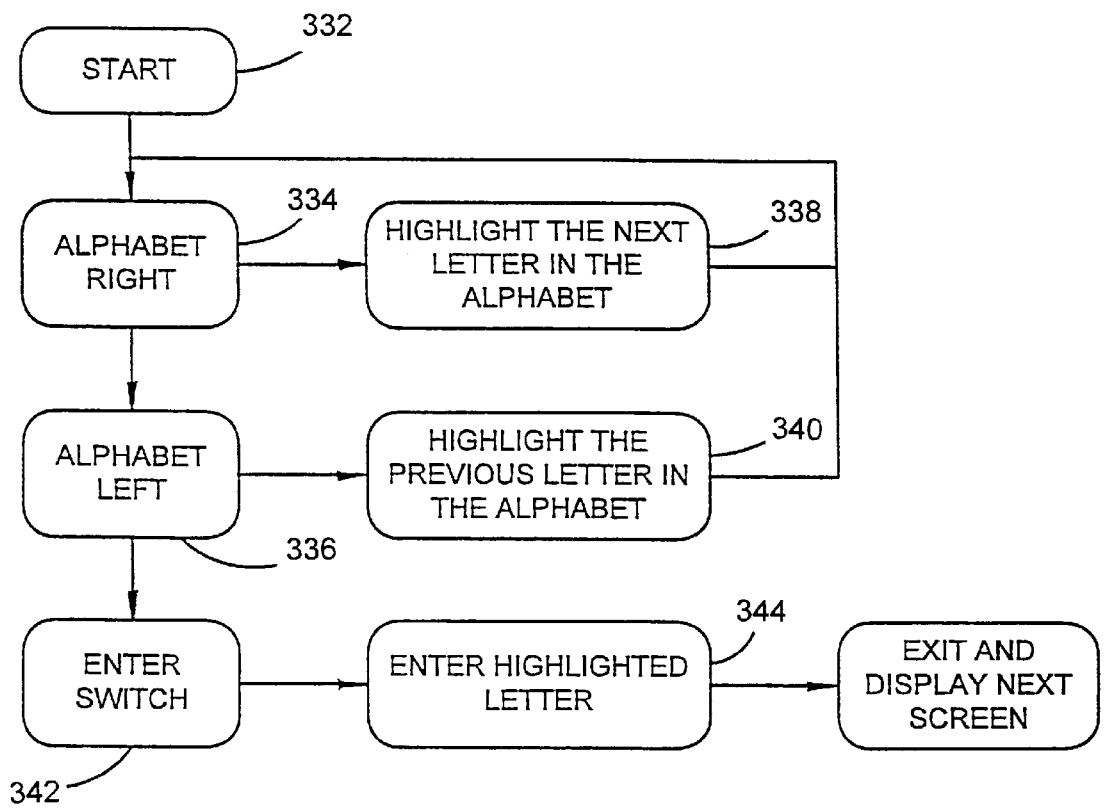
Fig. 14

PHONE LIST

1  JOE SMITH     616-123-4567
2
3

A B C D E F G H I [J] K ⸺ 354
                      J ⸺ 352

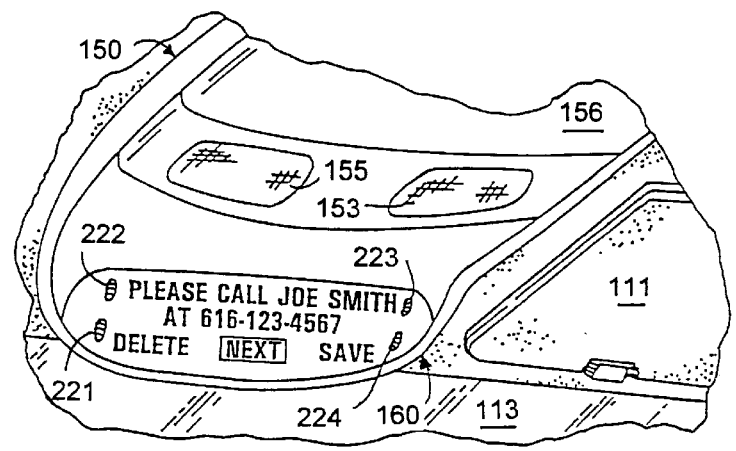
Fig. 22
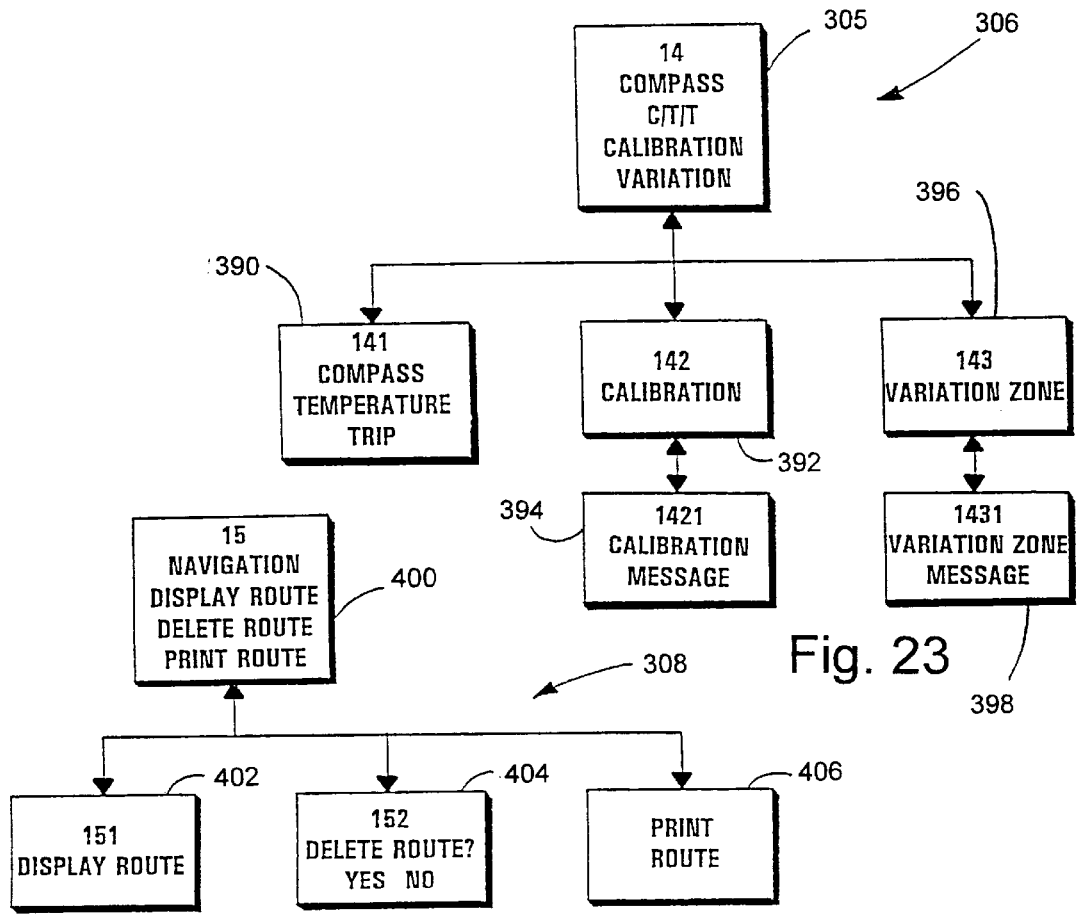
Fig. 23
Fig. 24

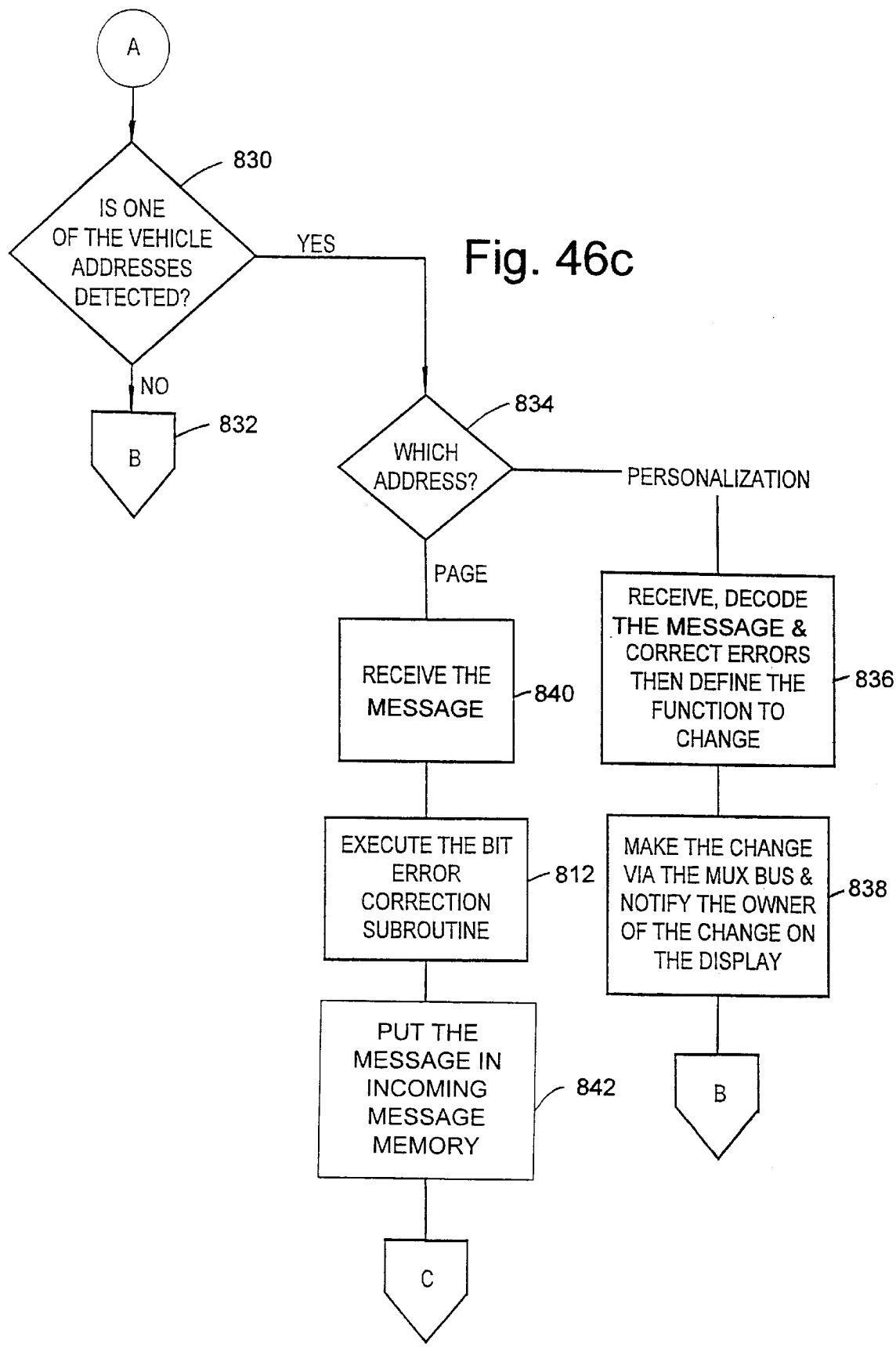

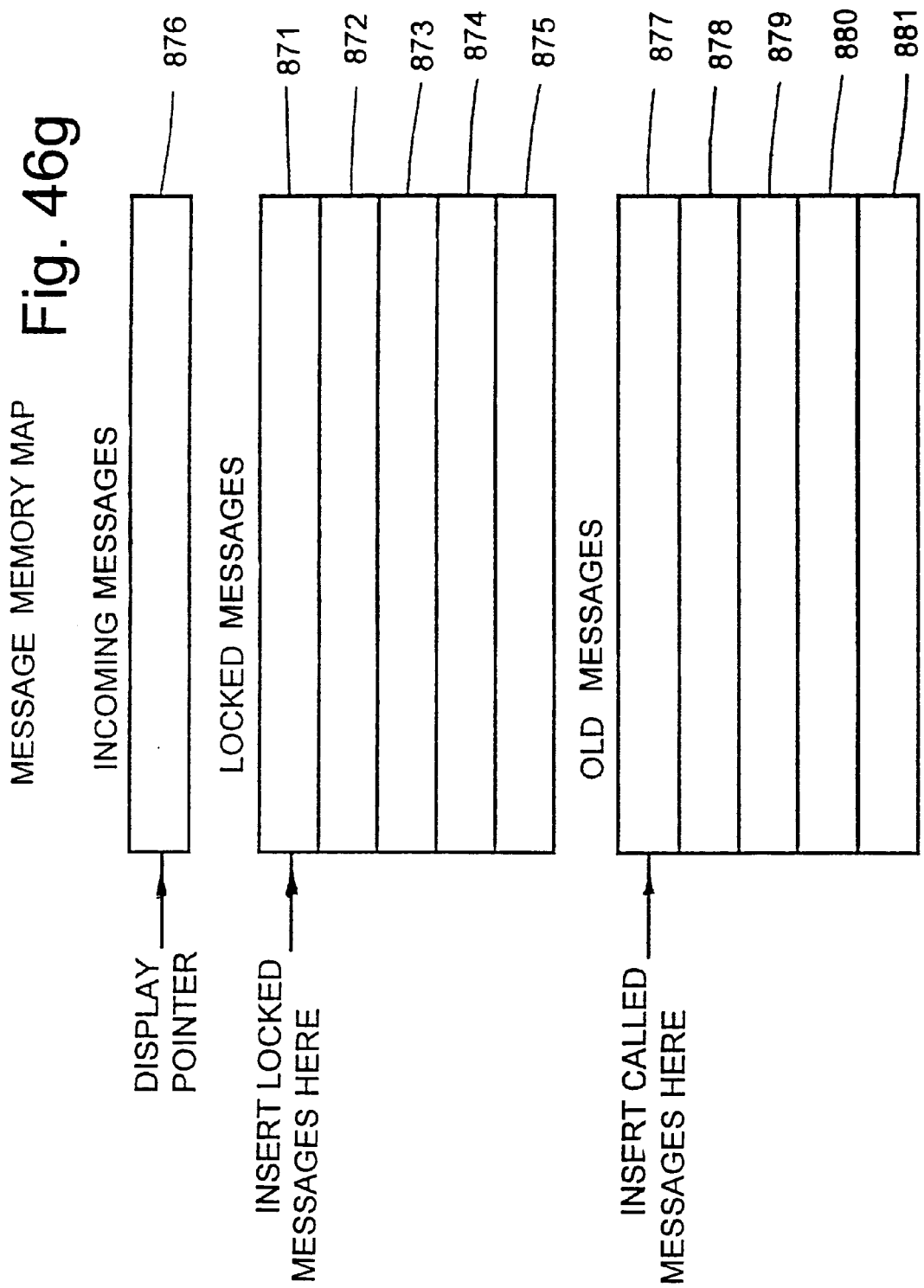

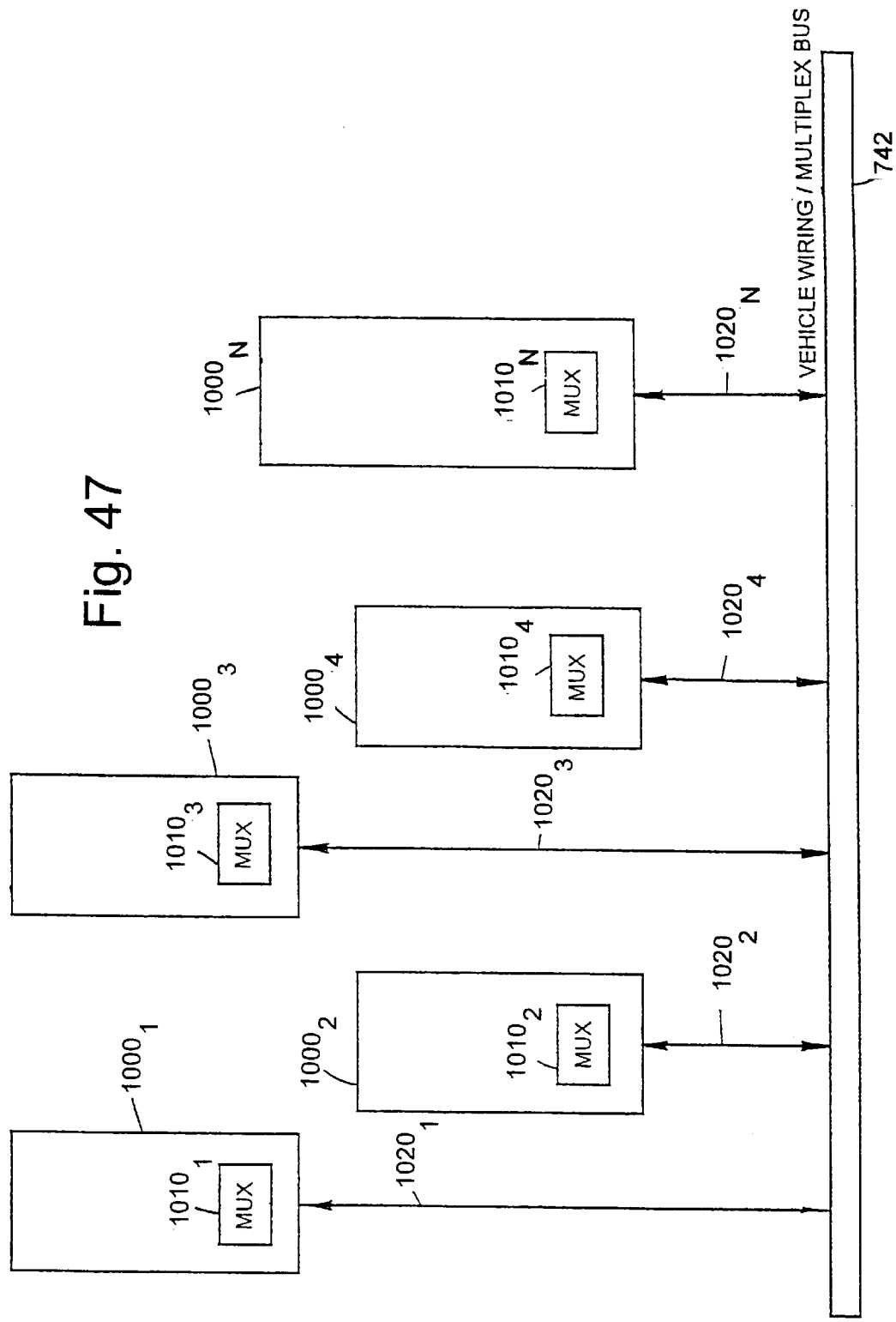

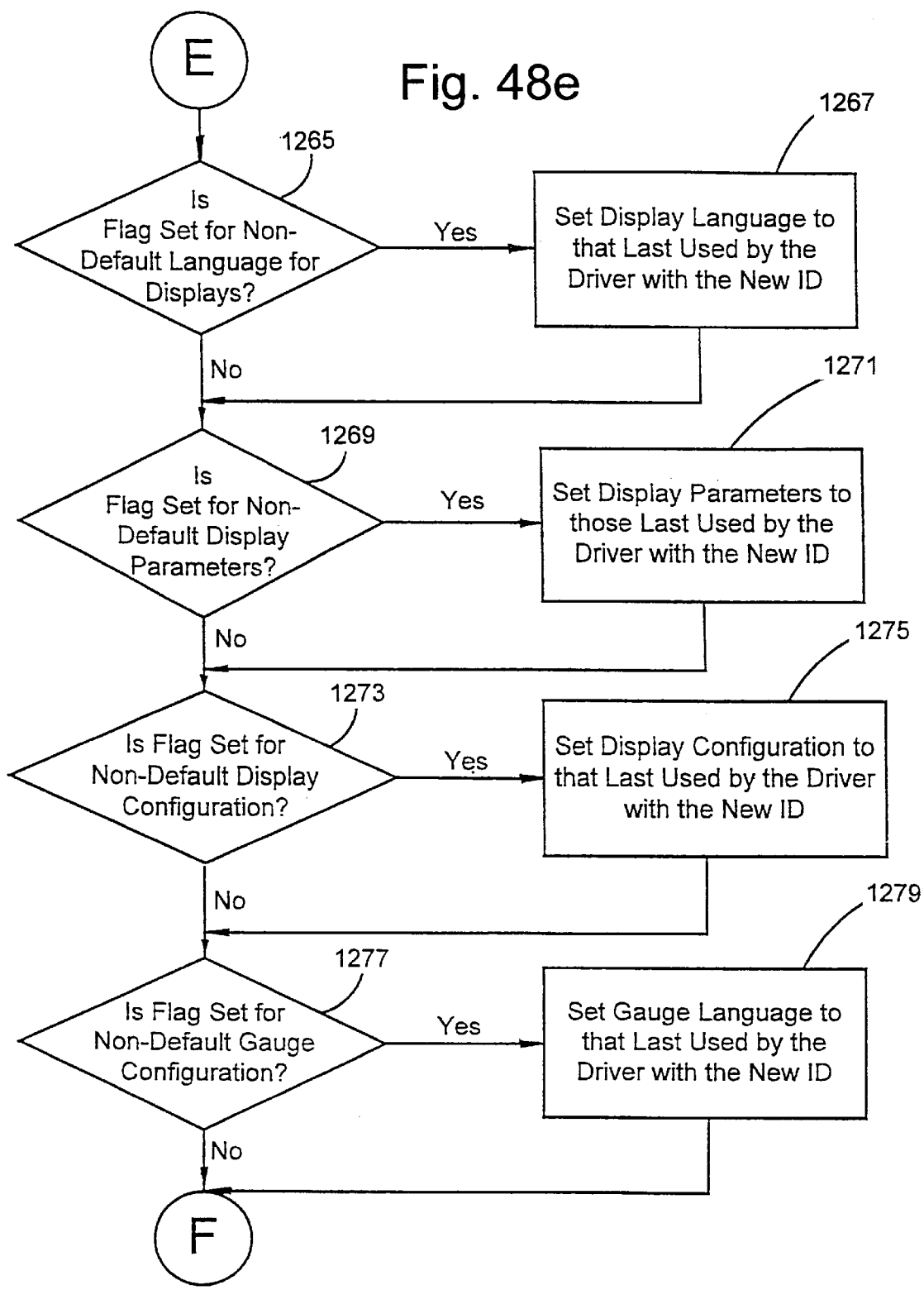

VEHICLE COMMUNICATION AND REMOTE CONTROL SYSTEM

CROSS-REFERENCE TO RELATED APPLICATIONS

This application claims priority under 35 U.S.C. §119(e) on U.S. Provisional Patent Application No. 60/019,773 entitled VEHICLE COMMUNICATION AND REMOTE CONTROL SYSTEM, filed on Jun. 14, 1996.

BACKGROUND OF THE INVENTION

The present invention generally relates to a vehicle communication system having various message and control functions. More specifically, the present invention relates to a system for a vehicle capable of providing various combinations of automatic emergency response, theft deterrence, vehicle tracking and immobilization, two-way communication, remote vehicle accessory control, vehicle personalization, navigational guidance, and location-based information services.

Although various communication systems and various remote control systems have been disclosed for implementation in a vehicle, very few of these systems have, in fact, been integrated within a vehicle so as to provide both a two-way communication system and a remote control system that is capable of performing a large variety of functions. Because of the cost and complexity of the prior systems that have been proposed, many of the disclosed systems have never been actually implemented in a vehicle. In addition, given the cost that is passed along to the consumer, such systems must be capable of providing a large number of functions and yet be relatively easy to use. Further, most of these prior systems do not allow a vehicle owner to control, reprogram, and track their vehicle from a home or office personal computer (PC).

SUMMARY OF THE INVENTION

One aspect of the present invention is to provide a display and user interface in a vehicle-installed accessory such that the vehicle driver may easily manipulate the input keys and view the display with minimal distraction while driving. Another aspect of the present invention is to provide a two-way messaging system permanently installed in a vehicle and interfaced with the vehicle power supply, and preferably the vehicle system bus to allow for remote control and programming of vehicular components and accessories.

Yet another aspect of the present invention is to provide a system for providing quick access and communication with an emergency service center, such as 911, either by simply pressing a 911 button, or automatically upon deployment of an air bag. Such an emergency service system would also preferably provide information to the emergency service center indicating the vehicle's current location. Another aspect of the present invention is to provide a two-way communication system that will allow an occupant to request roadside assistance and to receive a confirmation that an assisting vehicle has been dispatched, and to provide an occupant with an estimation of when the assistance vehicle will arrive at the vehicle's current location.

An additional aspect of the present invention is to provide a system that will identify the location of the vehicle to the police, in the event that the vehicle is stolen. In this regard, the present invention preferably is passively activated when the vehicle's alarm is tripped. Further, the present invention may be used to immobilize and disable the vehicle in response to an appropriate command delivered in a radio frequency (RF) paging signal.

Yet another aspect of the present invention is to provide a vehicle locating system that allows the vehicle owner to determine the location of the vehicle when the vehicle has been loaned to a friend or family member. In this regard, the present invention may also be used by the manager of a fleet of commercial vehicles, such as taxis, police cars, trucks, or other delivery vehicles, to track the location of each vehicle in the fleet.

An additional aspect of the present invention is to provide a system capable of informing the vehicle occupants of the location of the nearest automatic teller machine (ATM), hospital, freeway on-ramp, etc., based upon the current location of the vehicle and to provide step-by-step audio or textual instructions on how to find such a location. In this respect, the present invention may also be used to provide a warning to the driver when the last exit is approaching from which the driver may obtain fuel before the fuel tank is empty. Further, the present invention may provide traffic reports, road conditions, and weather reports to the vehicle's occupants that are particularly relevant to the vehicle's current location.

It is an additional aspect of the present invention to provide a system allowing for remote control of vehicle functions and accessories using an RF signal. Thus, vehicle owners may lock their vehicle doors, roll up their windows, or activate an alarm system from any location in response to an RF signal. Further, the vehicle owner may use the system of the present invention to immobilize a vehicle to insure safe storage of the vehicle.

Still yet another aspect of the present invention is to provide vehicle personalization to be remotely affected by a service provider using an RF signal transmission system. In this regard, a vehicle owner wishing to reprogram a vehicle, calls the service provider who effects reprogramming of the control of an accessory by transmitting RF signals to the vehicle. Further, the present invention allows for vehicle personalization for each person who may operate the vehicle.

Additionally, it is an aspect of the present invention to provide a system that receives and displays text or audio messages providing step-by-step directions to reach a desired location based upon the current location of the vehicle whereby each step may be separately read from memory in response to each subsequent command, which may be generated by activation of a switch or by a global positioning system (GPS). Further, the present invention allows a user to inform the system that they are lost and to subsequently receive and display revised directions based upon the vehicle's current location. Additionally, the present invention may be used to suggest alternate routes based upon traffic delays between the current location of the vehicle and the desired destination. Further, the present invention may display or play back specific navigation steps corresponding to the current location of the vehicle.

Still another aspect of the present invention is to provide a system allowing for remote diagnostic evaluation of the vehicle by a service technician. Additional features and advantages of the present invention will be set forth in part in the description which follows and in part will be apparent from the description, or may be learned by practice of the invention.

To achieve these and other advantages, and in accordance with the purpose of the invention, the vehicle communication and remote control system preferably comprises various combinations of the following: a two-way communication module for transmitting and receiving RF messages to/from a land-based transmitter/receiver station; a microprocessor coupled to the communication module for performing functions and generating messages in response to a received RF signal; a GPS module coupled to the microprocessor for receiving GPS signals and sending the location information signals to the microprocessor; a display interface and display coupled to the microprocessor for displaying messages and other information generated by the microprocessor to the system user; the compass module coupled to the microprocessor for providing and displaying vehicle heading information; a vehicle bus interface coupled between the vehicle's bus and the microprocessor for receiving information from and transmitting control signals to various accessories in the vehicle; a database stored in a memory coupled to the microprocessor for maintaining information pertaining to the vehicle and its occupants for manipulation by the microprocessor; and a driver interface coupled to the microprocessor for receiving input signals generated from various user interface buttons.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1A is a schematic diagram depicting a system including a land-based transmitting station in communication with a vehicle having a communication and control system according to the invention;

FIG. 7 is a fragmentary perspective view of an armrest console embodying the data entry system of the present invention;

FIG. 8 is an enlarged front elevational view of the data entry switches shown in FIG. 7;

FIG. 9 is a fragmentary perspective view of an overhead display incorporated in the system of the present invention;

FIG. 13 is a diagram of a display for the stereo features subroutine;

FIG. 14 is a flow diagram of the program subroutine for controlling the data entry circuit using the display method shown in FIGS. 13 and 14;

FIG. 15 is a diagram of another display for the stereo features subroutine;

FIG. 22 is a fragmentary perspective view of the overhead console showing an example of a message being displayed;

FIG. 23 is a diagram of the displays used for the compass subroutine;

FIG. 24 is a diagram of the displays used for the navigation subroutine;

FIG. 30 is an enlarged fragmentary view of the display shown in FIG. 30;

FIGS. 46A–46K are flow diagrams of the program employed with the microprocessor shown in FIG. 44;

FIG. 47 is an electrical circuit diagram in block form of an optional interface circuit associated with the electrical circuit shown in FIG. 44;

FIGS. 48A–48K are flow diagrams of the main control program employed with the microprocessor shown in FIG. 44;

DETAILED DESCRIPTION OF PREFERRED EMBODIMENTS

1. Preferred Configurations

Figure 1B:
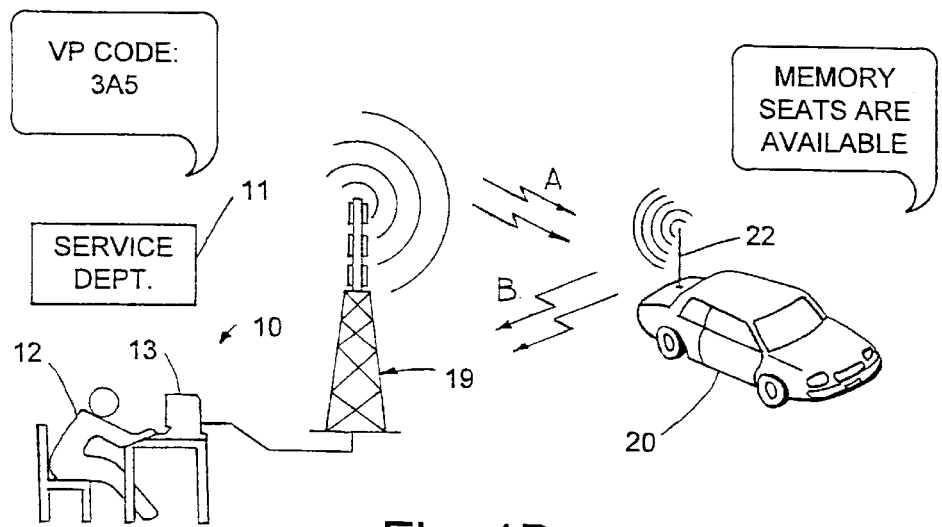
FIG. 1B is a schematic diagram depicting a paging system including a land-based transmitting station in communication with a vehicle having a communication and control system according to the invention.

Referring initially to FIG. 1, there is shown a land-based system for communicating with the vehicle communication and remote control system of the present invention as implemented in a vehicle 20. The system shown in FIG. 1 also allows remote control signals and other commands to be issued to and from a system of the present invention within vehicle 20 via its antenna 22. In a preferred construction, the infrastructure that enables communications to be sent to and received from the vehicle communication system, utilizes a cellular/paging network 2 which includes a plurality of base stations 19 that transmit and receive RF signals to/from vehicle 20. Further, in a conventional manner, communications may be initiated or received through a public-switched telephone network (PSTN) 1 for transmission to or from a vehicle through cellular/paging network 2. Further, such communications may be routed through a computer network such as the Internet 3 which is typically accessed through PSTN 1. Because infrastructure including PSTN 1 and cellular/paging network 2 are in existence and well-known in the art, the structure and function thereof are not discussed further.

Depending upon the form and nature of communication and any command signal sent to or received from the vehicle communication and control system of the present invention, different techniques for enabling transmission of such communications and control signals, may be employed. For example, if an individual wished to place a telephone call to the vehicle communication system in vehicle 20, the individual could place the telephone call on any conventional telephone 15 such that the call is routed to the vehicle in the conventional manner used to route a telephone call to a cellular telephone. Similarly, a call originating from the communication system in vehicle 20 may be routed to telephone 15 in any conventional manner. If, on the other hand, a 911 emergency call is originated using the vehicle communication system in vehicle 20, the call would preferably be initially routed to a network service center 11 where a service operator could utilize a computer 13 to identify the vehicle's location based upon a vehicle location signal generated by the vehicle communication system and transmitted with the 911 distress call. The service operator could then establish a two-way communication link with the vehicle occupants using a conventional telephone 12, while at the same time placing a call through PSTN 1 to establish a conference call with an operator using a telephone 6 or computer 7 at a 911 dispatch center. Similarly, if the vehicle occupant requests roadside assistance, the initial call and vehicle location signal would be transmitted to network service center 11 where an operator would subsequently contact a dispatch center 8 to have the appropriate form of assistance dispatched to the vehicle at the location identified in the location signal.

If an individual wished to transmit a text message to the vehicle communication system in vehicle 20, the individual could do so in a number of different ways. For example, the user could type in the message on a personal computer 5 and transmit it using the computer's modem through PSTN 1 and cellular network 2 to vehicle 20 for display via a cellular communication link. Such a message originated through computer 5 could also be sent to vehicle 20 via a server on the Internet 3 operated by a network service center 11 or the like. Yet another method would be to send the text message originating from computer 5 either directly through PSTN 1 to a computer 13 at the network service center 11 or through Internet 3. Network service center 11 would then put together an appropriately-formatted text message for transmission through PSTN 1 and cellular/paging network 2 to the vehicle. This message could also be formatted as a paging signal that may be received and displayed on a display device of the vehicle communication system. Further still, an individual could place a call on a conventional telephone 15 and reach a network service center operator on telephone 12 to request that a specific text message be transmitted to vehicle 20.

By utilizing PSTN 1 and Internet 3, various features of the Internet may be accessed in the vehicle. For example, a driver may access e-mail or may receive periodic stock prices or news items through the use of the present invention.

As will be apparent from the description of the various functionalities that may be performed using the vehicle communication and control system of the present invention in connection with the infrastructure disclosed in FIG. 1A, various techniques may be used to establish the appropriate form of communication or signaling such that the desired function is ultimately performed.

Figure 2:
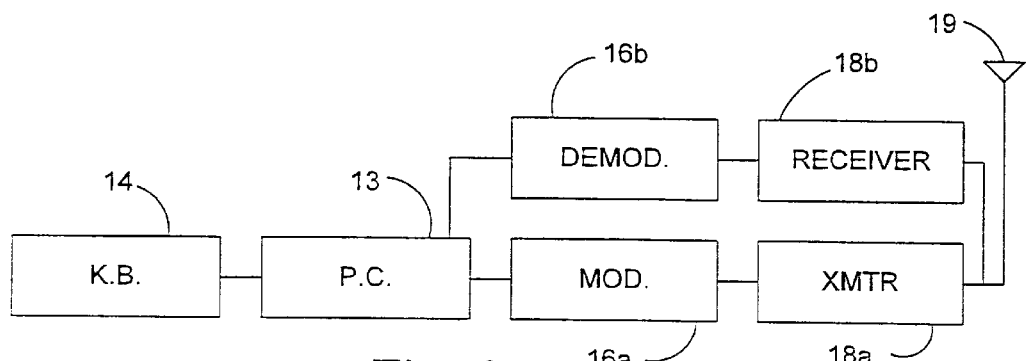
FIG. 2 is an electrical circuit diagram in block form of the land-based facility illustrated in FIGS. 1A and 1B.

As shown in FIG. 1B, the land-based facility that sends and receives messages and commands to and from the vehicle may be directly connected to the cellular/paging network. The land-based facility can be a car dealership, for example, or an independent facility which includes a service department 11 for providing the transmission and reception of control and communication signals to and from vehicles subscribed to the system. The service department includes an operator 12 with access to a computer terminal 13 with a keyboard 14 (FIG. 2). The terminal can be a typical PC with an RS-232 data output port coupled to a modulator 16a, which, in turn, is coupled to a transmitter 18a for transmitting address and control or message signals A by an antenna 19 (FIGS. 2 and 3) to the receiving antenna 22 of a vehicle 20. The terminal is also coupled to a demodulator 16b that demodulates signals received from receiver 18b via antenna 19. It is understood that nationwide, there will be a sufficient number of land-based facilities to service vehicles in the system. As satellite communications improve, it will be possible for a single facility to send such information using DBS (Direct Broadcast Satellite) in which the vehicle antenna is a satellite receiving antenna. Alternatively, satellite communications can be used as one link through several land-based relay stations.

As but one example, in the system shown in FIG. 1B, the service operator will receive a request from a vehicle owner, typically by a normal telephone request, that a certain vehicle option is either to be enabled or disabled. Such an operation may, for example, be the activation or deactivation of a "LAST DOOR LOCKS ALL DOORS" feature. The service operator responds to the request which identifies the vehicle either by owner or vehicle identification number (VIN) (or both) by entering in keyboard 14, the vehicle code which is typically an address associated with the particular vehicle and a reprogramming command associated with the requested personalization of the vehicle option change for such vehicle. This information may be modulated onto an RF signal. This RF signal is transmitted by the service department 11 using the equipment shown in FIG. 2 and received and demodulated by the vehicle system as described in greater detail below in connection with FIGS. 44, 45, and 47, which respond to the reprogramming command to carry out the reprogramming control function. Also, the land-based station may transmit messages including communications and other information to the vehicle. Further, signals may be received from the vehicle, in the form of requests for information, roadside assistance, emergency services, directions to a particular location, and for various other types of information or services.

A variety of modulation schemes can be used for the transmission of information between land-based facilities and vehicles, however, a cellular link is presently preferred. Also possible are standard commercially available GSC, POCSAG, or two-way paging systems. An example of a two-way paging system is described in U.S. Pat. No. 5,153,582, issued to Davis, the entire disclosure of which is incorporated herein by reference. In the FIG. 2 schematic diagram shown, a reprogramming command can be two 23-bit words in the standard GSC paging format which uniquely identifies each vehicle in the system. Following the address for the vehicle, the actual reprogramming command data is sent, which in this paging format can be up to eight words or fifteen bits each. Other paging formats such as the POCSAG format can also be employed which also provides address code words and message code words. A description of these two formats is set forth in detail in Appendix A to this Specification.

Because many of the features of the present invention described below require the ability to transmit information and requests for information or services from the vehicle using RF signals, two-way communication is preferred. However, depending upon the specific features and services that are selected, the present invention may be implemented using conventional one-way communication formats.

Figure 44:
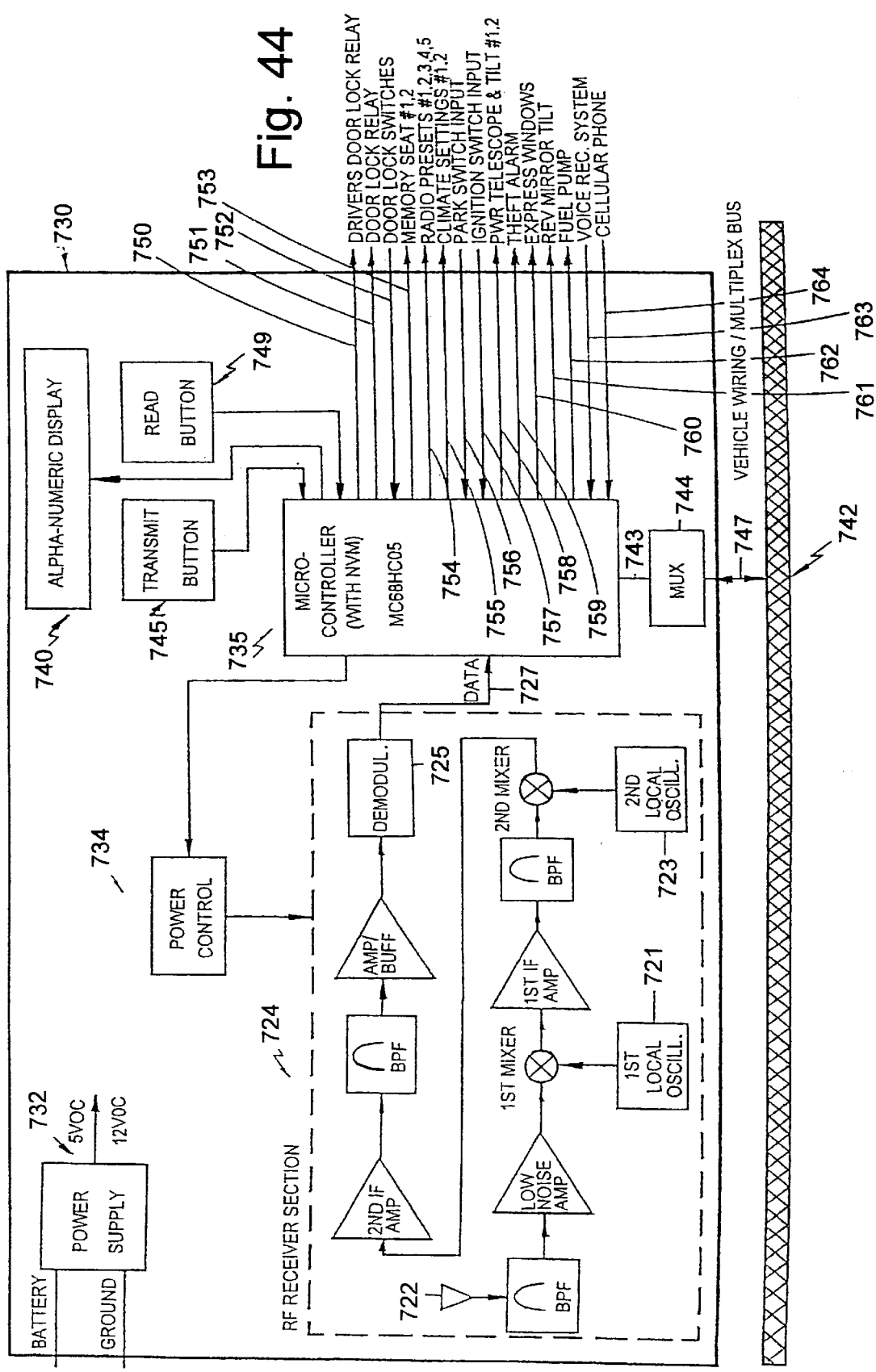
FIG. 44 is an electrical circuit diagram in block form of the vehicle electrical circuit embodying the present invention which may be used in association with the system shown in FIGS. 2 and 3.

In the example shown in FIG. 1B, the vehicle operator has requested that the memory seat be disabled and the necessary RF signal including the reprogramming command is transmitted to the vehicle electrical control system 730 as shown in FIG. 44, which includes the vehicle antenna 22 and a receiver and demodulator shown by block 724 for receiving the vehicle address and reprogramming command and applying it to a microcontroller 735. Once received and decoded, the reprogramming command is executed as described below, and an indication that the command has been received and executed is provided on an alpha-numeric display in the vehicle.

In the installation shown in FIGS. 1B and 2, the modulator 16a responds to the vehicle identification code and the reprogramming command signal or message entered on keyboard 14 and transmitted by conventional commercially-available modulator 16a and transmitter 18a to provide the desired address and reprogramming in the GSC or POCSAG paging formats or in a format that may be otherwise recognized by the vehicle-installed system. Transmitter 18a typically operates on a frequency within the 137–175 MHz (VHF band) or within the 405–513 MHz (UHF band), while the modulator provides FM FSK tone modulation for the RF carrier signal to provide a composite output signal at transmitting antenna 19 which provides the address and reprogramming information to vehicles which are part of the system. Typically, the vehicle receiver and transmitter will be integral parts of the vehicle when purchased, and the dealer can either include the options select control system as part of the vehicle cost or can provide it as a monthly subscription service to the vehicle owner. Access to the unique vehicle identification code address for controlling options, however, will typically only be available to the vehicle dealer or associated service centers.

Figure 3:
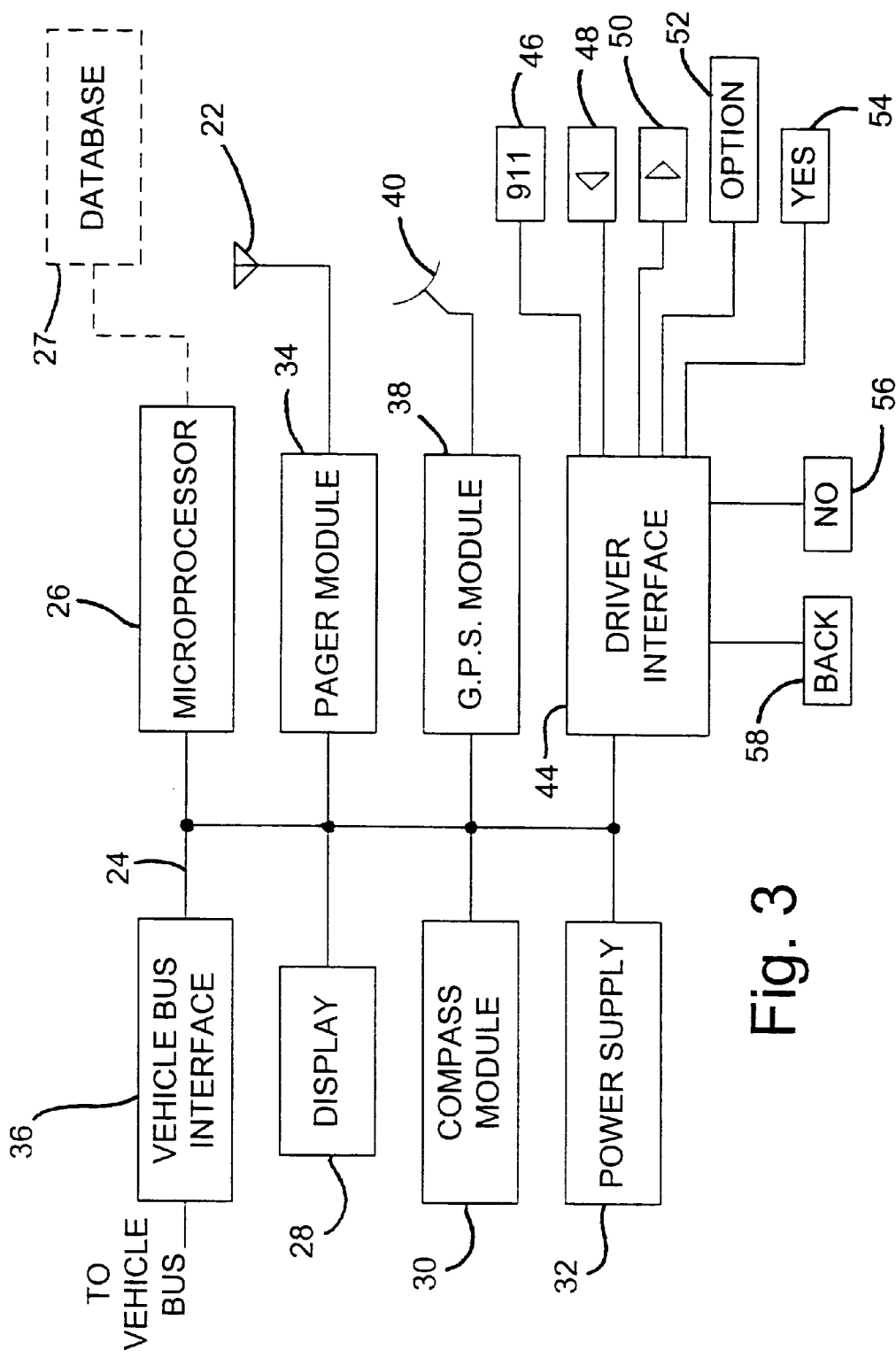
FIG. 3 is an electrical circuit diagram in block form of a vehicle communication and control system constructed in accordance with a first embodiment of the present invention.

Turning now to FIG. 3, there is shown the electrical circuit of a first embodiment of the present invention which is mounted in vehicle 20. The vehicle 20 includes a data bus line 42 which is coupled to a vehicle bus interface circuit 36, which is a multiplex circuit coupled to a variety of system sensors and provides signals to a bus 24 coupling the circuits of the present invention. The bus interface circuit 36, therefore, receives signals from, for example, the vehicle's fuel gauge, the speedometer input, the air bags, and other vehicle operating parameters. The vehicle itself may conventionally include a computer for providing signals such as distance-to-empty signals on bus 42, or such information can be easily calculated based upon the sensor inputs. The interface circuit 36 provides information in the form of serial data to a microprocessor 26 through a serial data line included on bus 24. Bus 24 also includes a clock line, an enable signal line and power supply conductors for coupling power from supply 32 coupled to the vehicle's battery via conductors to the remaining circuit elements. The information on vehicle bus 42 may also be selectively displayed to the vehicle operator by a display 28. As will be described in further detail below, display 28 may be a conventional alpha-numeric digital display mounted in either a vehicle overhead console, an A-pillar, a sun visor, a rearview mirror, or on the instrument panel. The display circuitry 28 may also include a suitable audible alarm for alerting the driver.

Figure 4:
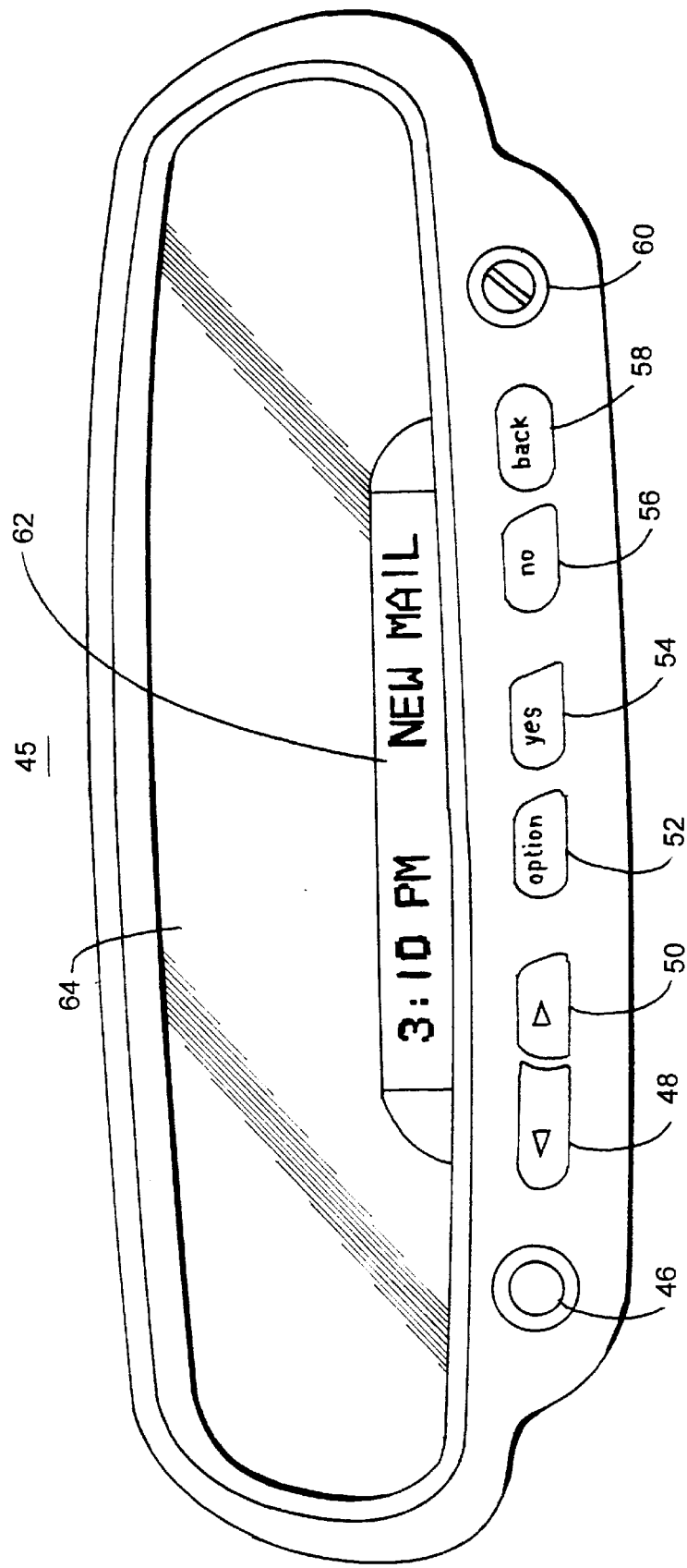
FIG. 4 is a pictorial representation of a rearview mirror constructed in accordance with one embodiment of the present invention.

The vehicle control circuit also includes driver command control switches, such as a keyboard or push-button switches 46, 48, 50, 52, 54, 56, and 58 coupled to microprocessor 26 via a driver interface 44 and bus 24. As shown in FIG. 4, these switches may be employed on a rearview mirror 45 near a display 62 formed adjacent the mirror surface 64. Such switches are commonly employed in vehicles for selecting and controlling the display and entry of data in a vehicle. The driver may thus select information to be displayed directly or enter a command to microprocessor 26 which responds to calculate and subsequently display the desired information. As will be described in greater detail below under the heading "Alternate Vehicle User Interface System," the switches may be located remotely from the vehicle accessory in which the display 28, 62 is located.

In addition, the vehicle includes a compass module 30 such as the type disclosed in U.S. Pat. No. 4,953,305, which may include its own display or may be coupled by bus 24 as shown to provide a display through the vehicle display circuit 28. The power supply 32 provides suitable operating power for the components, which may include plus and minus Vcc supplies for the electronic circuits employed. The microprocessor 26 can be any number of commercially-available microprocessors such as a Motorola 68HC11, which includes internal RAM and ROM memories for providing the program control functions including that of the present invention which is described below.

The vehicle communication and control system according to the first embodiment of the invention includes a pager module 34, which is coupled to a two-way antenna 36 for receiving and transmitting digital paging messages and coupled to bus 24. Such a paging module can be of the type disclosed in U.S. Pat. No. 5,153,582, the disclosure of which is incorporated herein by reference. As shown in FIG. 4, it may be uniquely mounted in the vehicle rearview mirror housing 45 and utilizes display 62 for displaying incoming paging messages. Transmitted responses to incoming information requests can be sent automatically under the control of microprocessor 26 or by the operator actuation of one or a predetermined sequence of switches 46, 48, 50, 52, 54, 56, and 58. The vehicle-installed pager 34 receives power from the vehicle's power source through supply 32. The pager module 34 allows automatic or vehicle operator requested communication of various information including the locations of available service areas from a database at a central station to which the vehicle operator subscribes and which makes such information available to the vehicle operator and vehicle electronic system through the pager module 34. In addition, the vehicle communication and control system includes a navigation module 38 coupled to a suitable receiving antenna 40. In the preferred embodiment, module 38 is a commercially-available GPS module of the type manufactured by a number of suppliers including Motorola, Inc., Trimble Navigation, Ltd., or the like.

The serial data line of bus 24 is coupled to an SPI port for each of the circuit modules of FIG. 3. Also, the clock line is coupled to each of the circuits of FIG. 3 for receiving clock pulses from microprocessor 26 to synchronize the transfer of data between the modules. Finally, an enable line is coupled to each of the circuits for receiving enabling signals from the microprocessor to initiate the synchronized transfer of serial data between the microprocessor and each of the modules. The connection and data flow scheme for such interconnection is conventional, as is the coupling of the microprocessor 26 to the vehicle bus line 42 through the interface 36. The specifics of the coupling to the vehicle bus line 42 and the various vehicle accessories and input lines are described in more detail below.

FIG. 4 shows a construction of a rearview mirror 45 in which the present invention may be installed. Rearview mirror 45 is preferably a mirror having adjustable reflectivity levels, such as an electrochromic mirror, and has a control circuit for automatically varying the reflectivity of the mirror in response to an ambient light level detected by a sensor 60. As shown, rearview mirror 45 includes a display surface 62 for displaying various information to the user. With reference to FIG. 3, it can be seen that display 62 corresponds to display 28. Rearview mirror 45 also includes various push-buttons to allow a user to enter information into the system and to otherwise interface with microprocessor 26.

Some of the push-buttons that may be provided are a back arrow 48 and a forward arrow 50 used to move a cursor or selections in a display window back and forth. An "option" button 52 may be provided to cause various selectable options to be displayed. Also, a "yes" button 54 and a "no" button 56 may be provided to answer a yes or no inquiry displayed on display 62. A "back" button 58 may also be provided to allow the user to back up to a previously-displayed message.

Figure 5:
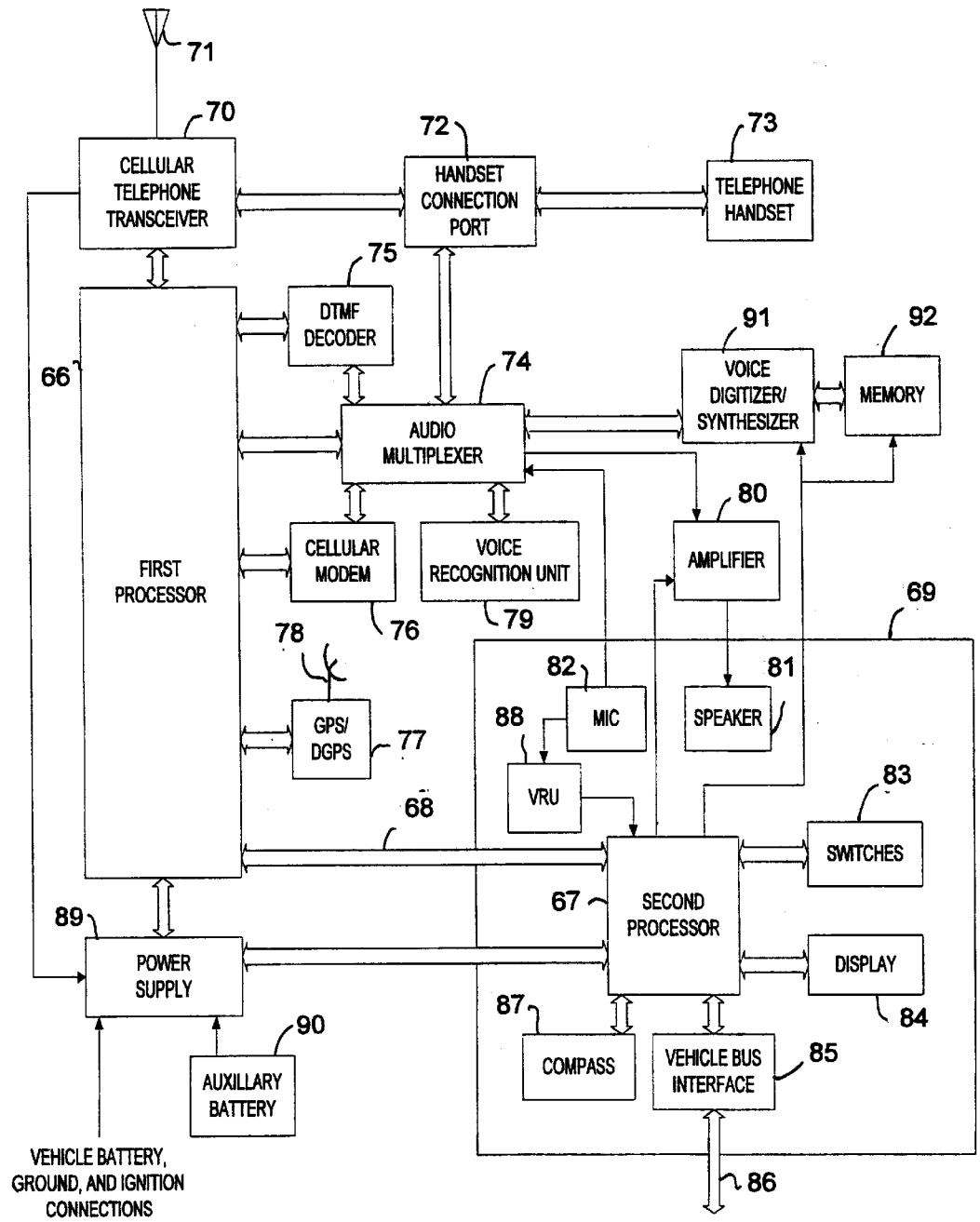
FIG. 5 is an electrical circuit diagram in block form of a vehicle communication and control system according to a second embodiment of the present invention.

A second embodiment of the vehicle communication and control system of the present invention is shown in FIG. 5. As shown in FIG. 5, the second embodiment differs from the first embodiment in that it utilizes a two-way cellular telephone RF link rather than a paging link. More specifically, the communication and control system according to the second embodiment includes a first microprocessor 66 that works in communication and cooperation with a second microprocessor 67, which monitors inputs and provides outputs in a user interface portion 69 of the system of the present invention. First microprocessor 66 and second microprocessor 67 may be connected by bus 68 that may be a serial or parallel common interface. Together, first and second microprocessors 66 and 67 monitor incoming messages and communications from a cellular telephone transceiver 70 and from various vehicle accessories and components coupled to microprocessor 67 via a vehicle bus interface 85 that is coupled to a vehicle bus 86.

Cellular telephone transceiver 70 may be a standard cellular transceiver that receives and transmits RF signals to and from a conventional cellular telephone antenna 71. Cellular telephone transceiver 70 is coupled to first microprocessor 66 for receiving control data and other data to be transmitted thereby.

Transceiver 70 is also preferably coupled to a handset connection port 72 to which a telephone handset 73 may optionally be connected. With the handset connected to port 72, a user may place and receive calls using handset 73 in a conventional manner. Handset connection port 72 is also preferably coupled to an audio multiplexer 74 which, in turn, is coupled to a DTMF decoder 75 and a cellular modem 76. Cellular modem 76 is provided for transmitting and receiving data and text messages through cellular telephone receiver 70. DTMF decoder 75 and cellular modem 76 are preferably coupled to first microprocessor 66.

Similar to the first embodiment, the second embodiment also includes a location identifying sensor, such as a GPS or differential GPS module 77 having a GPS antenna 78. The GPS/DGPS module 77 is coupled to first microprocessor 66 to provide an indication of the vehicle's location, which may be used for a variety of purposes as discussed below.

The system may further include a voice recognition unit (VRU) 79 which is coupled to audio multiplexer 74 for recognition of voice commands that may be delivered from handset 73, cellular telephone transceiver 70, or from a microphone 82 provided in user interface 69. By providing VRU 79, the system may be controlled by hands-free voice commands to perform its many and various functions.

By providing a speaker 81 along with microphone 82 in user interface 69, and by coupling microphone 82 to audio multiplexer 74 and coupling speaker 81 to audio multiplexer 74 through an amplifier 80, two-way voice communication may be provided without requiring handset 73.

Figure 6:
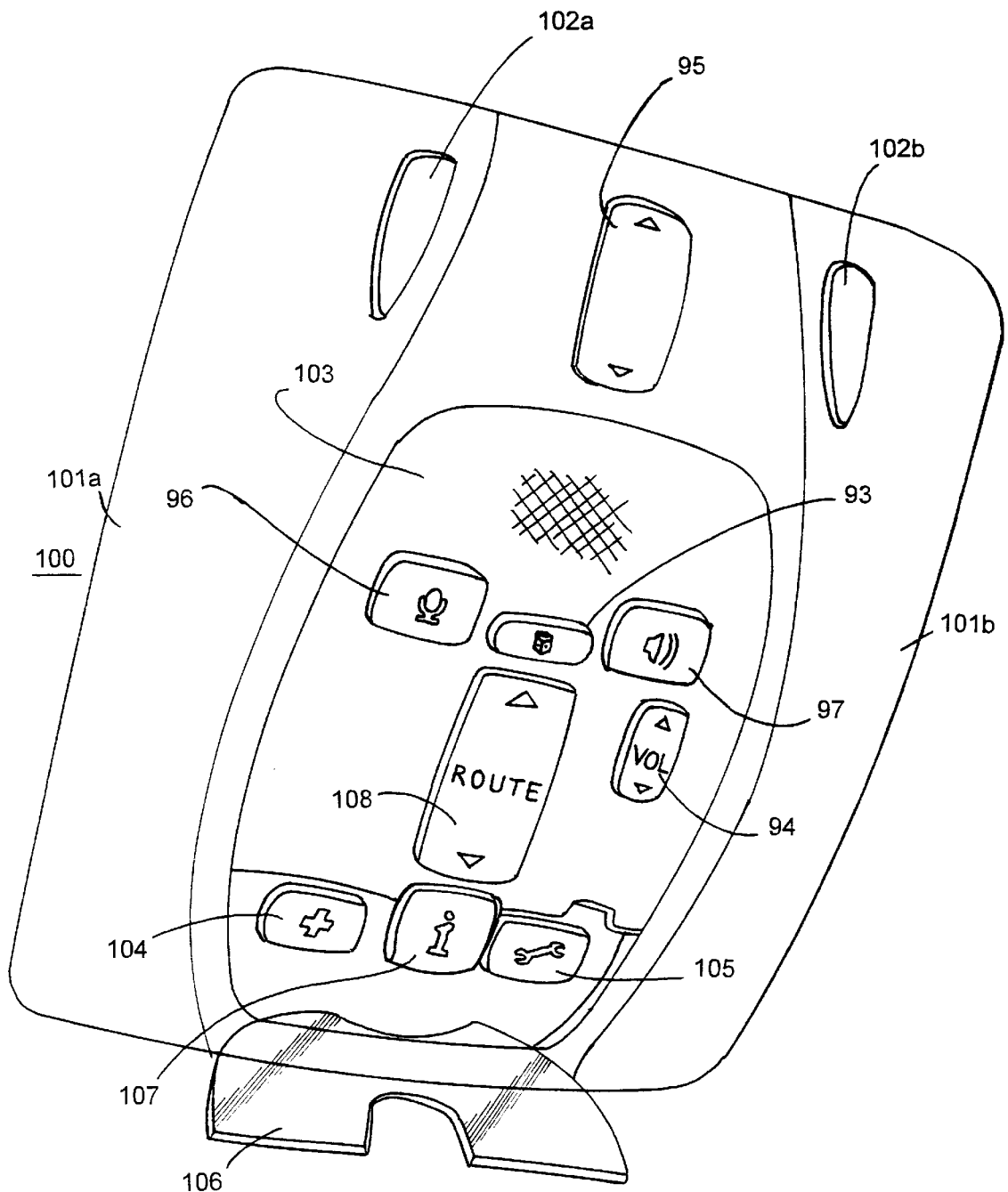
FIG. 6 is a pictorial representation of an overhead console constructed in accordance with one embodiment of the present invention.

User interface 69 may further include one or more switches that may perform various functions in different modes of operation or may perform discrete functions regardless of the mode of operation. For example, as shown in FIG. 6, the invention may be implemented with the user interface 69 provided in an overhead console 100 that includes a dedicated switch 104 for requesting emergency assistance, a dedicated switch 105 for requesting roadside assistance, and an information request switch 107 which is a dedicated switch for requesting information from an operator at a network service center. Also included in the exemplary interface shown in FIG. 6, a two-way toggle switch 94 that is provided for adjusting the volume of the audio output produced by a speaker 81 provided behind a grid 103 forming part of the exterior surface of console 100. Also provided is a two-way toggle switch 108 provided for playing either the previous or the next navigational step required to reach a selected destination. A record switch 96 and a play back switch 97 are also provided which are used to record and play back dictated memos. The manner by which this operation is performed is described below. Also provided is a switch 93 for deleting recorded messages. As shown in FIG. 6, overhead console 100 may further provide a pivotable cover 106, which may be transparent, translucent, or opaque, for covering up switches 104 and 105, which are used to request emergency or roadside assistance, so as to prevent inadvertent activation of one of these switches. Console 100 may also include map lamps 101a and 101b which are selectively illuminated using switches 102a and 102b, respectively. Additionally, other switches may be provided on overhead console 100, such as a sunroof open and close switch 95.

Referring back to FIG. 5, the system according to the second embodiment further includes a voice digitizing circuit 91 coupled to audio multiplexer 74 and also coupled to a memory 92 for receiving voice messages, digitizing them, and storing them in memory 92. Voice digitizer 91 and memory 92 are also preferably coupled to second microprocessor 67 which controls the recording and play back of voice messages.

User interface 69 may further include a display 84 which is coupled to second microprocessor 67 for the display of various control menus and received text messages. As stated above, a vehicle bus interface circuit 85 may be coupled to second microprocessor 67 to send control signals to various vehicle accessories and components coupled to vehicle bus 86 and for receiving signals from various components coupled to vehicle bus 86, to which microprocessor 67 is to respond. For example, second microprocessor 67 may receive a signal through bus 86 and vehicle bus interface 85 indicating that the vehicle's air bags have been deployed. Microprocessor 67 would then respond to this indication by instructing microprocessor 66 to transmit a distress signal through transceiver 70 that would include the vehicle's last known location as determined by GPS/DGPS module 77.

On the other hand, if a command message received through transceiver 70 and demodulated using cellular modem 76 instructs the system to lock the vehicle doors, first microprocessor 66 would recognize the command and instruct second microprocessor 67 to send the appropriate control signal through vehicle bus 86 to the door lock actuators to lock the doors. Given that a modem is provided within this system, it will be readily apparent to those skilled in the art that various control and communication functionalities may be implemented in a manner that would be similar to having two computers communicating via their modems.

The system may further include an electronic compass 87 coupled to second microprocessor 67 for providing the vehicle's heading that may in turn be displayed on display 84 or may be transmitted in a communication signal through transceiver 70.

Instead of connecting VRU 79 to audio multiplexer 74, a VRU 88 may optionally be coupled directly to microphone 82 and to second microprocessor 67 for again serving as a hands-free interface to initiate various control functions which the system is capable of performing.

The system is preferably powered by a power supply module 89 that receives its power from the vehicle's battery or alternator. Power supply circuit 89 may also be powered by an auxiliary battery 90 that is provided to power the system in the event that power is interrupted from the vehicle battery. This would allow the system to transmit a distress signal even when an accident has occurred that is so severe that it has interrupted the supply of power from the vehicle's battery.

It will be apparent to those skilled in the art that various other buttons or combinations thereof may be provided to enable a user to readily manipulate the information displayed and to enter data using these buttons. Some alternative approaches and graphic user interfaces are described in detail below.

2. Preferred System Functions

Preferably, one of the push-buttons described above includes a "911" button 46 or 104 that a user may push in the event of an emergency. Because many drivers have difficulty determining their precise location when calling 911 from a vehicle using a cellular telephone, and because most cellular telephones do not transmit any information pertaining to current location, emergency service vehicles may have great difficulty locating the vehicle from which a 911 call was made. By providing a GPS module 38 in the system of the present invention, microprocessor 26 or 66 may ascertain the precise location of the vehicle and transmit the location in a distress paging message from paging module 34 or transceiver 70. In this manner, emergency service personnel may use the received location information to generate a map having the location highlighted thereon and immediately dispatch an emergency vehicle to the location. If the emergency vehicles also have the system of the present invention installed therein, the emergency service personnel receiving the distress message and dispatching the emergency vehicles may track the location of the available vehicles and dispatch that vehicle that is closest to the vehicle sending the distress signal. Further, the emergency service personnel may transmit a message back to the vehicle confirming that the distress signal was received and provide an estimate as to when the dispatched emergency vehicle will arrive.

With the second embodiment, two-way voice communication may be established using microphone 82 and speaker 81 so that the emergency dispatcher may speak with the vehicle occupants if they are conscious.

Because most cellular telephones are not interfaced with the vehicle's electronic control system, one of the vehicle occupants must be able to dial 911 on the cellular telephone to obtain emergency assistance. This may or may not be possible if they are rendered unconscious in an accident. To solve this problem, the present invention is connected to the vehicle bus 42 or 86 to receive a signal indicative of whether any of the vehicle's air bags have been deployed. If any of the air bags are deployed, microprocessor 26 or 66 will respond by generating and transmitting a distress paging message including the vehicle's current location in the same manner in which the system would operate when the 911 button 46 or 104 is actuated. Thus, the present invention can automatically summon an ambulance even when the vehicle occupants are unconscious, therefore increasing emergency service response time and increasing the likelihood that the occupants will survive an accident.

By proper manipulation of the provided buttons and any information displayed on display 28 or 84, a vehicle occupant may also summon a tow truck or other roadside assistance vehicles by transmitting an appropriate signal to a nearby central service center. The request for roadside assistance is handled in a similar manner that a 911 request is handled, such that GPS module 38 may provide the vehicle's current location. Additionally, a service technician may access the vehicle's diagnostic database through the system's vehicle bus interface to ascertain what may be wrong with the vehicle, and thus, what parts and tools may be required. The system may also transmit the make, model, and model year of the vehicle to the technician.

The system of the present invention may further include a database 27 stored in the RAM of microprocessor 26 or 66 or in a separate memory module. This database may include information pertaining to the driver of the vehicle, such as medical information, and information identifying the vehicle, such as the vehicle's color, make, model, and license number. Thus, the present invention may transmit the medical information stored in database 27 to a responding ambulance or it may transmit the information identifying the vehicle to the police if the vehicle is stolen.

In the event a vehicle is stolen that incorporates the present invention, the police may transmit a signal to the vehicle, causing the vehicle to transmit a signal back to the police identifying its current location and heading. The current location may be provided by GPS module 38 or 77 and the heading may be provided from compass module 30 or 87 or from information obtained from GPS module 38 or 77 over a course of time utilizing a triangulation method. Thus, the police may pinpoint and track the location of a stolen vehicle and determine its speed using the system of the present invention. The police may also transmit information identifying the location of the stolen vehicle to their police cars in the area if they are equipped with the system of the present invention. Further, utilizing the interface to vehicle bus 42 or 86, the present invention may immobilize the stolen vehicle upon receipt of a proper control signal sent from the police. Thus, the present invention provides significant improvements in vehicle security and retrieval of stolen vehicles. Preferably, microprocessors 26 and 66 are appropriately programmed to respond to an activation of the vehicle's alarm system via vehicle bus 42 and 86 so as to immobilize the vehicle or otherwise alert the police and/or owner if the vehicle alarm has been tripped.

For vehicle owners that loan their vehicle to friends and family members, the present invention offers the advantage of allowing the vehicle owner to track the location of their vehicle. Thus, a parent loaning their vehicle to a child may track the location of the vehicle and hence the location of the child using the vehicle location tracking features of the present invention. For example, an owner may send a signal to the vehicle's communication and control system via the owner's home or office PC 5 (FIG. 1A) and subsequently receive a signal back from the vehicle identifying its location. The location may then be displayed on a map on PC 5.

The present invention further allows for the receipt and display of text messages on displays 28 and 84 and allows for responses to be transmitted back to the source from which they are generated. Predetermined responses such as "I am running late," "I am stuck in traffic," or "I will call you later," etc. may be stored in memory for ease of selection in responding to a text message. Further, voice messages recorded using the second embodiment may be played back in response to incoming text messages or telephone calls. Thus, in addition to the above features, the present invention provides a means of two-way communication at a lower cost than could be obtained with a cellular telephone. Further, one does not need to answer a telephone to receive a text message, and therefore, the present invention provides advantages over the use of a system that solely relies upon a cellular telephone for two-way communication. As will be described below, a paging system and a cellular telephone may be used in combination to obtain all the benefits of using each form of communication in a single system. For example, a paging or text message having a telephone number may be received at any time whereby the driver may subsequently press a single button causing the paging module to download the number to the cellular telephone over the vehicle bus 42 or 86 and cause the cellular telephone to automatically dial the number contained in the received paging message.

The present invention additionally allows for the receipt and transmittal of location-specific information services. For example, the driver may cause the system to transmit a message to a central service center requesting the location of the nearest ATM, hospital, or freeway on-ramp or exit, whereby the central service center determines the location of the nearest ATM, hospital, or freeway on- or off-ramp to the vehicle based upon the received vehicle location information provided through the use of GPS module 38 or 77 and pager module 34 or transceiver 70. Further, the central service center may transmit step-by-step instructions on how to get to the nearest ATM or hospital based upon the vehicle's current location. Other location-specific information that could be relayed to the vehicle occupants includes traffic reports and weather and road conditions relevant to the vehicle's current location. Additionally, in the manner described in more detail below under the heading "Detailed Description of the Last Exit Warning Function," the vehicle's fuel level may be determined and the distance-to-empty mileage computed such that the system then transmits the signal to a central service center identifying the vehicle's location and distance-to-empty and receives information back identifying the last exit on a highway at which fuel may be found before the vehicle's fuel tank is empty. Thus, the vehicle driver may be warned when he or she is approaching the last exit to obtain fuel.

The present invention may also be used for providing navigational information to the driver based upon the vehicle's current location and upon a desired destination. In this manner, the driver may identify the desired destination and transmit this destination in an RF signal that also includes the vehicle's current location derived from the GPS module 38 or 77. A central service center receiving this message may then generate a step-by-step set of directions for reaching the desired destination and transmit this information to the vehicle in a return RF signal. The information may then be displayed one step at a time on display 28 or 84 in the view of the driver or if not in text form, may be played back over speaker 81. This information may be continually updated by transmitting additional location identifying signals to the central service center so that the driver may be warned if he or she is about to miss a turn or exit. Alternatively, location codes may be transmitted with each step of the step-by-step instructions such that the steps may be displayed or played back when the vehicle has reached a location requiring a new instruction, such as "turn left here," as determined by GPS 38 or 77. Further, in the event the driver is lost, the driver may inform the vehicle's system of this fact such that the system transmits an RF signal to a central service center which identifies the location of the vehicle and provides step-by-step instructions to the desired destination from the vehicle's current location. Additionally, the system may store the directions in memory such that upon selection by the user, the directions back from the vehicle's location to its original location will be displayed on display 28 or 84 or played back over speaker 81. The system may further store directions for frequently traveled routes such that the driver may simply recall them from memory and have them displayed on display 28 or 84. By obtaining traffic reports, the present invention may be used to warn the vehicle driver of traffic delays and to provide step-by-step alternate routes to any desired location.

As can be seen from the foregoing, the present invention provides many desirable features for businesses that have fleets of vehicles. Specifically, the ability to interactively receive traffic reports on demand and the ability to track the fleet's vehicles would provide a competitive advantage to businesses such as taxi cab companies. Further, by providing the vehicle systems with a remote assistance button that may be actuated in the event of an emergency, taxi cab drivers will feel more secure while driving in unsafe areas.

In the event the vehicle is provided with a self-diagnostic system that is connected to vehicle bus 42 or 86, the present invention may be used to allow for remote diagnostics to be performed on the vehicle. Thus, for example, when a vehicle has broken down along side a remote highway, a service station may transmit an RF signal to the vehicle prompting the vehicle's system to transmit an RF signal back including any self-diagnostic information such that the tow truck responding to a request for roadside assistance may be properly equipped with the right tools to provide for the most-appropriate roadside assistance on the particular make and model vehicle requesting service.

The present invention may also provide for remote control of the vehicle's accessories in response to an appropriate RF signal. For example, in the event the driver has accidentally locked his or her keys in the vehicle, the driver may simply call the service center to have a control signal transmitted to their vehicle causing their doors to unlock. Further, if the vehicle owner has parked his or her vehicle in an airport parking lot and subsequently realized the doors were not locked, the owner may call the service center and have the center transmit an RF signal causing the doors to lock or possibly causing the windows to be rolled up in the event it begins to rain. Another remote control function that may be advantageous is to have a signal transmitted to the vehicle causing its horn to honk at periodic intervals to allow its owner to find it in a crowded parking lot. The detailed operation of the present invention for performing these functions is described below under the heading "Detailed Description of Vehicle Personalization and Remote Control Functions."

Yet another function performed by the present invention is to allow vehicle accessories to be reprogrammed in response to an RF signal such that the vehicle accessory operations may be personalized for each individual driver. For example, the vehicle may be programmed so as to recognize different drivers based upon a signal transmitted from a remote keyless entry (RKE) key fob and thereby move the seats and mirrors into a position last used for that particular driver. Due to the increasing number of available electronic options in vehicles, a large number of possibilities exist for controlling vehicle accessories and the need for personalizing the operation thereof dramatically increases. The manner by which the present invention reprograms the manner in which various vehicle accessories and functions are controlled is described below under the heading "Detailed Description of Vehicle Personalization and Remote Control Functions."

3. Alternative Display/User Interface Configuration

With the increasing use of microprocessors in vehicles for a variety of vehicle control functions, interaction between the vehicle operator and the microprocessor for programming options and the like is frequently necessary. Although a keyboard can be employed, it requires an excessive amount of space in a vehicle such as an automobile. If a numerical keypad is employed, such a data entry system requires the operator to understand for each command to be entered the corresponding numerical entry number or numbers to carry out the desired command. Further, the use of a keyboard or keypad, particularly if the vehicle in operation is very distracting, could result in inattentiveness to driving functions.

A voice-actuated control system has been proposed and is represented by U.S. Pat. No. 4,827,520 issued on May 20, 1989, and assigned to the present assignee. Although such a system provides hands-free control of a variety of vehicle options utilizing a microprocessor, it requires training to each one of the vehicle operator's voices and somewhat complicated and expensive electronics at current levels of technology.

The system of the present invention overcomes the difficulty of entering data or vehicle control commands for vehicle programming and operation by providing a visual display of either icons, alphabet letters, numerals or a combination of visual and alpha-numeric information and allows the user, by using a reversible control, to select an icon or other displayed control or data element and subsequently enter the element with a push-button switch. This information entry sequence thus provides a vehicle operator with a display of selectable information, allows the operator to easily select the desired information and subsequently enter such information for carrying out the associated function.

In an embodiment of the invention, the information displayed is provided in an overhead console and the operation information entry controls are located at the forward edge near the top of an armrest console where they are conveniently located and readily available to the operator. In one embodiment, a rotary left-right switch is provided to allow the operator to move a cursor or display information in a display window to select a desired command function before entering the command to be executed. In some embodiments of the invention, an array of icons or alpha-numeric displays are simultaneously displayed and the operator moves a cursor to the selected item after which an enter switch is actuated to carry out the command selected. In other embodiments, a window is provided in which different alpha-numeric characters are selectively displayed utilizing the rotary switch. When the desired window shows the command function to be carried out, the enter switch is actuated.

Central to each of the different types of data entry, however, is the utilization of a conveniently located control for selecting information which is displayed to the operator without the necessity of utilizing operator manuals or the like thereby providing a user-friendly data and command control entry system for vehicle programming such as personalization of accessories, telephone operation, reading of messages received from a paging system, the selection of compass and trip information or navigational instructions.

Referring to FIGS. 7 and 8, there is shown the interior of a vehicle such as an automobile 110 including a centrally-located armrest console 112 having a switch assembly 120 which is conveniently located for use by the operator in selecting information to be displayed and entered in cooperation with the display 170 mounted in an overhead console 150 (FIG. 9). The armrest console includes an upper arm supporting surface which may be in the form of a padded cover 114 pivotally mounted to the walls defining a storage compartment 115 located below cover 114. The armrest console 112 is centrally located between the front seats of the vehicle. The armrest console may also include a collapsible cupholder assembly 116 shown in an extended use position and which slides into and out of the storage compartment 115 for use.

The armrest console integrally includes a forward housing 118 located at the front upper edge of the console 112 and which houses a switch assembly 120 comprising four switches 121, 122, 123, and 124. Housing 118 includes a forwardly and downwardly inclined wall 119 into which the switch assembly 120 is mounted. Each of the switches, which are shown in greater detail in FIG. 10, include exposed switch control surfaces with switch 121 having a push-button 131 with the letters "ENT" for "enter" embossed thereon upside down so it can be read by the vehicle operator looking downwardly on the switch assembly 120 from above. The enter switch provides an enter command for currently displayed data or command information selected by the operator using switch 122. Switch 122 is a rotary switch and includes a rotary knob 132 for controlling the motion of the switch to the left or right as viewed in FIG. 8 which in turn moves a cursor on the display 170 or otherwise changes displayed data or control information to be acted upon by the operator. Switch 123 includes a push-button surface 133 which is embossed by the letters "PREV" standing for "previous screen," the function of which is to control the display to display the previous screen as described in greater detail below. Finally, switch 124 includes a push-button surface 134 with "EXIT" embossed thereon for providing an exit command function for the system. The facing edges of switch contact surfaces 131 and 133 are concavely recessed at 135 as seen in FIG. 8 to provide greater accessibility to the disc-shaped control knob 132 for switch 122.

As seen in FIG. 9, the vehicle 110 also includes an overhead console 150 which is mounted to the roof 152 of the vehicle near the front windshield 113 and between the front window visors such as visor 111 which is the passenger side visor as seen in FIG. 9. Console 150 includes a pair of covered storage compartments 154 and 156 with compartment 154 providing sunglass storage and compartment 156 housing, for example, a universal garage door opening transmitter. The console 150 may also include map reading lamps 153 and 155 and provides at its forward end a downwardly inclined bezel 160 housing a display 170 and a four push-button switch assembly 220 which parallels to some extent the switch assembly 120 on the armrest and can be used for the same or similar control functions interchangeably. Thus, a push-button select switch 222 is provided which moves a cursor of the display 170 only to the right as opposed to moving the display left or right as provided by the counter-part rotary switch 122. An "enter" switch 221 corresponds to switch 121 for the entry of a selected command while to the right of the display 170 is a "previous" switch 233 and an "exit" switch 234. The display is preferably a vacuum fluorescent or LCD display capable of providing alpha-numeric display information as well as providing graphic displays such as the icons shown in FIG. 9 or the text message shown in FIG. 22.

In FIG. 9, for example, there is displayed the "home" screen display which is five icons 161–165 with icon 161 corresponding to personalization, icon 162 corresponding to a telephone control subroutine, icon 163 corresponding to a page message reading subroutine, icon 164 corresponding to a compass and odometer display subroutine, and icon 165 corresponding to a navigation and route information subroutine. As can be seen in FIG. 9, icon 165 which comprises a pictorial representation of the earth in a rectangular field has the background field illuminated indicating that this icon is currently being highlighted and therefore selected by the operator. Movement of switch 122 by the rotary knob 132 will cause the highlighted icon to change with movement of the switch 122 to the left or right scrolling around to the other end if passing the endmost icon. Switch 222, if actuated, will continually move the icon highlighted to the right and which scrolls around to the left edge after icon 165. Display 170 can provide the display not only of the icons programmed into memory to correspond to subroutines for computer operation but also alpha-numeric information describing the selected or highlighted icon as for example shown in FIG. 11.

The electrical circuit for implementing this data entry system is disclosed in U.S. Pat. No. 5,555,172. Switch 122 is a rotary switch which provides sequential contact closure signals on conductor 125 (FIG. 10) as the knob 132 is rotated to the left by the operator and sequential contact closure signals on conductor 127 as the knob 132 is rotated to the right. The knob can be continuously rotated to provide as many movement control signals for the cursor associated with display 170 as desired and as described below. Switch 122 can be a commercially-available Alps Model No. RK09710H. The display is a 32×128 pixel vacuum fluorescent display which has sufficient resolution to provide the display icons as shown in FIG. 9 as well as other data such as the text message shown in FIG. 22 and the other various screens as explained in greater detail below.

Figure 10:
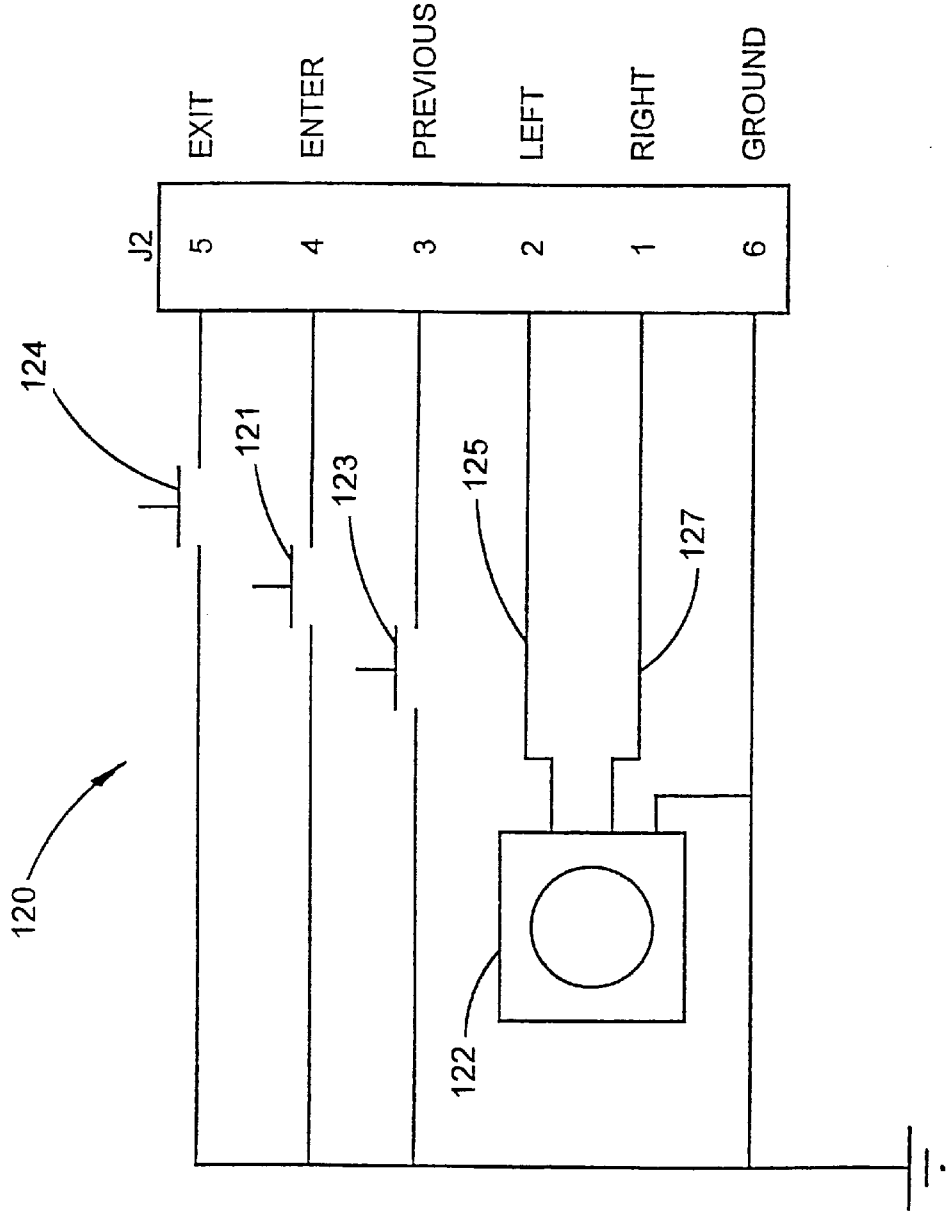
FIG. 10 is a schematic circuit diagram of the data entry switches shown in FIGS. 7 and 8 and in block form.

Turning now to FIG. 10 there is shown the switch assembly 120 which is mounted to the armrest 112 as seen in FIGS. 7 and 8. The switch assembly includes momentary push-button switches 121, 123, and 124 corresponding to the "ENTER," "PREVIOUS," and "EXIT" commands and the rotary momentary make and break switch 122 which, depending on the direction of rotation, either provides a momentary left to ground circuit or right to ground circuit to the conditioning circuit and subsequently to a microprocessor. The microprocessor responds to command signals from switch assembly 120 to provide the desired information or control functions as now described in conjunction with the display screens and flow diagrams of FIGS. 11–24. The microprocessor provides stored display information written into a ROM memory when called upon. The program loops through the main program checking the closure status of each of the switches of switch assemblies 120 as well as checking for input data from either a compass circuit, text messages which may be received by the RF transceiver, or navigational data received through a navigation circuit module coupled to the microprocessor.

Upon receipt of operator inputted commands as described in connection with FIG. 16, the microprocessor outputs control signals for the operation of the cellular telephone. As one of these data interrupts occurs, the appropriate subroutine is called up for processing and storing the data. A compass circuit which can be employed with the microprocessor is disclosed in greater detail in U.S. Pat. No. 4,953,305 issued on Sep. 4, 1990, the disclosure of which is incorporated herein by reference. The personalization circuit and RF transceiver circuits and their programming are also disclosed in detail below.

Initially, the main program displays the home panel which is seen in FIG. 9 as the primary display with the five icons representing personalization, telephone, page, compass, and navigation. One of the icons will be backlighted or highlighted indicating that it is the selected icon which can be controlled by actuation of the "ENTER" switch 121. Rotation of the left/right switch 122 or alternatively depressing switch 222 causes the next adjacent icon on either side to be illuminated for selection upon actuation of the entry button.

Figures 11, 12:
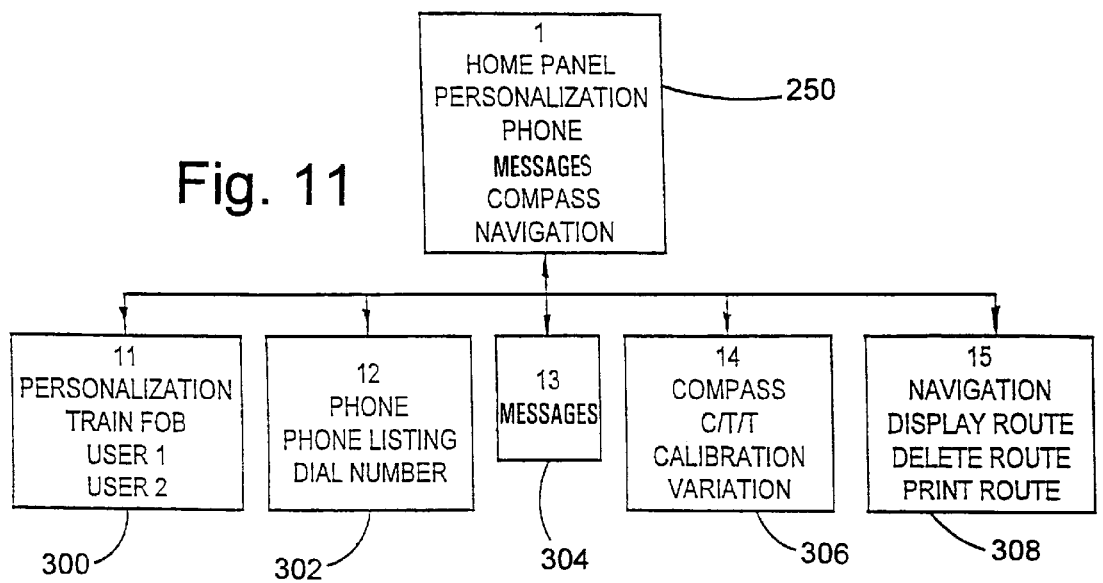
FIG. 11 is a diagram showing the various displays of an embodiment of the invention.
FIG. 12 is a diagram showing the selectable displays for one of the subroutines shown in FIG. 11.

Upon selecting one of the desired subroutines 300, 302, 304, 306, or 308 shown in FIG. 11, the program will move to the subroutine called for by actuation of the "ENTER" switch 121 or its corresponding switch 221 located in the overhead console 150. The subroutine performs the functions as controlled by the actuation of the switches in the switch assembly 120 with the display 170 providing prompting information to the operator with the use of icons or other alpha-numeric or symbolic displays. If, for example, the operator would like to select the personalization subroutine from the home panel display 290 (FIG. 11) which as seen in FIG. 9 is currently in the navigation selection position, rotary switch 122 can either be moved to the right to move the selected highlighted icon to the wrap-around position showing the personalization icon or moved to the left through the compass, pager, and telephone to the personalization icon. The "ENTER" switch 121 is then actuated to call up the personalization subroutine 300 (FIG. 11) shown in greater detail in FIG. 12.

Turning now to FIG. 12 which shows the display screen and an outline of the programming for the personalization subroutine 300, upon selection of the personalization icon from the home display 290, the program reads the stored information which is applied to display 190 to display the personalization selections indicated by block 310 in FIG. 12. This display information is stored in ROM memory and switch 122 is rotated to select either user 1, user 2, or the train fob icons which are displayed in display 190 as indicated by panel 310 of FIG. 12. Once the desired highlighted selection is made, the "ENTER" switch 121 is actuated to inform the computer which of the three subroutines to call up to train for personalization functions. These include in the embodiment shown, user 1 subroutine 312, user 2 subroutine 314, or training for use of the RF keyless entry fob 316. At this time, the display 190 will display the personalization icons identified in block 318 of FIG. 12 which may be, for example, graphic representations similar to that shown in FIG. 9 except displaying, for example for seat personalization, a pictorial representation of a seat, a lock for the door lock/unlock personalization function, a radio for the stereo select functions and a thermometer for the climate control functions.

Thus, actuation of the "ENTER" switch 121 when display 170 is displaying the selections shown in block 310 will advance the display to the next displayed screen 318 displaying to either user 1 or user 2, the selections available. The train fob subroutine 316 shown in FIG. 12 is selected if it is desired to train a keyless entry-type RF transmitting key fob such that various codes available by the actuation of switches on the key fob can be programmed to control various vehicle personalization functions. The programming for training the keyless entry fob and the various personalization functions can be done using a variety of conventional programming methods. One programming system for the personalization of the various vehicle options and training of a key fob is disclosed in U.S. Pat. No. 5,278,547 issued Jan. 11, 1994, the disclosure of which is incorporated herein by reference.

At any time during the programming of the vehicle personalization features, the programming can be terminated storing the selected features by pressing the "EXIT" switch 124 which returns the program to display the home panel 290 (FIG. 11). The data selections entered prior to such time by the actuation of "ENTER" switch 121 in response to displayed operational choices will have been stored in the computer RAM memory. Decisions which are made can be reversed by pressing the "PREV" switch 123 which allows the operator to return to a display prompted decision and enter the desired choice of data.

In response to the displayed icons at block 318, the operator, who may either be user 1 or user 2 in the embodiment disclosed, selects one of the four example categories by rotating select switch 122 or pressing its corresponding switch 222 on the overhead console to highlight the selected icon and then presses switch 121 for controlling the computer to move to the subroutine selected. The subroutines shown in the preferred embodiment include seat personalization 320, door lock and unlock 322, preset radio control functions (i.e. stereo features) 324, and climate control presets 326. Other personalization options such as rearview mirror, side view mirror controls and the like also can be incorporated in the system of the present invention utilizing conventional programming techniques. If the seat personalization subroutine 320 is called for, the computer will, upon receiving a command signal from the information corresponding to the highlighting of the seat personalization icon by movement of switch 122 and the entry command signal from the actuation of switch 121, display to the vehicle operator prompting information necessary to preset electrically operated and adjustable vehicle seats where desired.

Thus, display 170 may prompt the operator to manually adjust the seat by actuation of the normal electrical seat control switches to a desired position and once that has been accomplished actuate switch 121 to store the seat position information obtained from the movement of the seat to the desired position in computer memory. When this is accomplished, the entry of the seat position information by the computer will allow the program to move back to the personalization loop looking for new input commands from switch assembly 120 while displaying display screen 318 to allow the operator such as user 1, to select another item for personalization. As will be described herein in greater detail below, the data entry system available through the use of rotary switch 122 and display 170 however provides greater flexibility than merely highlighting an icon for entry and the subsequent entry of data selected.

The utilization of the rotary switch 122 also can be employed for providing specific alpha-numeric messages which can be stored in the computer and subsequently recalled, for example telephone numbers, addresses, and the like, for use in connection with the cellular telephone and navigation systems of the vehicle. As an example of the data entry available with the system of the present invention, for example with the stereo features subroutine 324 which can be called up from the personalization icon display 318, preset frequencies can be entered into the system utilizing switch assembly 120 as described in connection with FIGS. 13–15. Referring to FIG. 13, there is shown one display for providing operator prompting information to the vehicle operator for selecting any programming preset frequencies in the vehicle's stereo system. Selection of the stereo features icon from block 318 of FIG. 12 will display a new menu of options to the operator including volume presets, bass and treble controls and other control functions including the frequency band and station presets illustrated in FIGS. 13–15. Preset stereo system receivers are well-known and as is the presetting of a variety of frequencies therein, this system however provides for the use of the relatively easily operable rotary switch 122 and display system in connection with the data entry system for presetting AM and FM frequencies.

Referring initially to FIG. 13, there is shown a typical operator prompting display for preset number 1 for receiver programming. The display prompts the operator to select AM or FM bands by providing at least one predetermined location on the display 170 defining a display window 328 which contains initially the letter "A" therein as called from the computer memory look-up table associated with the programming subroutine for the stereo receiver. As seen in FIG. 14, this subroutine is started as indicated by block 332 and actuation of rotary switch 122 can move the alphabet characters up the alphabet (to the right) if rotated to the right as indicated by block 334 or down (to the left) as indicated by block 336. Inasmuch as only two choices are required (an "A" or an "F") only these two letters need be available for this subroutine, it being understood that for other subroutines, the microprocessor memory provides for the scrolling through a selected window the entire alphabet. With "A" being displayed in window 328, if the operator wants to select an FM band preset for position 1, switch 122 is rotated in this case in either direction to display an "F" in window 328. At this time, the operator actuates "ENTER" switch 121 and the program enters the selected data into memory and responds to the selected "F" to provide the next selected display screen of FIG. 15 for FM frequencies. The program subroutine for scrolling through the available or necessary letters or number is shown in FIG. 14 where the initial character to be selected is controlled by the operator actuated switch 122.

The program looks for an alphabet right command 334 and when received, the next available letter is highlighted or entered into the window 328. It then moves through the loop again looking for closure of one of the switch contacts for switch 122 in either direction or actuation of the "ENTER" switch 121 storing the highlighted letter or number. Thus, the program loops through decisional blocks 334–344 by which the program looks for the movement of rotary switch 122 to move the displayed letter of the alphabet either up or down in the alphabet and entering the selected letter or other character. When the desired letter is being displayed in block 328, "ENTER" switch 121 is actuated as indicated by block 342 and this data is entered into the computer memory corresponding in the example to the first letter of the selected frequency band. In the case of the second letter, since it will always be an "M," "M" will be automatically displayed. Upon entry of the "A" or "F" in window location 328 and the subroutine will then move to the next subroutine setting forth the digital information corresponding to the FM frequency selection in a similar fashion prompting blocks of numbers corresponding to four-digits for FM or three-digits for AM are displayed. Thus, upon actuation of the "ENTER" switch 121, the highlighted letter is entered into computer memory as indicated by block 344, and the program exits the loop of FIG. 14 and goes to another similar subroutine for selecting the desired FM frequency and displays the selection screen shown in FIG. 15.

In FIG. 15 four blocks of frequency indicating numbers are displayed and the subroutine prompts the operator to select an appropriate digit for each location in the display for subsequent entry into the computer in a manner similar to that described in connection with the band selection of FIGS. 13 and 14. Thus, initially window 329 will be highlighted and switch 122 moved left or right to increase or decrease the digit displayed. Upon entry of the data by actuation of switch 121, the next window 331 will be highlighted and the process repeated until data for the four possible frequency selection windows 329, 331, 333, and 335 are selected. The program will provide a test to determine when the last frequencies digit has been entered and when completed increment a counter to initiate programming of preset number 2 by returning to the subroutine of FIG. 14.

Thus, the select and entry system available with the use of rotary switch 122 provides a highlighted display window through which alpha-numeric or other character information can be scrolled by the actuation of switch 122 either by increasing or decreasing numbers displayed in the select block or by going up or down the alphabet for alphabetical information being displayed. Upon actuation of the enter switch, the selected information is entered into the computer memory for use either in controlling the desired operation or, for example, providing message information or, for example also, phone listing information, address information, or the like. Any desired alpha-numeric information may thereby be entered into the computer (i.e., the microprocessor memory 198) using the data entry system and the select and enter method described in connection with FIGS. 13–15. As will be described hereinafter, another operator prompting and data entry technique is also available employing the data entry system of the present invention.

As can be appreciated in connection with the entry of preset frequencies as shown in FIGS. 13–15, once the selected frequency has been entered, the last digit entered will inform the computer to move to the next available preset address and once the last address is completed, the display prompt will so indicate to the operator and allow the selection of the other frequency band or ask if any of the presets need to be changed which, again, can be selected by scrolling through a display of a number corresponding to a particular preset or particular display frequency band.

Another of the selectable options from the home panel 290 shown in FIG. 11 is the phone control subroutine 302. This subroutine is selected by the highlighting of the phone icon by rotating switch 122 and the actuation of the entry switch 121 or 221. This causes the program to display to the vehicle operator either icons or words as indicated by block 350 of FIG. 16 either showing a list of telephone numbers or a telephone number to be dialed. Upon selection, for example, the phone listing icon, a subroutine 352 is called up which provides a pre-programmed listing of stored telephone numbers which can be automatically dialed by the microprocessor cellular telephone interface or which list can be initiated, added to, or deleted utilizing the other data entry technique now described in connection with FIGS. 17–20.

Figures 16, 17, 18:
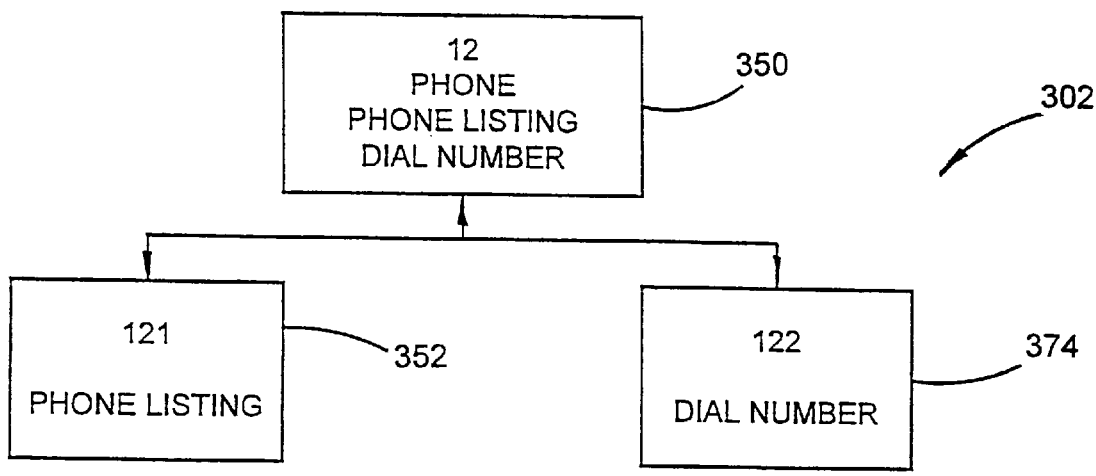
FIG. 16 is a diagram of a display for the phone subroutine shown in FIG. 11.
FIG. 17 is a diagram of the display for the phone list of the phone subroutine.
FIG. 18 is a diagram of the display of information for the entry of data using another data entry technique according to the present invention.

The phone list may take the form of display as shown in FIG. 17 with the first three names and numbers being displayed on three lines of display in display 170. Movement up and down of the display which may include any desired number of entries depending on the available memory, can be selected by rotating switch 122 to the right for scrolling down in the list or to the left scrolling up in the list or wrapping around for example entry 125, the phone list can give the name of the person to be called as well as the calling number. By controlling switch 122 and highlighting number 1 and then pressing "ENTER," the first number on the list can be automatically dialed through the coupling of the microprocessor to the cellular telephone transceiver in a conventional fashion. Entry of numbers on the list can be achieved by the data entry system shown in FIGS. 18 and 19 which is somewhat similar to the data entry system described in connection with FIGS. 13–15 in terms of ease of operation but utilizes a somewhat different display and data entry technique.

As seen in FIG. 18, display 170 will initially display a series of letters corresponding to adjacent sections of the alphabet. Rotation of switch 122 will move a cursor to highlight a desired letter for entry into the phone list. Thus, rotation switch 122, for example, to the letter "J" for the first number on the phone list will cause a cursor to highlight the letter "J" and actuation of switch 121 will enter the letter J into the first position on the phone list which can be, upon entry, displayed below line 352 and on display line 354 shown in FIG. 18. Subsequently, other letters are similarly highlighted and entered to complete the spelling of the name of the person to be called. Rotating switch control knob 132 for switch 122 to the right beyond the letter "K" as shown in FIG. 18 will cause the next successive letter or letters to appear at the right end while the preceding letters are dropped off of the left end of the displayed alphabet sequence. Actuating the "EXIT" switch 124 after the completion of the person's name will cause the display line 352 shown in FIG. 18 to display numbers corresponding to area code and telephone numbers with, instead of the alphabet being displayed the numbers 0–9 being displayed, and selectively highlighted and entered utilizing switches 122 and 121, respectively. In this manner, the operator can relatively easily spell out a person's name and number for addition to the pre-programmed phone list for subsequent auto dialing. The software programming for providing the data entry function for the phone list or other subroutine is disclosed briefly in the flow diagram of FIG. 19.

Figure 19:
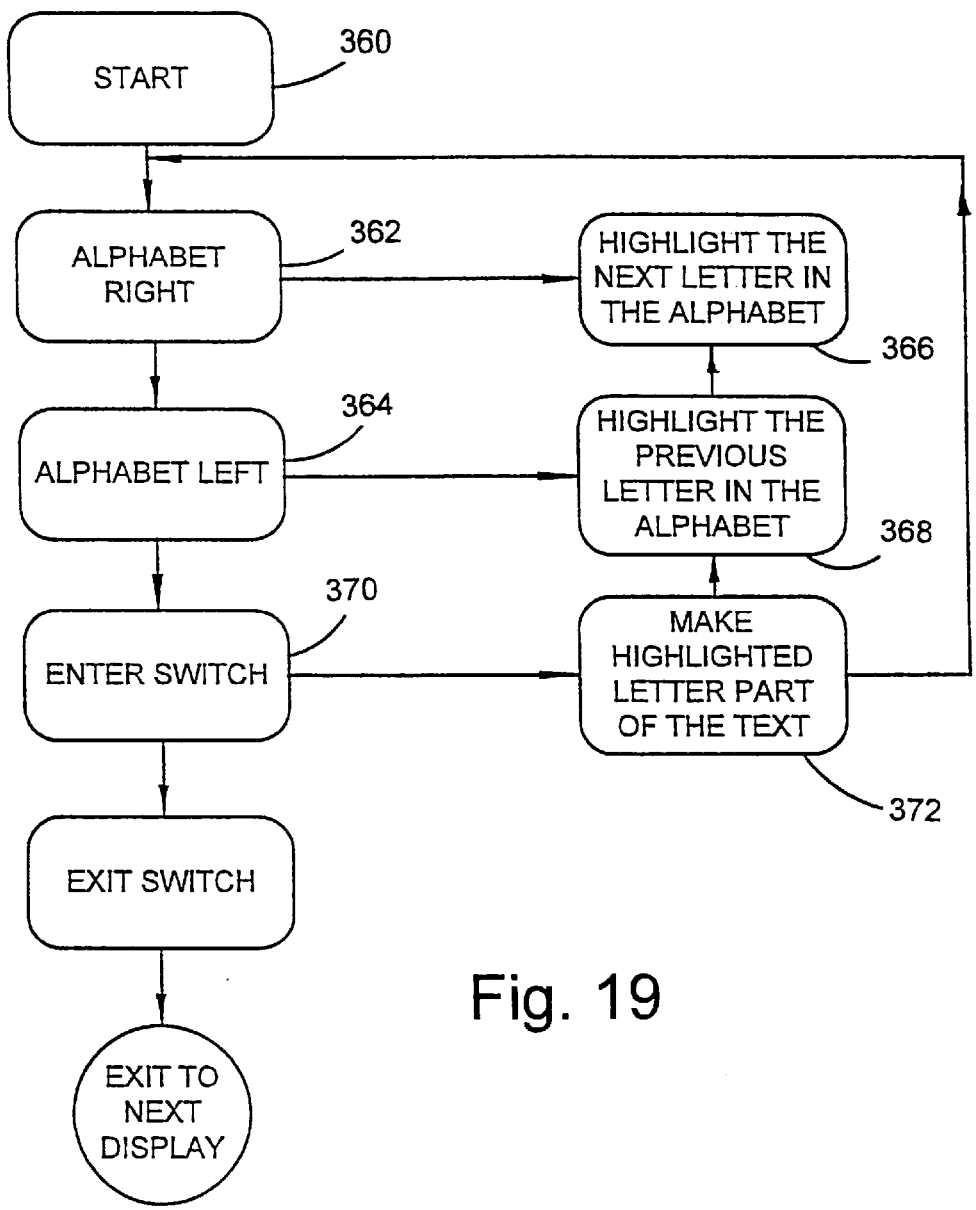
FIG. 19 is a flow diagram for the program subroutine for data entry using the display format seen in FIG. 18.

Turning now to FIG. 19, the subroutine starts as indicated by block 360 by displaying the letters "A" through "K" in the order shown in line 352 of FIG. 18. If it is desired to move the alphabet to the right or left, switch 122 is rotated as indicated by block 362 or 364, respectively, which causes the highlighting of the next or previous letters as indicated by blocks 366 and 368, respectively. Once the desired letter has been highlighted, the "ENTER" switch 121 is actuated as indicated by block 370 and that data corresponding to that selected letter is entered into the text as indicated by block 372. The process is then repeated until the desired name is completed at which time the "EXIT" switch is actuated causing the program to exit to the next screen display where the number line is displayed for similarly selecting the desired telephone number. Upon completion of the desired number, the program will move to the next entry in the phone list so it can be similarly programmed.

Figure 20:
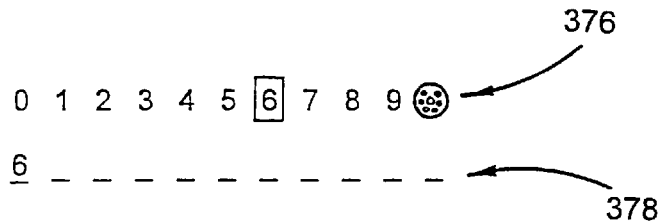
FIG. 20 is a diagram of another display used for the entry of data in the phone dial number subroutine.

If the operator, however, desires to directly enter a number for dialing without reference to the phone list, the subroutine shown in FIG. 16 as block 374, if selected, allows the direct entry of a number utilizing a similar data entry system as shown in FIG. 20 in which the digits 0–9 are displayed on line 376 and the cursor highlights a selected number as, for example, number 6, for entering into the number-to-dial line 378. Once the desired number has been so entered, the "dial" icon can be highlighted and the enter switch actuated to effect dialing of the cellular phone for placing the desired call. The interface circuitry for coupling to the cellular telephone is well-known and conventional.

Figure 21:
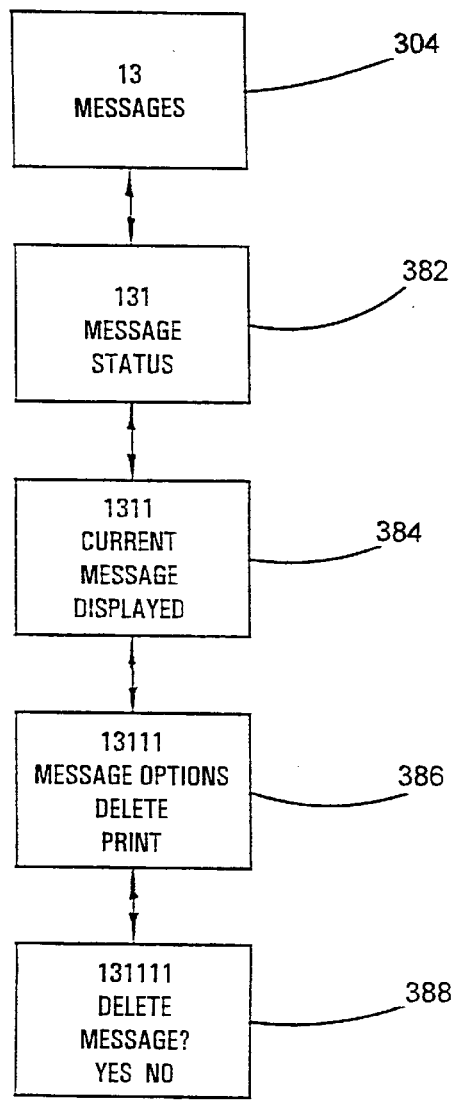
FIG. 21 is a diagram of the displays for the messaging subroutine.

If desired, display 170 can be employed for displaying received text messages. Further, the vehicle may include a small dot matrix printer for providing a hard copy of a text message. If the operator selects the text messaging subroutine from the home panel 190 (FIG. 11), the text messaging subroutine 304 shown in FIG. 21 is called up. This will cause the display 170 to display an initial current text message panel 382 which will list a number of text messages received by the RF transceiver and highlight whether or not the text message has been received. This can be done, for example, by blinking the paging number corresponding to an unread text message. The switch 122 can be rotated to highlight any one of the received text messages for reading. This is achieved by actuating the "ENTER" button to display the selected text message as indicated by block 384 in FIG. 21. FIG. 22 is an example of a text message which has been received and is being displayed. Rotation of switch control knob 132 and actuating the enter switch provides the microprocessor with data as to which block of the program sequence is performed next. As indicated by block 382, unread text messages can be indicated by the blinking of the text message number for such text messages.

Once the text message has been read, upon highlighting the desired icon shown in FIG. 22 and actuation of the "ENTER" switch, the text messaging option panel 386 allows the operator to delete the text message, which provides a redundant decisional display indicated by block 388 asking the operator a second time whether he or she wishes to actually delete the message. Thus, the text message will not be deleted unless two conscious decisions are made to delete the message. The operator may also opt to have the alpha-numeric message printed by a printer. Moving the cursor to highlight the icon of display panel 386 for the printer or the word "Print" and actuation of the "ENTER" switch 121 will effect the printing of the message by the printer which can also be installed in the console 112 near the switch assembly 120.

As shown in FIG. 23, the vehicle operator can select the compass subroutine 306 which allows the selection of compass, temperature, and trip display information as indicated by block 390, calibration control as indicated by block 392 which may include prompting calibration messages as indicated by block 394 or variation correction as indicated by block 396 allowing for variation correction of the compass according to a variation zone prompting message 398. The compass selection primary display 305 allows the selection of these various subroutines.

Finally, the operator may select the navigation subroutine 308 shown in FIG. 24 which in its elemental form may include a route display selection 402, a delete route selection 404, or a print route selection 406. The navigation circuitry 250 may include a suitable memory for storing navigation information and include, for example, a CD reader with CD stored maps and route information which can be selectively accessed using switch assembly 120 including the rotary switch 122 for controlling the displayed selection according to either of the two data entry techniques described above, that is providing a window through which either alpha or numeric information can be scrolled for selection or entry or by displaying a sequence of alpha-numeric information and moving the cursor to a selected one for entry to control subsequent information provided on the display or enter commands into the microprocessor for control or storage. The navigation system 250 may also include a GPS receiver so that the vehicle's actual location can be known and routing information to, for example, a selected address provided by entering the address in one of the manners set forth in FIGS. 13–17 to provide a desired route display as indicated by block 402. If a route has been used and it is desired to delete the route, it can be deleted by selecting the delete route icon of block 400 and actuating the "ENTER" switch 121 for deleting the route which will require two actuations to make certain that the route is not inadvertently deleted. Finally, the directions for providing routing information can also be printed by selecting the print icon and actuating the "ENTER" switch to print the sequential directions for the route using printer 280.

The data entry system of the present invention provides a user-friendly structure and method by which data can be selected for entry into a microprocessor for a variety of control and informational purposes. By providing a rotary switch or equivalent control, data can be more easily entered without the need for an alpha-numeric keyboard which would require excessive space in the vehicle for permanent installation and provides relatively easy and understandable operation for those who otherwise may not be familiar with data entry systems. It accomplishes this by providing a selectable prompting display and data entry in response to the display to provide control and informational data to and from a microprocessor for use in controlling and programming vehicle options and accessories. As described in the section immediately below, the display may be mounted in various other locations in the vehicle and may be a heads-up display that projects the displayed information in the driver's line of sight.

4. Alternative Display Configurations

It is desirable to provide the vehicle communication and control system with a message display system which is readily visible to the vehicle driver and does not interfere with the driver's field of vision. It is also desirable to provide such a display which is easy to read in all ambient light conditions. The present invention provides a message display system including a display positioned in the vehicle windshield area at a location which is readily visible to the vehicle driver while not interfering with the driver's field of vision.

According to one aspect of the invention, the message display system is provided in a housing adapted to be mounted in the windshield area of a vehicle. The system includes a display device positioned on a housing, a receiver which demodulates a detected RF signal, and a controller which generates display control signals responsive to the output of the receiver. The display device is responsive to the control signals for displaying the message.

According to other aspects of the invention, the display device is positioned on a rearview mirror housing, an A-pillar housing, an overhead console, or a visor. The display device may be implemented using a vacuum fluorescent display or a dot matrix display.

The message display system is thus adapted to be mounted in a vehicle such that the message is displayed in the area generally in front of the driver and does not interfere with the driver's field of view. The message display system may be provided as part of a vehicle accessory, such that the message display system is assembled to the vehicle with the accessory. The message display utilizing a vacuum fluorescent display is readily visible in all ambient light conditions.

Vehicle 412 includes a message display system 416 (FIG. 26) in rearview mirror assembly 418 (FIG. 25), which includes a housing 430. The vehicle also, conventionally, includes an A-pillar 421, a steering wheel 423, an instrument panel 427, a windshield 425, sun visors 429, 431, and a headliner 438. The mirror assembly 418 includes a support 437 which may be connected to a connector 434 in the vehicle roof structure.

The message display system 416 includes a RF receiver 420 (FIG. 26) which demodulates the RF signal A from land station 410 and outputs a digital control signal. A microcontroller 422 is coupled to receiver 420 and is responsive to the digital control signals output from the receiver for generating display control signals when a message such as a paging message is received. A display source 424 is coupled to the microcontroller 422 and receives display control signals therefrom. Receiver 420, microcontroller 422, and display source 424 are mounted in housing 430 of rearview mirror assembly 418. Accordingly, a message display system 416 is provided in rearview mirror assembly 418 to display a message for the driver.

The RF signals A are of the type conventionally utilized for RF signals transmitted from a land-based station 19 (FIG. 1A). The message may include only numerical information if it is originated at a conventional telephone subscriber station 15. Alternatively, if the message is generated at a telephone subscriber station 15 having an alpha-numeric input (e.g., a computer keyboard), the message may include alpha-numeric message information from the originating party. The RF signals A typically have a frequency range from 137 to 175 MHz (VHF band) or within the frequency range 405 to 513 MHz (UHF band). The signal format and land-based station are described in greater detail below under the heading "Detailed Description of the Vehicle Personalization and Remote Control Functions."

Receiver 420 (FIG. 26) includes an antenna 426 which detects the RF signals from land-based station 19. RF receiver 420 demodulates the signals detected by antenna 426 and conditions the demodulated signal to have digital levels appropriate for decoding in the microcontroller 422. Microcontroller 422 is preferably implemented using a Motorola MC68HC05 microcontroller, which is commercially available from Motorola Corporation. However, any suitable microcontroller may be utilized. In general, microcontroller 422 receives and decodes the data signals output from the RF receiver 420. If the message is a text message for the vehicle in which the system is mounted, the microcontroller is responsive to the text message for generating a serial display control signal which is communicated to display source 424 through a serial data link 428. Additional details of RF receiver 420 and microcontroller 422 are described below under the heading "Detailed Description of the Vehicle Personalization and Remote Control Functions." System 416 may be a two-way pager as described in U.S. Pat. No. 5,153,582.

Display 424, according to this embodiment, is a vacuum fluorescent alpha-numeric display. The alpha-numeric display may be advantageously implemented using a commercially-available Noritake CU2055CPB-52A, which is a reconfigurable 20-character vacuum fluorescent display. The Noritake display includes a serial input and integral display driver components. Although the Noritake display includes integral display driver components, those skilled in the art will recognize that any suitable commercially-available vacuum fluorescent display may be utilized. If the display does not include an integral display driver circuit, a suitable commercially-available driver circuit may be used to generate appropriate signal levels for the display. A vacuum fluorescent display is preferred because it generates a particularly bright image which is clearly defined and readily decipherable in all ambient light conditions. However, other display devices could be utilized, such as LED and/or back-lit LCD displays.

Figure 25:
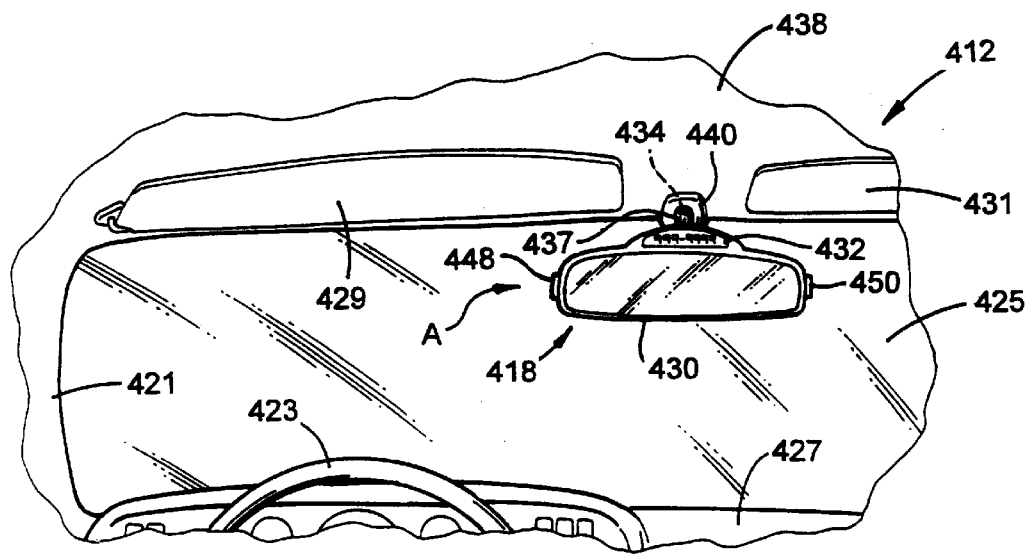
FIG. 25 is a fragmentary perspective view of the windshield area of a vehicle including a message display system according to another embodiment of the invention.
Figure 26:
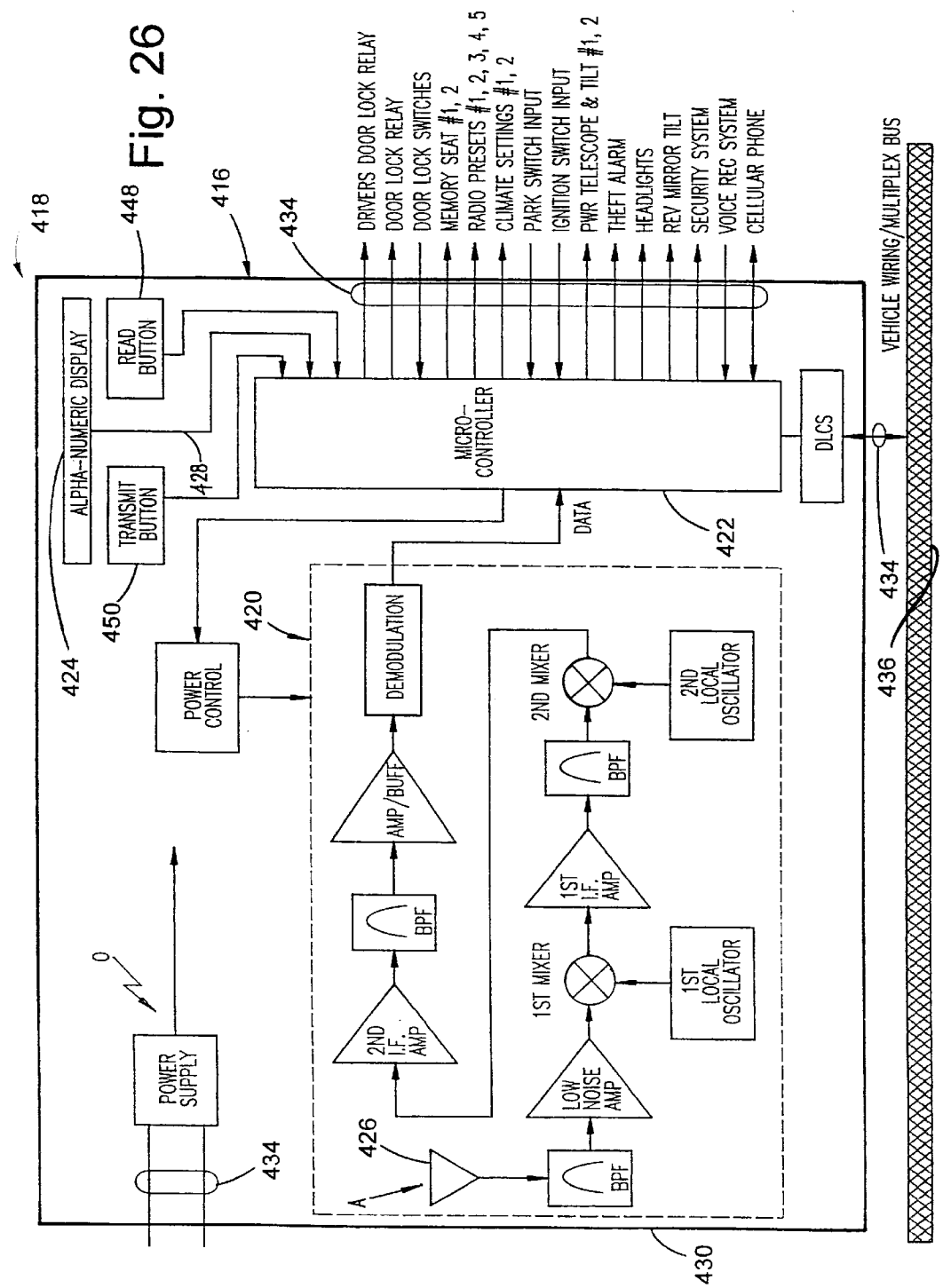
FIG. 26 is a block electrical circuit diagram of a vehicle message display system according to an embodiment of the invention.

With reference now to FIGS. 25 and 26, RF receiver 420, microcontroller 422, and display source 424 are positioned in the housing 430 of rearview mirror assembly 418. A particularly advantageous rearview mirror assembly which may be utilized is disclosed in U.S. Pat. No. 5,475,366, the disclosure of which is incorporated herein by reference thereto. This rearview mirror assembly may be advantageously implemented using the modular mirror connector disclosed in U.S. Pat. No. 5,455,716, the disclosure of which is also incorporated herein by reference. A detailed description of the rearview mirror assembly 418 is found in the above-incorporated patent. However, a general description of rearview mirror assembly 418 follows.

Assembly 418 includes at least one circuit board (not shown) positioned within the mirror housing 430 and on which receiver 420, microcontroller 422, and display source 424 are conventionally mounted. A reflective surface 432 is positioned above the display (e.g., the vacuum fluorescent display 424) at an angle of approximately 45° with respect to the plane of the display surface of the display. The image from display 424 is reflected on surface 432 such that a driver looking at the reflective surface can read the reflected image. The paging message display system 416 mounted in housing 430 is connected through a wiring harness 434 to vehicle bus 436, which is positioned in the vehicle roof structure above headliner 438. If the mounting assembly disclosed in U.S. Pat. No. 5,455,716 is utilized, the rearview mirror assembly 418 includes a mirror support 437 removably connected to connector 440. The mirror assembly is attached to the vehicle as an optional accessory by plugging the rearview mirror support 437 into connector 440. Details of the mirror assembly and the electrical connector are found in the above-identified patents incorporated hereinabove by reference, and accordingly, they are not described in greater detail herein.

To assemble rearview mirror assembly 418, RF receiver 420, microcontroller 422, and display 424 are mounted on at least one circuit board (not shown). The circuit board is assembled into the rearview mirror housing 430. The wire harness 434, including the control inputs and outputs of microcontroller 422 and power supply conductors connected to the vehicle power supply, are connected to the paging message display system 416. The wiring harness is extended outwardly from rearview mirror housing 430 through mirror support 437 for connection with wiring in the vehicle roof structure when support 437 is connected to connector 440 in the vehicle roof structure. The rearview mirror assembly 418 is fully assembled to vehicle 412 when mirror support 437 is connected to connector 440.

In operation, vehicle 412 may be paged from land-based station 19 (FIG. 1A) by a person dialing the number for vehicle 412 (FIG. 20) using telephone 15. The page signal will be communicated from telephone 15 to land-based station 19 through the telephone system. Land-based station 19 transmits an RF signal A to vehicle 412. Receiver 420 demodulates the RF signal A and outputs a control signal to microcontroller 422. Microcontroller 422 is responsive to the demodulated page signal for indicating that a paging message is received. The driver may control when the message is displayed on display 424 using a READ switch 448 (FIGS. 25 and 26) on rearview mirror housing 430. Microcontroller 422 is responsive to actuation of the READ switch 448 to communicate a control signal to the alpha-numeric display such that the paging message is displayed. If the driver wishes to immediately call the party back, and vehicle 412 has a cellular telephone, the driver pushes the TRANSMIT switch 450. Responsive to depression of the TRANSMIT switch, microcontroller 422 will control the cellular telephone to call the number indicated in the paging message. This process of control is described in greater detail below under the heading "Detailed Description of the Vehicle Personalization and Remote Control Functions."

Figure 27:
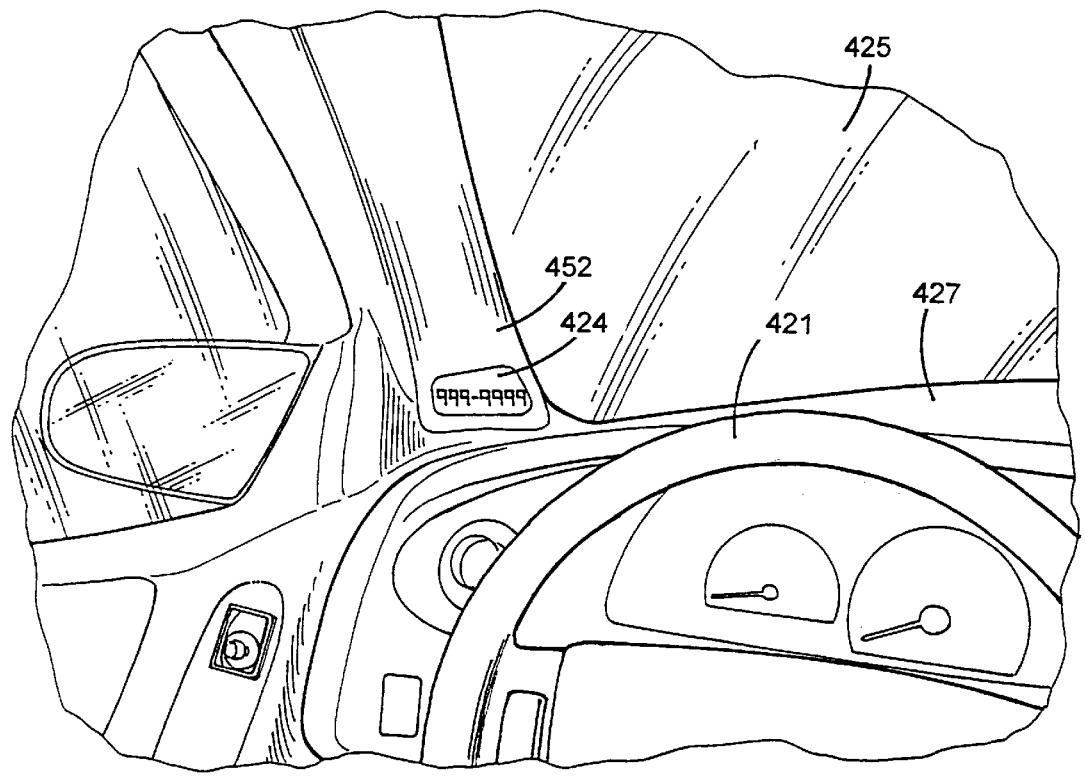
FIG. 27 is a perspective view of a vehicle interior including a message display system located in the A-pillar of the vehicle according to an alternate embodiment of the invention.
Figure 28:
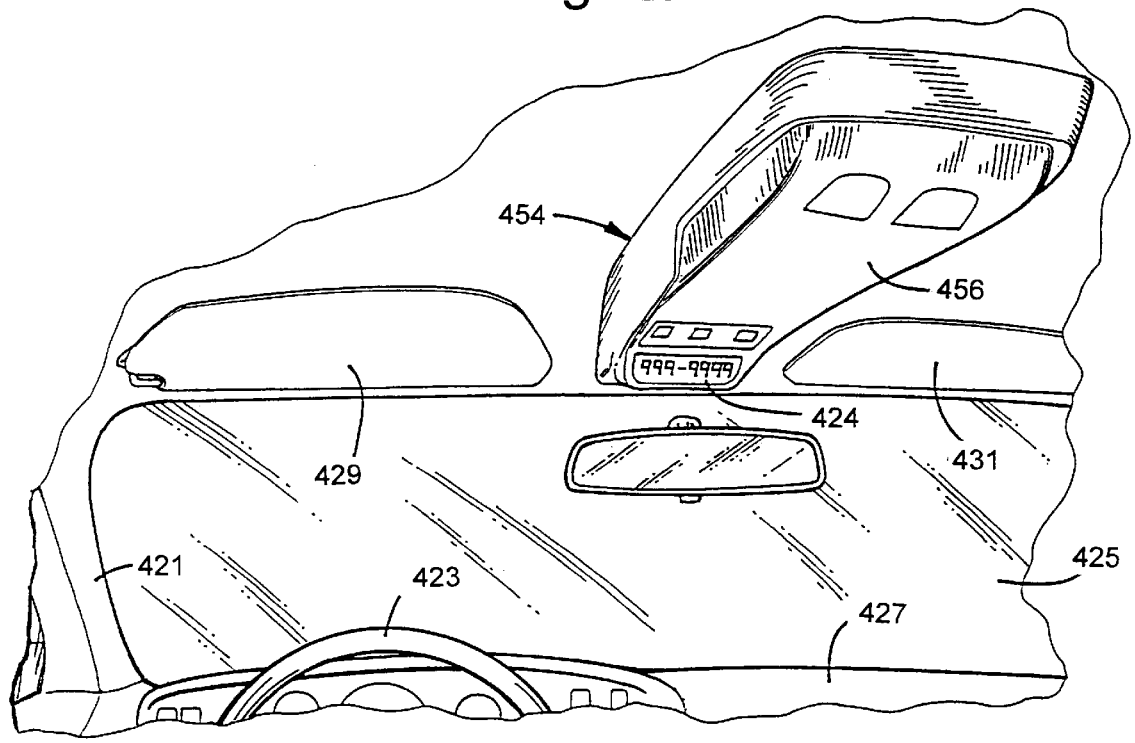
FIG. 28 is a perspective view of a vehicle interior including a message display system in an overhead console according to another alternate embodiment of the invention.

According to an alternate embodiment of the invention, message display system 416 is provided in a housing 452 (FIG. 27) mounted over a vehicle A-pillar 421 (FIG. 25). The message display system 416 shown in the circuit of FIG. 26 is mounted to housing 452. The RF receiver 420 (FIG. 26), microcontroller 422 and display 424 also can be mounted in the housing by conventional means (not shown) such as snap connectors, threaded fasteners, adhesives, or the like. The A-pillar housing 452 including display system 416 the circuit board (not shown) is assembled to A-pillar 421 using suitable threaded fasteners, snap connectors, adhesive, or the like. The housing may be manufactured from plastic, metal, or other suitable materials conforming to the interior of the vehicle. The message display system 416 is located within the housing 452 at the lower end such that the display surface of the display 424 is readily visible to the vehicle driver. The alpha-numeric display may include two rows of ten characters or a vertically oriented display in this embodiment of the invention.

According to another alternate embodiment of the invention, message display system 416 is mounted in an overhead console 454, as described above. The overhead console includes a housing 456 attached to the vehicle roof structure in a conventional manner. The overhead console housing may be of any suitable, conventional construction. The message display system 416 is mounted on a circuit board (not shown) which, in turn, is mounted in overhead console housing 456 by conventional means. Display 424 is positioned on overhead console housing 456 such that the display source image is directly visible to the vehicle driver. According to one advantageous embodiment of an overhead console pager display system, the display device may be implemented using the focus at infinity display system for an overhead console disclosed in U.S. Pat. No. 5,469,298, the entire disclosure of which is incorporated herein by reference thereto. If the focus at infinity display is used in the overhead console display, a mirror (not shown) is positioned in overhead console housing 456 and display source 424 is spaced from the mirror, as disclosed in U.S. Pat. No. 5,469,298.

It can thus be seen that a message display system is disclosed herein which is readily visible to the vehicle driver. The message display system is conveniently located in a housing in the windshield area of the vehicle so the vehicle driver can view the displayed message without taking his or her eyes completely off of the road for an extended period of time. The message display system may be integral with a vehicle accessory and is readily visible to the driver in all ambient light conditions.

Displays of vehicle parameter information and other information such as compass headings and the like have become commonplace with a variety of locations being employed for such displays, typically within the instrument panel of the vehicle itself. Displays have also been located in the A-pillar of a vehicle as, for example, described above and disclosed in U.S. Pat. No. 5,415,554 and in rearview mirrors as, for example, described above and disclosed in U.S. Pat. No. 5,475,366. Such displays usually provide the vehicle operator with information desired for the operation of the vehicle. An incidental display is employed on a visor-mounted telephone as disclosed in U.S. Pat. No. 4,870,676, which shows a telephone and its display viewable only when the visor is in a lowered position for use of the telephone.

It has been discovered that a visor provides a desirable location for the mounting of a trainable transmitter which is commercially available in many vehicles now on the market. Visors also provide a convenient location for the mounting of illuminated vanity mirrors of the type disclosed in U.S. Pat. No. 4,760,503.

In order to more fully utilize the beneficial location of the visor as well as its ability to move from a raised stored position to a lowered use position, the present invention may utilize the visor as a mounting location for a unique display for information such as text messages, compass and temperature information, vehicle operating parameter information, and the like. It is desirable, however, to have the display visible regardless of the visor position which can change depending upon its use for blocking sun for which it is primarily designed. Thus, in visor displays embodying the present invention, the visor body includes a window to which a display is movably mounted such that the display, when the visor is in one of a raised or lowered use positions, is visible through the window and, when the visor is moved to the other of the raised or lowered positions, the display can be moved to be directly visible.

In one embodiment of the invention, a visor display includes a display housing to which a display is mounted. Such housing is pivotally mounted to a visor body and movable from a closed position where the display is aligned with a window formed through the visor body to an open position where the display is visible when the visor window is adjacent the vehicle roof. In an another embodiment of the invention, the visor window was formed through a vanity mirror in an area of the vanity mirror which is otherwise covered with a reflective material to provide a mirror such that the display is viewed through the front surface of the mirror window. In another embodiment of the invention also, a visor body includes a housing which extends to opposite sides of the visor and presents a display on such opposite sides to be visible regardless of the visor position.

With the present invention, therefore, a single display, such as vacuum florescent display, can be employed and viewed through an illuminated vanity mirror with sufficient contrast to readily view the display with the visor in a lowered use position with the vanity mirror in use. The display is equally visible when the visor is in a raised stored position by pivoting the display housing downwardly to a position for direct viewing.

Figure 29:
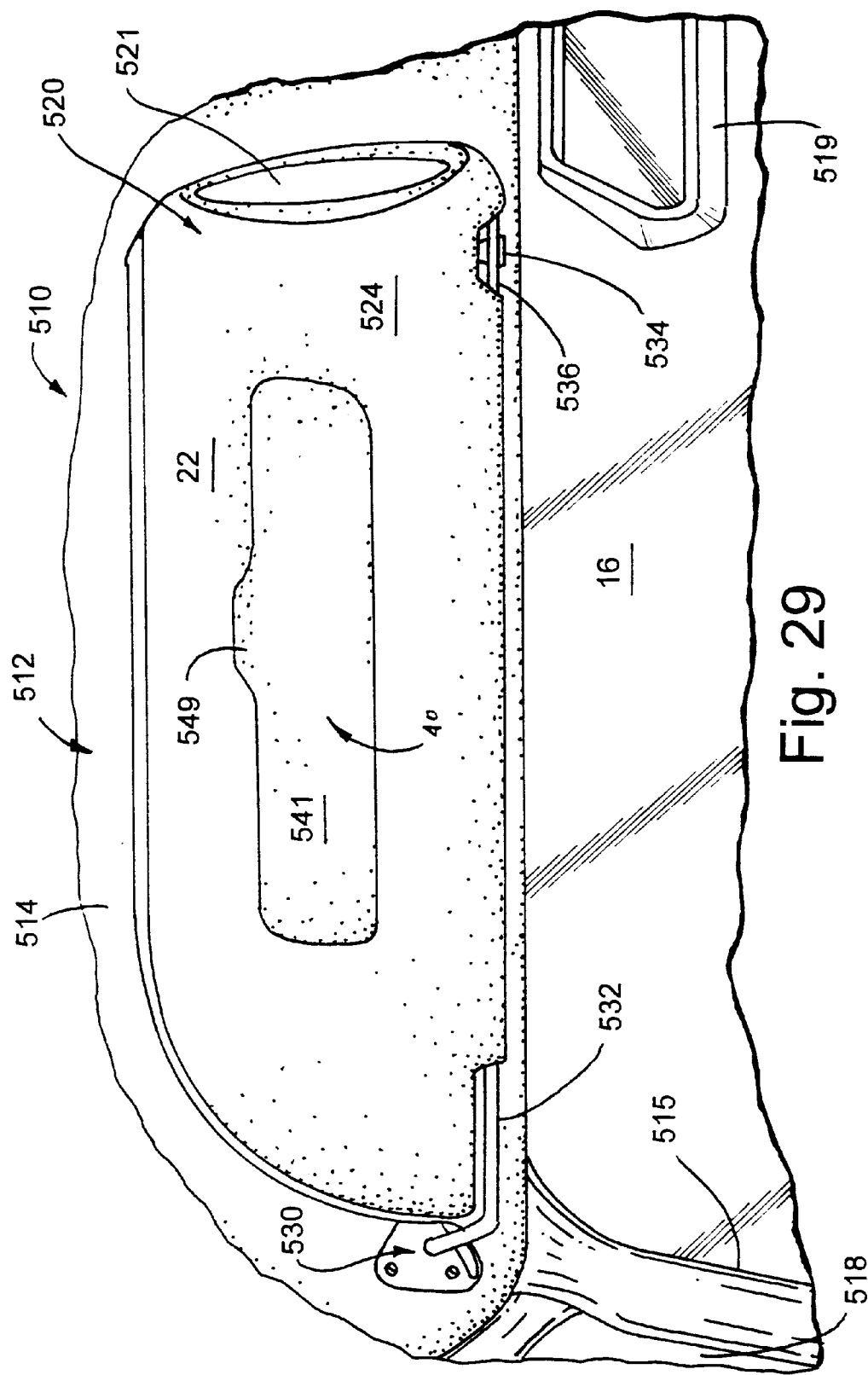
FIG. 29 is a fragmentary perspective view of a vehicle including a visor embodying the system of the present invention.

Referring to FIG. 29, there is shown a vehicle 510, such as an automobile, which includes a roof 512 of sheet-metal construction to which a molded composite headliner 514 is mounted for providing an attractive vehicle interior. Several pillars including an A-pillar 515 provide support for the roof 512. Pillar 515 divides the windshield 516 from the driver's side window 518 of the vehicle. The vehicle typically will include a rearview mirror assembly 519 and a pair of visor assemblies with the driver's side visor 520 incorporating the present invention being shown.

Figure 33:
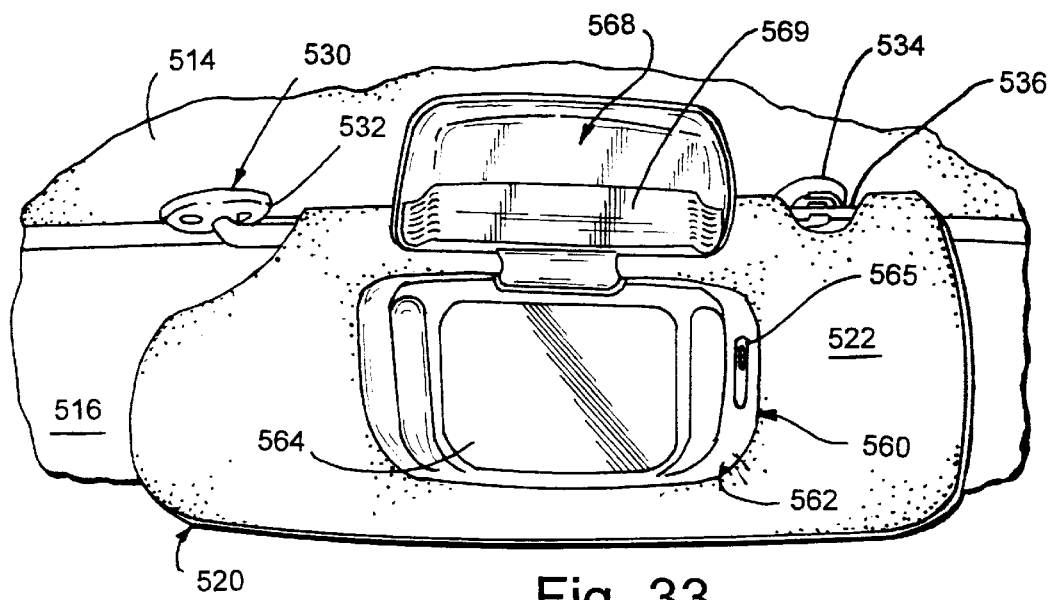
FIG. 33 is a front perspective view of the visor of FIGS. 29–32 shown in a lowered use position with the vanity mirror cover in an open position.
Figure 34:
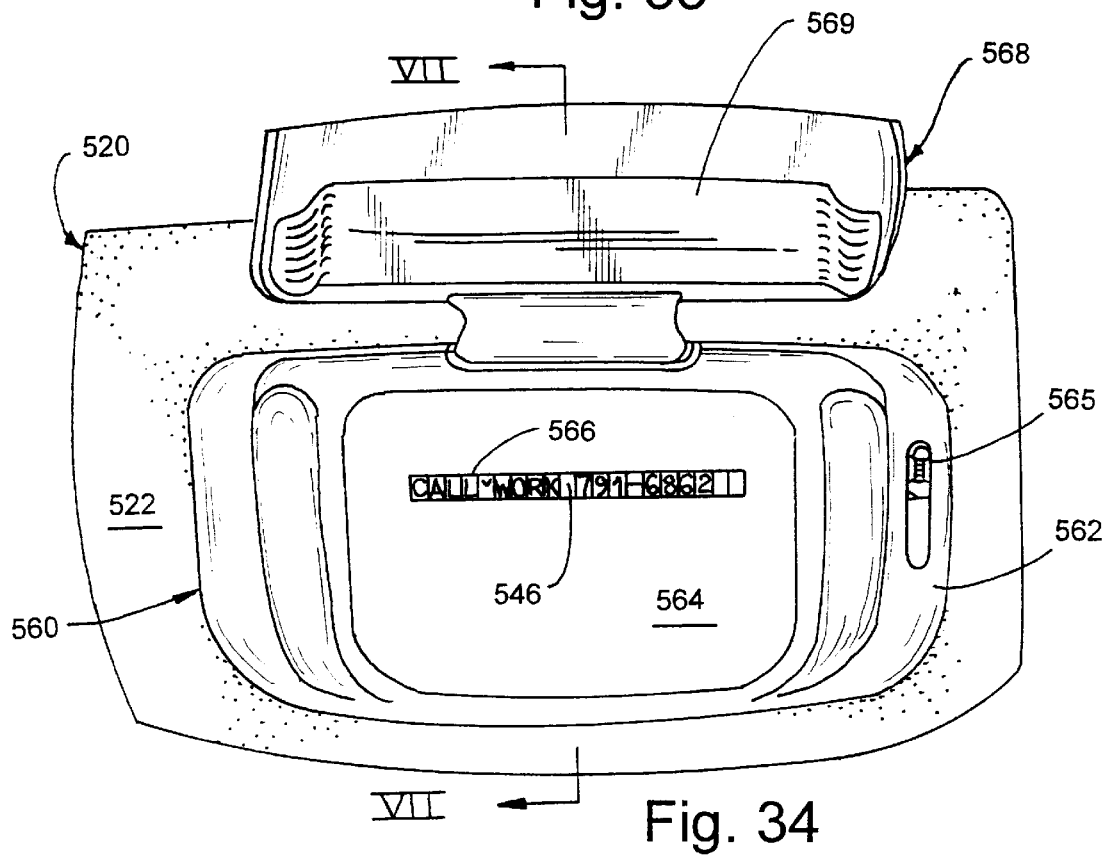
FIG. 34 is an enlarged fragmentary, front elevational view of the visor display shown in FIG. 33, showing the display information thereon.

Visor assembly 520 comprises a visor body which can be of a molded polymeric material such as polypropylene or other material such as fiberboard which can be preformed in a butterfly shape and folded over in a clam-shell design to complete the visor body construction. The visor body is mounted to the vehicle roof 512 by means of an elbow bracket assembly 530 which can be of conventional construction and includes a pivot rod 532 extending into the body of the visor. A torque fitting (not shown) mounted within the visor body engages the pivot rod 532 for allowing the visor to be held in a raised stored position as illustrated in FIG. 29 to a lowered sun-blocking use position as illustrated in FIGS. 33 and 34. The bracket assembly also allows the visor to be moved from the front windshield position to a side window position in a conventional manner. A remote support clip 534 may be mounted to the roof near the rearview mirror 519 and receive auxiliary visor rod 536 for supporting the end of the visor body remote from the bracket assembly 530 to the vehicle roof as illustrated in FIG. 29. The visor body may also include a pocket for receiving a slide-out auxiliary visor panel 521 as illustrated in FIGS. 29 and 30 for extending the effective width of the visor when in use.

Figure 37:
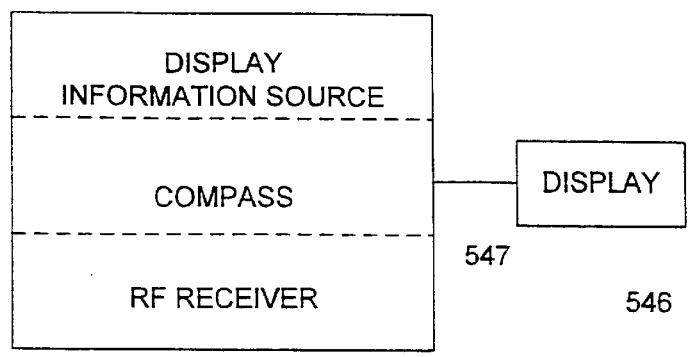
FIG. 37 is an electrical circuit diagram in block form of the display system.
Figure 32:
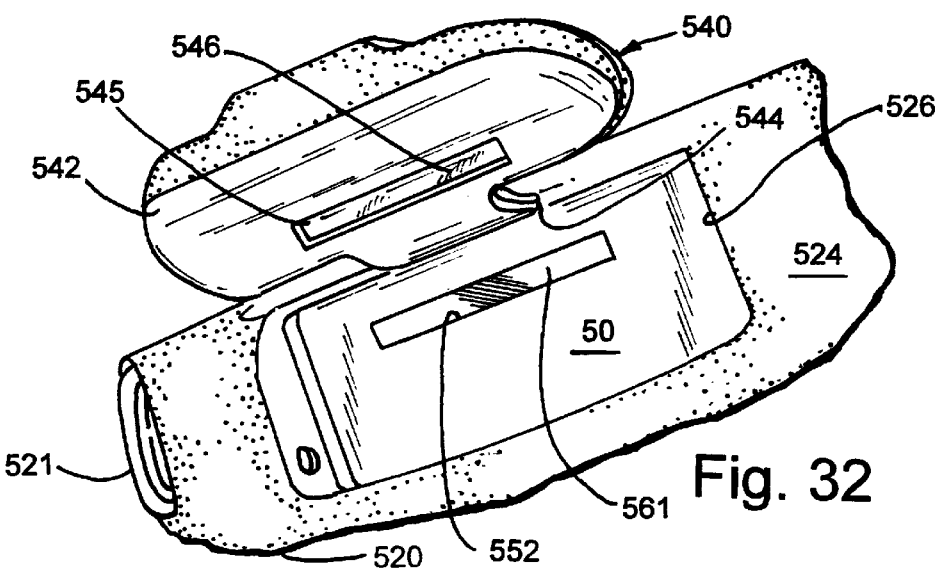
FIG. 32 is a rear perspective view of the visor shown in FIGS. 29–31 with the display housing pivoted to a lowered position showing the display window formed through the visor.

For purposes of discussing the invention, the rear-facing surface 524 of visor 520, when in the raised stored position shown in FIG. 29, will be referred to as the rear of the visor with the opposite side of the visor being referred to as the front 522 of the visor. Formed in the rear 524 of the visor body is a pocket 526 as best seen in FIGS. 30 and 32 for storing a movably mounted display assembly 540 therein. Display assembly 540 includes a housing 542 which is pivotally mounted to the visor body on an edge of pocket 526 formed therein by means of a conventional pivot axle assembly 544 to be moved from a stored position substantially flush with the rear surface 524 of visor 520 as seen in FIG. 29, with the outer surface 541 of display assembly 540 being textured with an upholstery material to conform to that of the visor. The inner surface of housing 540 includes a polymeric panel 543 having an elongated rectangular window 545 (FIG. 30A) formed therein behind which there is mounted a digital display 546 which is electrically coupled to a display information source 548 (FIG. 37) by means of suitable conductors 547 extending through the visor body and the hollow pivot rod 532 to the electrical circuit comprising the display information source 548. The display information source 548 may be, for example, a digital compass such as disclosed below under the heading "Detailed Description of the Vehicle Personalization and the Remote Control Functions" and in U.S. Pat. No. 4,953,305, the disclosure of which is incorporated herein by reference; a paging receiver as disclosed in U.S. Pat. No. 5,479,157 the disclosure of which is incorporated herein by reference; or other vehicle information such as disclosed above.

Figure 30:
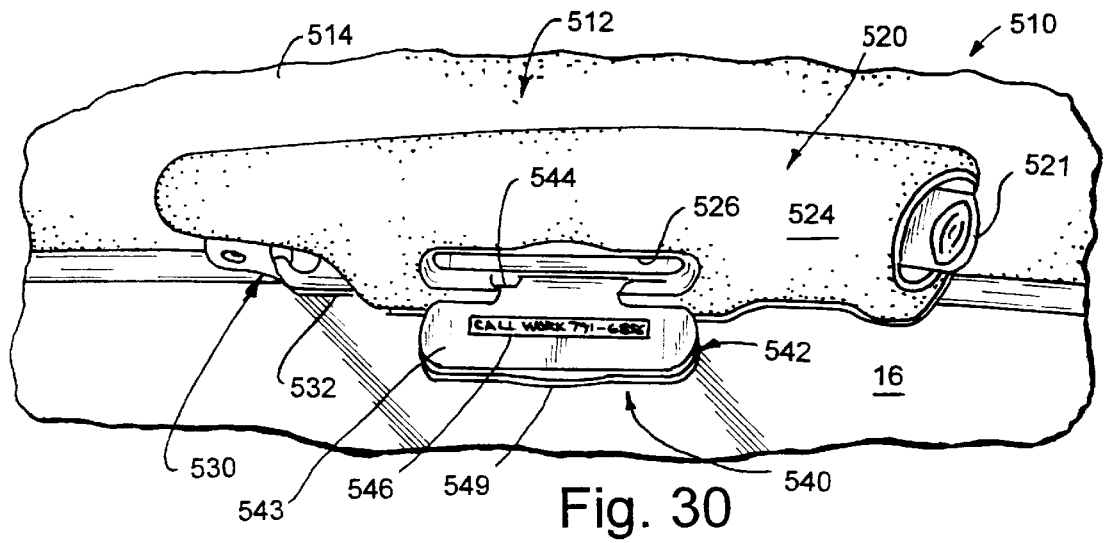
FIG. 30 is a perspective view of the visor shown in FIG. 29, shown with a display housing in a lowered use position.
Figure 30A:
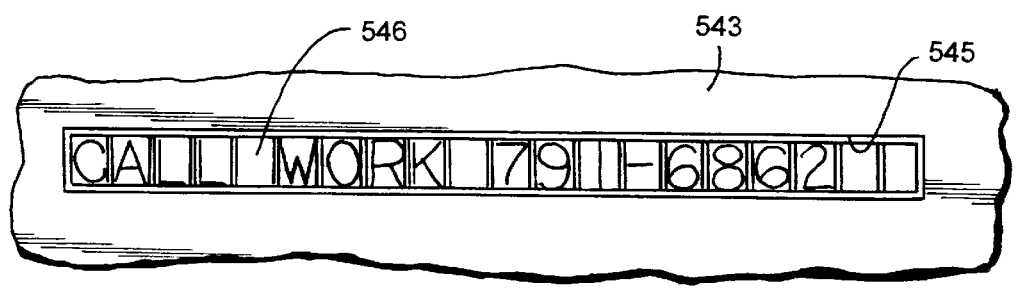

For purposes of pivoting the display assembly 540 from its stored, concealed position shown in FIG. 29 to its lowered use position as shown in FIG. 30, a handle 549 is provided along the upper edge of the display. Display 546 can be any number of commercially-available digital displays such as a vacuum florescent display, an LCD display, an LED display, or the like, which provide an alpha-numeric or other suitable display of information to be displayed to the driver. It is conventionally mounted within the hollow body of housing 542 in alignment with window 545 such that information to be displayed is visible through the window.

Figure 31:
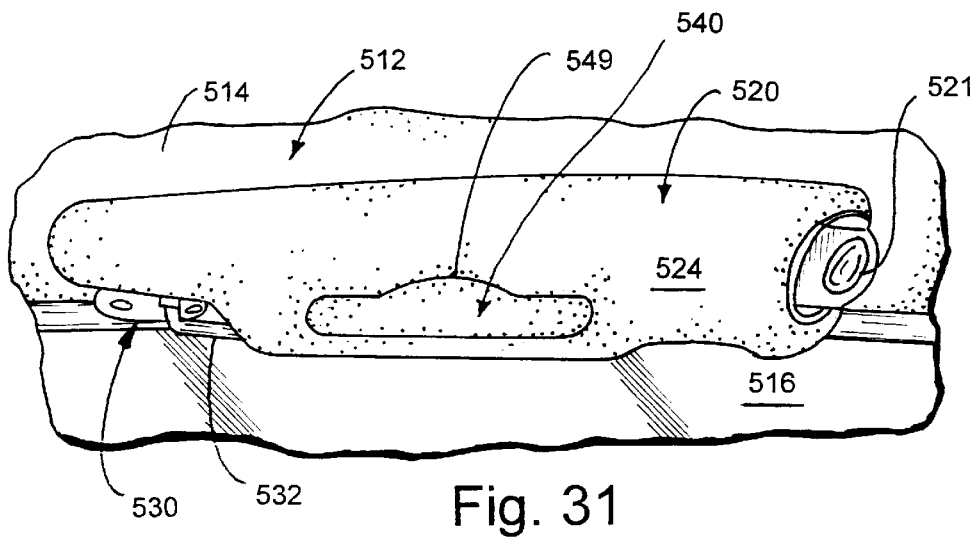
FIG. 31 is a fragmentary perspective view of the visor shown in FIG. 30 with the display housing in a stored position.

The visor pocket 526 includes, as best seen in FIG. 32, a rear panel 550 also having a rectangular window 552 extending therethrough and which is aligned with the display 546 when the display assembly 540 is in its stored position, as seen in FIGS. 29 and 31. In one embodiment of the invention, the window 552 extends entirely through the visor body and is exposed on the front surface 522 such that when the visor is in its lowered use position, the display can be viewed through the window 552 in panel 550 of the visor. In the preferred embodiment of the invention, however, the front surface 522 of the visor includes an illuminated vanity mirror assembly 560, as seen in FIGS. 33–36. Vanity mirror assembly 560 can be constructed generally as disclosed in U.S. Pat. No. 5,428,513, the disclosure of which is incorporated herein by reference, with a modification to provide a window through the mirror of the assembly such that the display 546 can be viewed through the mirror when in the position shown in FIGS. 33 and 34. A brief description of the visor assembly 560 follows.

Figure 35:
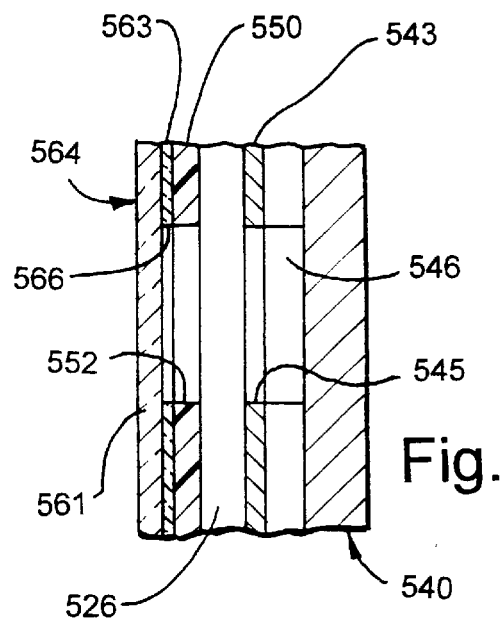
FIG. 35 is an enlarged fragmentary cross section view of the visor display taken along section line VII—VII of FIG. 34.
Figure 36:
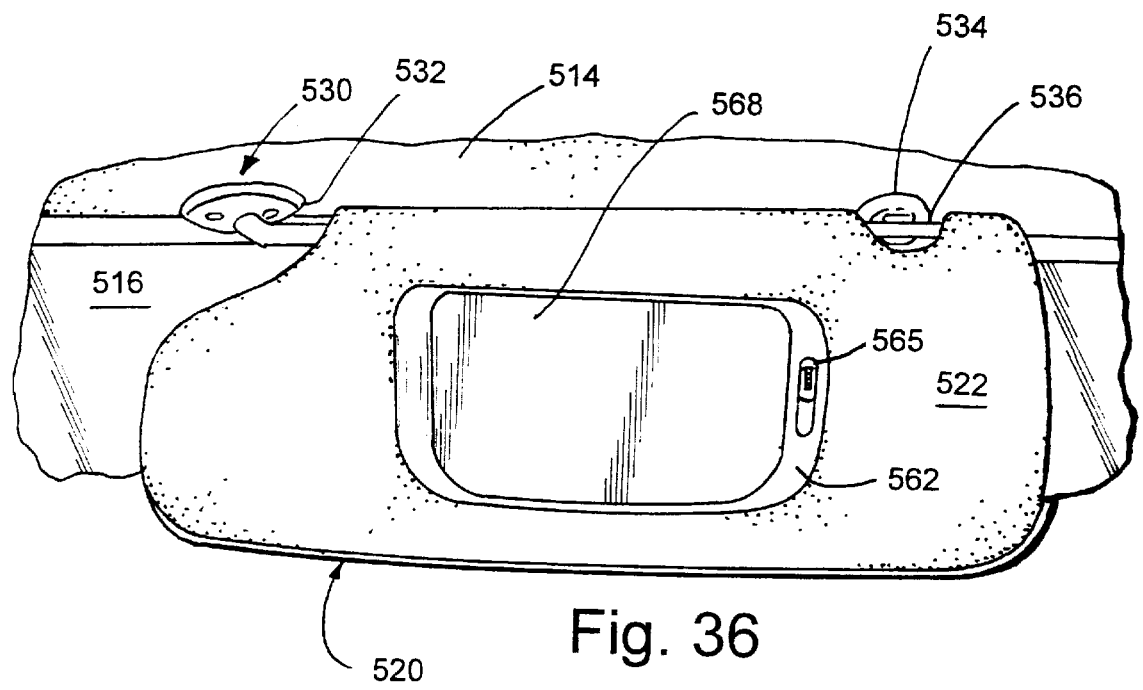
FIG. 36 is a front elevational view of the visor shown in a lowered use position with the mirror cover in a closed position.

Mirror assembly 560 includes a mirror frame 562 mounted to the visor body and including a mirror 564 mounted therein. Near the upper portion of the mirror, there is formed a generally rectangular window 566 of a shape substantially conforming to and aligned with window 552 in panel 550 (FIG. 32). Window 566 is formed, as best seen in FIG. 35, on the rear surface of mirror 564 by not coating the rectangular area of the rear surface of the mirror glass 561 with the normal reflective coating 563. Alternatively, this coating 563 could be removed to define window 566. Thus, the area defining window 566 provides clear glass 561 which is aligned with the display 546 mounted in display housing 540, as seen in FIG. 35. Therefore, the display assembly 540, when in the position shown in FIGS. 29 and 31, is within the pocket 526 in the rear surface 524 of visor 520, and information displayed by display 546 is visible through the window 566 in mirror 564, and window 552 in rear panel 550 form through the visor body. FIG. 34 illustrates how the information on display 546 appears through the mirror window. The mirror assembly 560 also includes a cover 568 which can be selectively moved from a closed position as shown in FIG. 36 to the open position shown in FIGS. 33 and 34 for exposure of the mirror 564 and display 546 therethrough. Illumination means 569 is mounted on the inside of cover 568. The intensity of the illumination can be controlled by a variable resistance control 565 mounted to the frame 562 of the illuminated vanity mirror assembly.

The pocket 526 into which the display assembly 540 is pivotally mounted provides light shielding for the display 546 such that it is readily visible through the front surface of mirror 564 even when the illumination means 569 is in the high brightness position. The display is recessed in the darkened area of pocket 526 behind the reflective surface 552 of the mirror 564. Thus, with the system of the preferred embodiment of the invention, a single display 546 is viewable either with the visor in a raised stored position, as illustrated in FIG. 30, or when in a lowered position with the vanity mirror exposed, as seen in FIGS. 33 and 34. In some embodiments, the vanity mirror will not have a cover so that the display is visible at all times instead of selectively as in the embodiment shown including a vanity mirror cover 568.

Figure 38:
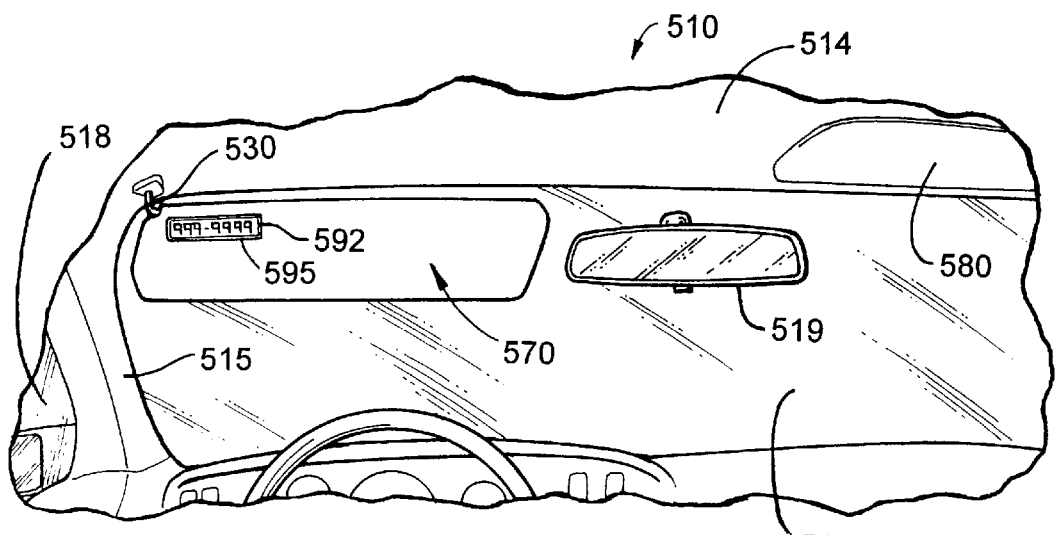
FIG. 38 is a fragmentary perspective view of a vehicle interior showing an alternative visor display with the visor in a lowered use position.
Figure 39:
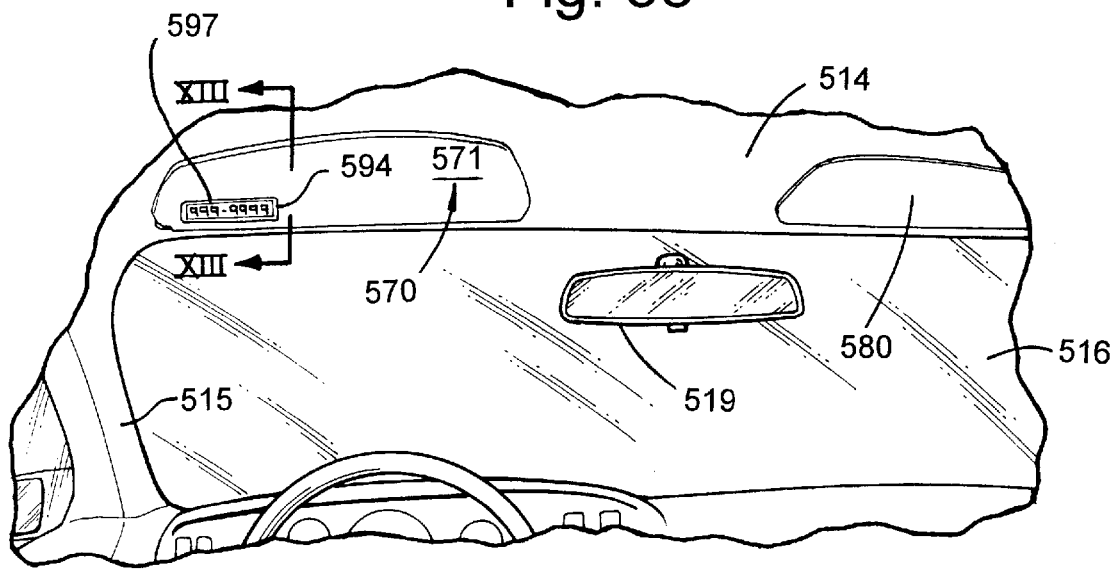
FIG. 39 is a fragmentary perspective view of the visor display shown in FIG. 38, shown with the visor in a raised stored position against the vehicle headliner.
Figure 40:
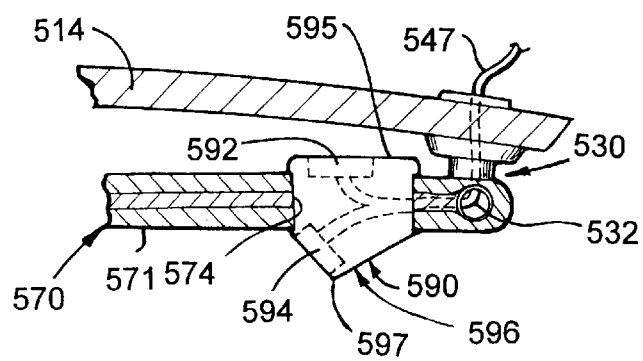
FIG. 40 is a enlarged fragmentary, cross-sectional view taken along section XII—XII of FIG. 39.

In the alternative embodiment shown in FIGS. 38–40, the same vehicle 510 is shown with corresponding parts bearing the same reference numerals as in the previous embodiment. The vehicle includes a pair of visors 570, 580 on the driver and passenger sides, respectively. The driver's side visor 570 includes a dual display assembly 590 (FIG. 40) which includes a first display 592 which is visible when the visor is in a lowered position as seen in FIG. 38 and a second display 594 mounted to the visor to be visible and readable when the visor is in a raised stored position as shown in FIG. 39. Displays 592 and 594 can be commonly coupled to the source of display information 548 (FIG. 37) via conductors 547. Displays 592 and 594 are mounted in a housing 596 which includes a front bezel 595 surrounding and receiving display 592 and an angled bezel 597. Bezel 597 positions the face of display 594 to extend at an acute angle of approximately 45° to the planar surface 571 of visor 570 such that when the visor is in a raised stored position, as illustrated in FIG. 40, the display is readily visible by the vehicle driver. Housing 596 is shaped to fit within an aperture 574 in the visor body. Displays 592 and 594 are positioned preferably in one corner of the visor which may include an illuminated vanity mirror package in the center area, if desired. Displays 592 and 594 may be of the same general type as display 546. In some embodiments, the dual display can be provided utilizing a single display source located within housing 590 and suitable prismatic reflectors to provide the display surfaces 592, 594. The visor display system of FIGS. 38–40, therefore, also provides a display on opposite sides of the visor, such that the information is readily visible and accessible to the driver regardless of the operational position of the visor.

5. Detailed Description of the Last Exit Warning Function

Many vehicles currently include computers which calculate not only fuel economy but also, based upon the remaining fuel, a distance-to-empty estimation for preventing running out of fuel. Although the vehicle operator can readily select the distance-to-empty information for display, the operator may not be aware of the nearest service station at which fuel can be purchased nor the distance to such a service station. Therefore, and particularly when driving on limited access highways, the vehicle operator can still encounter an out-of-fuel crisis. This can be particularly troublesome in isolated areas where help is not readily available or in some urban areas where having a disabled vehicle is undesirable. Although motorist aids including frequent roadway signs and on-board navigational systems are available, there remains a need for a warning system which will notify the vehicle operator to exit, for example, a limited access highway to obtain fuel or other desired services prior to the time the vehicle is caught between two exits beyond the point of no return where insufficient fuel remains to reach the nearest service station.

The system of the present invention accommodates this need by providing a warning system which will automatically alert the vehicle operator to the fact that the next available exit should be taken for a desired or necessary service such as refueling.

In one embodiment of the invention, the system includes a source of information providing the current vehicle location as well as a source of information identifying the location of available selected service locations closest to each of the next two exits of, for example, a limited access highway. The system in a preferred embodiment includes a source of information indicating the available range of the vehicle (distance-to-empty) and a microprocessor for calculating when the driver should take the next available exit to reach the desired service.

In most instances the service would be a service station for providing fuel, although the desired service may involve other parameters such as the time for stopping for lunch or dinner or checking into an available hotel. The system includes a suitable alarm which may be an audible alarm, a visual alarm, or both, to alert the vehicle operator that the next available exit should be taken. Such a system, therefore, provides the vehicle operator with the assurance that the vehicle will not run out of fuel prior to the availability of a service station at a forthcoming exit. Likewise, the vehicle parameter can alert the vehicle operator to exit to achieve a desired arrival time for certain other services, such as dining or checking into hotels, and forewarn the vehicle operator to exit for such facilities. In one embodiment, a vehicle mounted housing includes the electrical circuits of the invention which receive operating power from the vehicle's battery. Such circuits preferably include the two-way communication system of the present invention thereby permitting the vehicle operator to receive and transmit messages.

Figure 41:
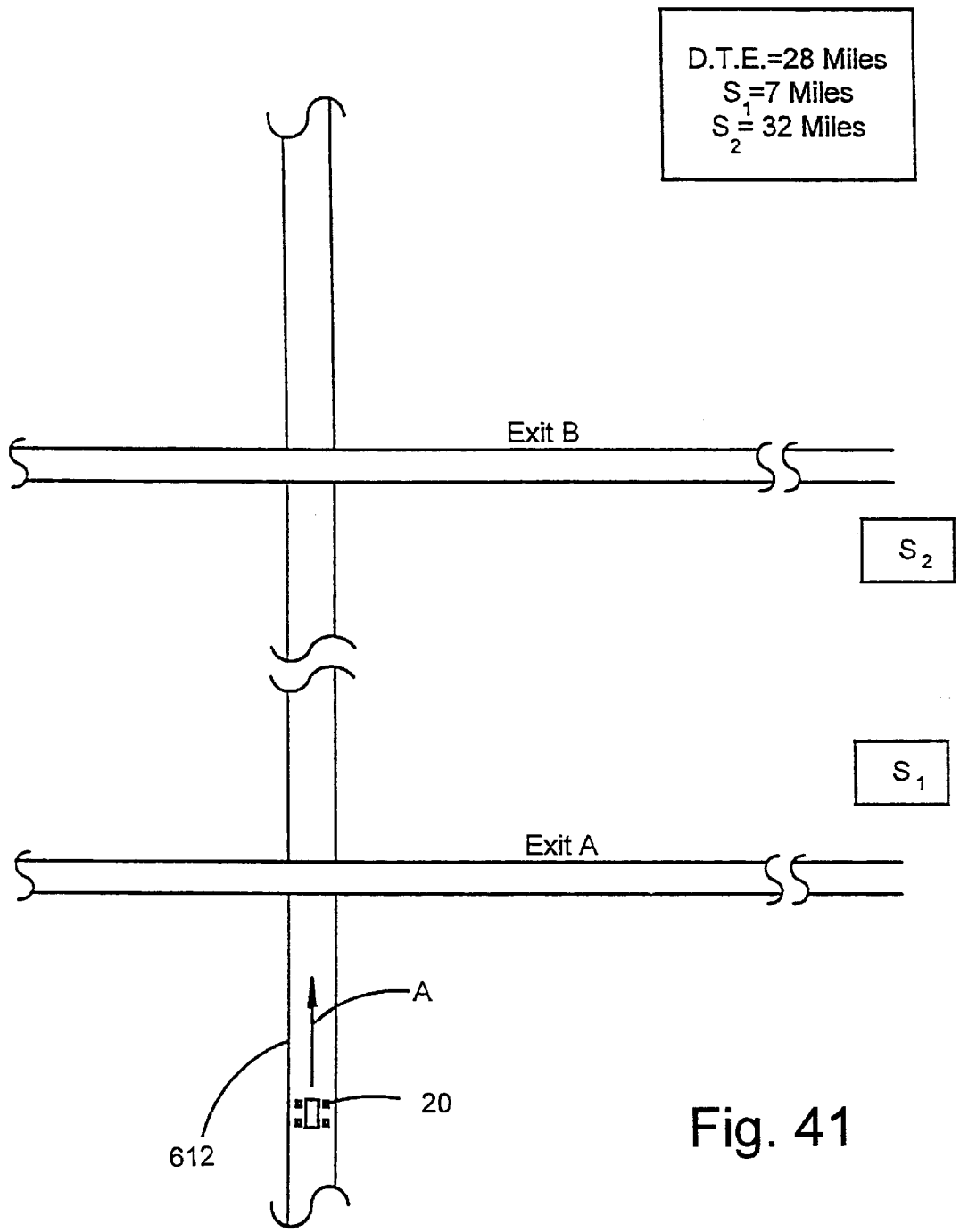
FIG. 41 is a diagrammatic view of a vehicle and a highway map showing exits and service locations to be employed.

Referring initially to FIG. 41, there is shown a map which pictorially illustrates a vehicle 20 traveling in the direction of arrow A along a limited access highway 612 having an exit A and an exit B spaced farther along highway 612. Along exit A is a service facility $S_1$ which is located a distance from the current position of vehicle 20 of, for example, 7 miles. Exit B includes a service facility $S_2$ which is 32 miles from the vehicle's present location. Vehicle 20, such as an automobile, conventionally includes a fuel computer which provides, on a vehicle data bus, distance-to-empty data which, in the example shown, indicates the distance-to-empty is 28 miles. Although the vehicle operator may be aware of the fact that exit A is, for example, 3 miles ahead and exit B is 20 miles ahead, the vehicle operator may not be aware of the fact that the only open service location $S_2$ is beyond the range of the vehicle and, therefore, the vehicle will run out of fuel prior to reaching service station $S_2$, which is the closest service facility from the otherwise reachable exit B. Thus, it is desired, in order to forewarn the vehicle operator of an impending out-of-fuel situation, to provide information to the vehicle operator as to the vehicle's present location and the locations of facilities $S_1$ and $S_2$ and their distance such that, prior to going beyond exit A, the vehicle operator receives a warning signal allowing the operator to exit at exit A and utilize the services of facility $S_1$.

Figure 42:
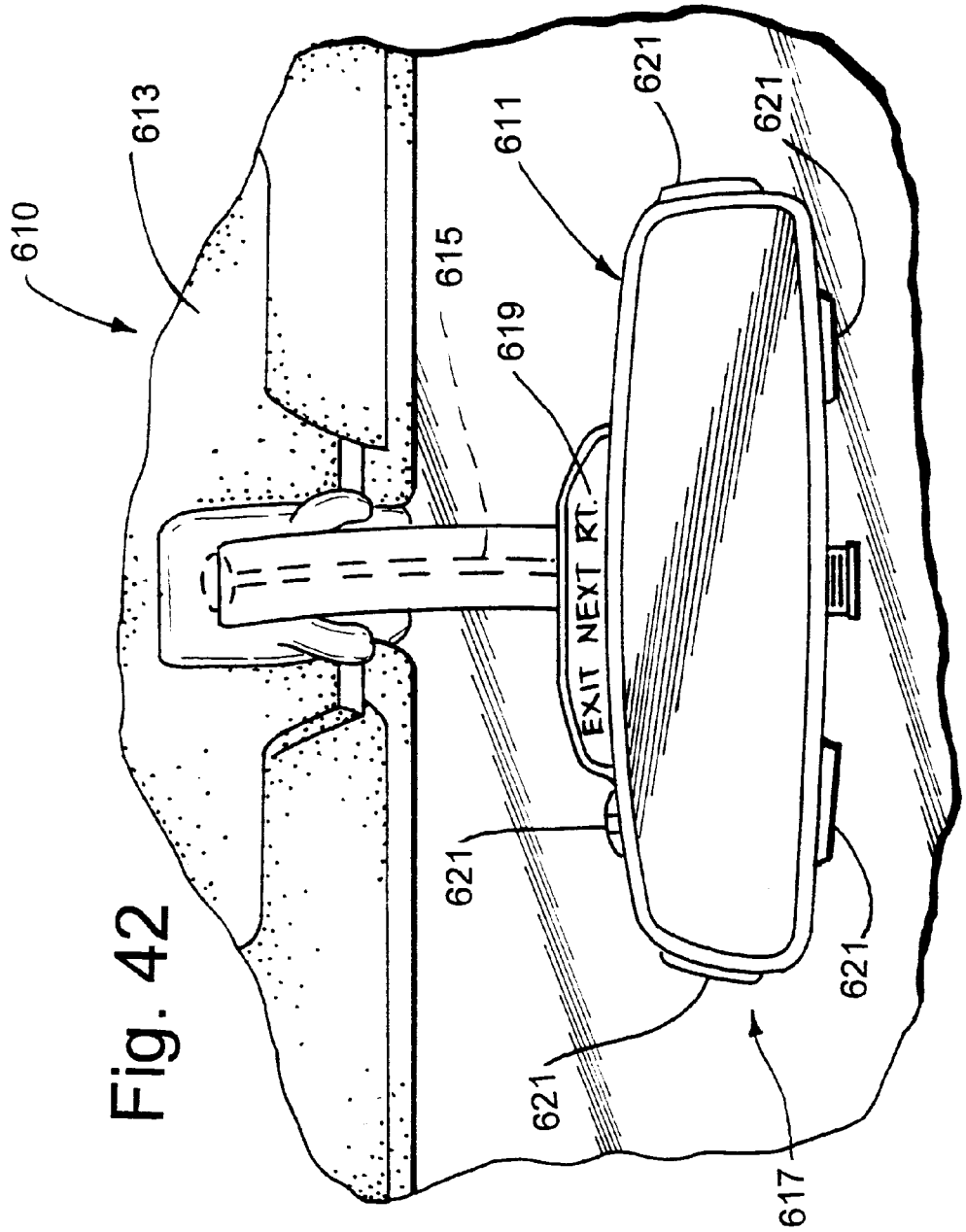
FIG. 42 is a fragmentary perspective view of the interior of the vehicle showing a rearview mirror including the system of the present invention.

Referring to FIG. 42, there is shown a housing 611, such as a rearview mirror housing, adapted to be attached to the roof structure 613 of a vehicle 610. Mounted within the mirror housing are the electrical components of FIGS. 3 or 5, which are electrically connected to the vehicle electrical system through suitable electrical conductors 615 for receiving operating power from the vehicle's battery. Housing 611 includes an alpha-numeric display 619 for selectively displaying messages from the RF transceiver (FIGS. 3 and 5) and other information to the vehicle operator. Also, a plurality of control switches 621 are mounted to housing 611 at various locations for the operator to input control signals to the circuit shown in FIGS. 3 or 5. The display and control switches are illustrated by blocks 28, 46, 48, 50, 52, 54, 56, and 58 in FIGS. 3 or 5. The details of construction of the rearview mirror assembly 617, including the housing 611 and its mounting to the vehicle, are disclosed in detail in U.S. Pat. No. 5,455,716, the disclosure of which is incorporated herein by reference.

Figure 43:
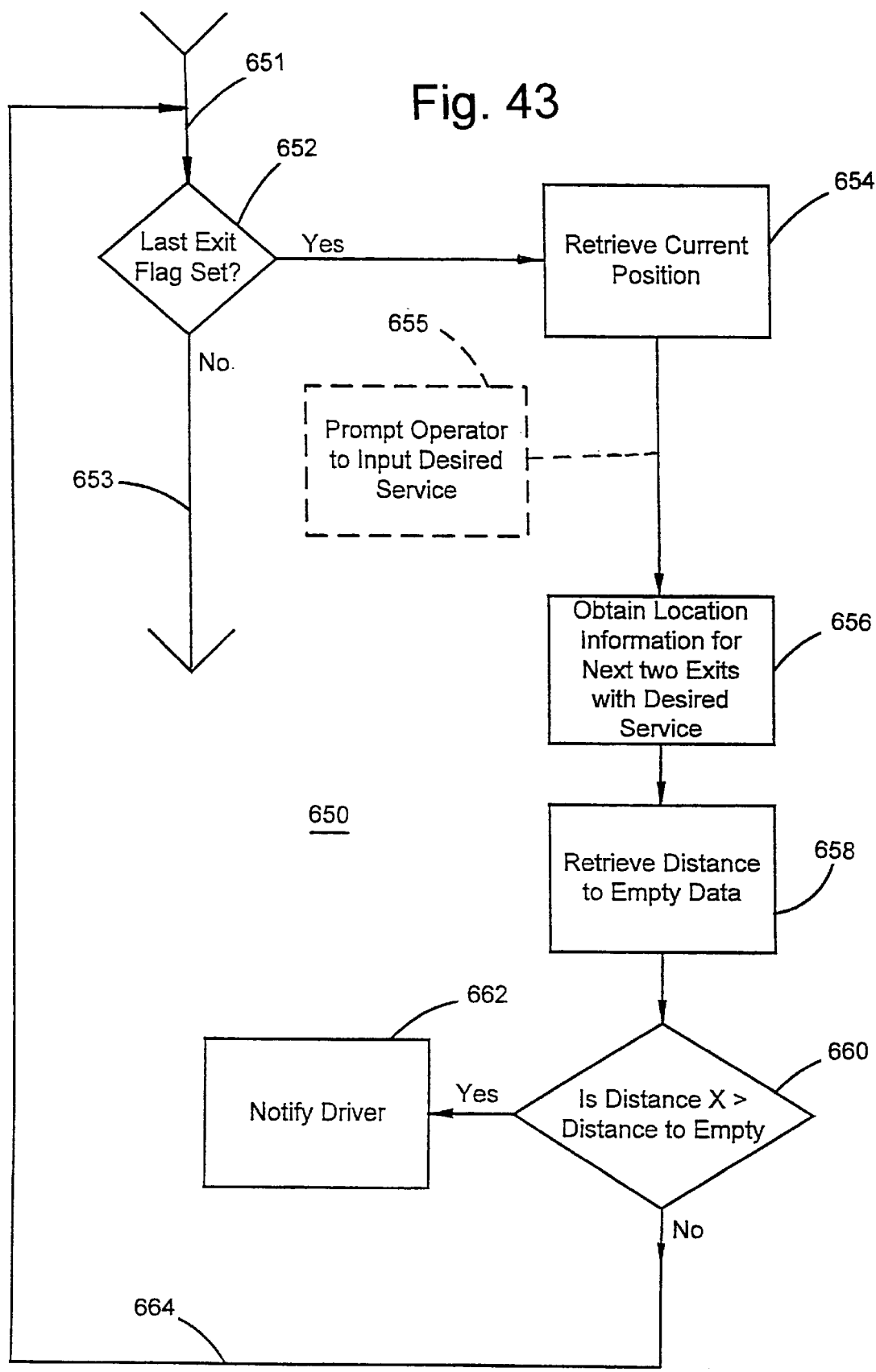
FIG. 43 is a flow diagram of the software programming for the microprocessor employed in an embodiment of the system of the present invention.

The operation of the system is best understood by reference to FIG. 43 which shows the subroutine for the last exit warning, which subroutine 650 is part of the overall programming for the microprocessor 626 which forms no part of the present invention. The subroutine 650 can be inserted at any suitable location in the program and includes an input 651 to test at block 652 whether the last exit flag is set. If it is not set, the subroutine is not called up and the main program proceeds from port 653 of block 652. In the event the last exit flag is set, which can either be automatic, if desired, or can be operator enabled by the actuation of a control switch 621 in interface circuit 628, the microprocessor first retrieves the current vehicle position as indicated by block 654. It does this by interrogating the GPS module 638 which provides the current latitude/longitude information to the microprocessor, which then stores the current vehicle position.

Next, as indicated by block 656, the microprocessor obtains location information for the next two exits of the limited access highway on which the operator is traveling for the desired services, as, for example, fuel availability. Such information will include not only the location of the service facility but also the availability of such facility (i.e., whether it is open at the time of the requested information). This information can be accessed in a variety of manners by, for example, a database 27 (FIG. 3) contained on the vehicle in mass storage memory such as a CD-ROM, which includes the highway information on which the vehicle is traveling in memory, as well as the available services. The database 27 will thus include the data storage medium, a reader such as a CD-ROM drive, and a controller coupled to the microprocessor for transferring data to the microprocessor. The programming for the transfer of location data for, for example, service locations $S_1$ and $S_2$ based on the vehicle's current position, can be conventional. Such a system is described in U.S. Pat. Nos. 5,172,321 and 5,229,947, the disclosures of which are incorporated herein by reference. Preferably, however, microprocessor 26 or 66 obtains such service location information from an inquiry to a subscription service through two-way paging module 34 or transceiver 70. It accomplishes this by initiating an information request utilizing paging module 34 or transceiver 70 and receiving such data from a centrally-located base station having a database of such information via a paging network service such as is commercially available from SkyTel Corp., located in Jackson, Miss. Both the paging module 34 and transceiver 70 can transmit the current vehicle location to the subscription service upon operator request or automatically on a repeating time cycle. Pager 34 or transceiver 70 receives the location information as, for example, $S_1$ and $S_2$ of FIG. 41, and provides such information in a digital signal format to the microprocessor 26 or 66, which is conventionally programmed to calculate the distance from the current vehicle location to the $S_1$ and $S_2$ available service facilities at the forthcoming two exits.

This information is stored by the microprocessor and compared with the distance-to-empty data which is retrieved as indicated by block 658 from the vehicle bus interface circuit 36. The program then compares the distance from the vehicle's current location to each of the service areas $S_1$ and $S_2$ of FIG. 41 to determine if the remaining fuel is sufficient to reach the second service area $S_2$ represented by distance X in the test block 660 of FIG. 43. If this distance is greater than the range available to the vehicle, a notification signal is sent to the driver as indicated by block 662. This notification signal can take the form of an audible alarm tone, a visual message in alpha-numeric format on a vehicle digital display contained within circuit 28, or both. In the example of FIG. 41, the notification signal alerts the driver that he or she should exit the limited access highway at exit A such that the first service area $S_1$ can be accessed prior to running out of fuel. Depending on the location information obtained as indicated by block 656, it is possible that service area $S_2$, which is on the second exit, is actually closer than service area $S_1$, and assuming it is less than the distance-to-empty, no notification signal would take place and the testing cycle is repeated as indicated by the connecting line 664 as the vehicle continues to travel along the highway. A notification or alerting alarm would then be sent, most likely between exits A and B and before the vehicle passed exit B.

In place of the automatic system described, the vehicle operator may input specific desired services in addition to or in place of a distance-to-empty last exit service. Thus, for example, the operator may wish to exit the limited access highway to have dinner within a prescribed period of time or at a preferred restaurant. In such case, the system allows the operator to request the locations of such services as shown in phantom in block 655 of flow diagram 650. The vehicle operator is requested to input information as to a desired available service through two-way pager module 34 or transceiver 70. This can be done by the operator sequentially receiving one-line messages scrolled on display 619 and actuating a switch 621 when the desired service facility is identified to transmit such selection to the subscription database through pager 34 or transceiver 70. The database would then send the service facility location back to the vehicle. The microprocessor stores this information and compares it with vehicle location information from GPS receiver 38 to alert the driver to exit when appropriate for the selected service facility. Such information is input to the microprocessor from its receipt from the pager module 34, transceiver 70 or, alternatively, the on-board database 27 for such service location information as indicated by block 656. The distance for the selected service can be calculated by the same calculations provided in block 660 to alert the driver as indicated by block 662 to exit the highway at the next exit.

With such a system, therefore, the microprocessor notifies the vehicle operator with a suitable warning that the service necessary or desired should be sought at the forthcoming exit in the case of a limited access highway, or the next crossroad, for example, on a non-limited access highway. As can be appreciated, the system has greater need in situations where a limited access highway is being traveled and exits are spaced at long distances. The system of the present invention automatically assists the vehicle operator in preventing the vehicle from ruing out of fuel and/or assists the vehicle operator in seeking desired services within a prescribed time or other parameter. The unique use of the GPS receiver in combination with an automatically operated or operator prompted two-way pager or transceiver allows location information to be communicated to and from the vehicle from a subscription service database to achieve such an alerting system.

6. Detailed Description of the Vehicle Personalization and Remote Control Functions As vehicle electronic systems and options become more sophisticated, vehicle owners have many new options for vehicle accessories from which to choose. The rapidly increasing number of new options has led to a nearly infinite number of combinations of options for vehicle accessories that are available. This extremely large number of combinations of vehicle accessory options existing on any one vehicle makes it much more difficult for a buyer to find a vehicle on a dealer's lot having the exact combination of vehicle accessory options that the buyer desires. Further, this wide array of vehicle accessory options that may exist in a particular vehicle increases the likelihood that no two drivers who share the vehicle will be able to agree on which options the vehicle should have. These concerns have given rise to the need for a programmable vehicle personalization system that allows an operator to select accessory operation for that vehicle according to their preferences at any time following the manufacture of the vehicle. U.S. Pat. No. 5,040,990 issued on Aug. 20, 1991, discloses one such system in which selected vehicle options can be programmed by the vehicle operator. U.S. Pat. No. 5,113,182 also discloses a programmable vehicle personalization system. Although programmable vehicle personalization systems exist, there remains a need for a system that does not require extensive effort by the vehicle operator to reprogram the manner in which the vehicle's accessories are controlled.

The present invention provides vehicle personalization to be remotely effected by a service provider using an RF system such as a paging or cellular system. According to one aspect of the present invention, a vehicle owner wishing to reprogram a vehicle, calls the service provider who effects reprogramming of an option control by transmitting RF control signals to the vehicle from a land-based transmitter to a receiver mounted in the vehicle. Thus, because the service provider effects vehicle personalization, the vehicle owner need not have any technical knowledge as to how to operate the vehicle programming system. Another aspect of the present invention is to provide vehicle personalization for each person who may operate the vehicle.

To achieve these aspects and other advantages, the vehicle accessory control system of the present invention includes a plurality of electrically-operated vehicle accessories, a receiver to be mounted in a vehicle for receiving RF signals from a land-based transmitter, and a control circuit coupled to the receiver and to the vehicle accessories for controlling the operation of the vehicle accessories in accordance with a control program. The RF signals include an address uniquely identifying the vehicle and a reprogramming signal for reprogramming the operation of at least one of the vehicle accessories. The control circuit includes an input interface for receiving information regarding a plurality of sensed conditions, control means for controlling the operation of the vehicle accessories in accordance with the control program and in response to sensed conditions received from the input interface. The control circuit further includes reprogramming means for selectively reprogramming the control program in response to the detection of an RF signal including an address identifying the vehicle and the reprogramming signal, to selectively change the manner in which the control means controls the operation of at least one of the vehicle accessories.

Figure 45:
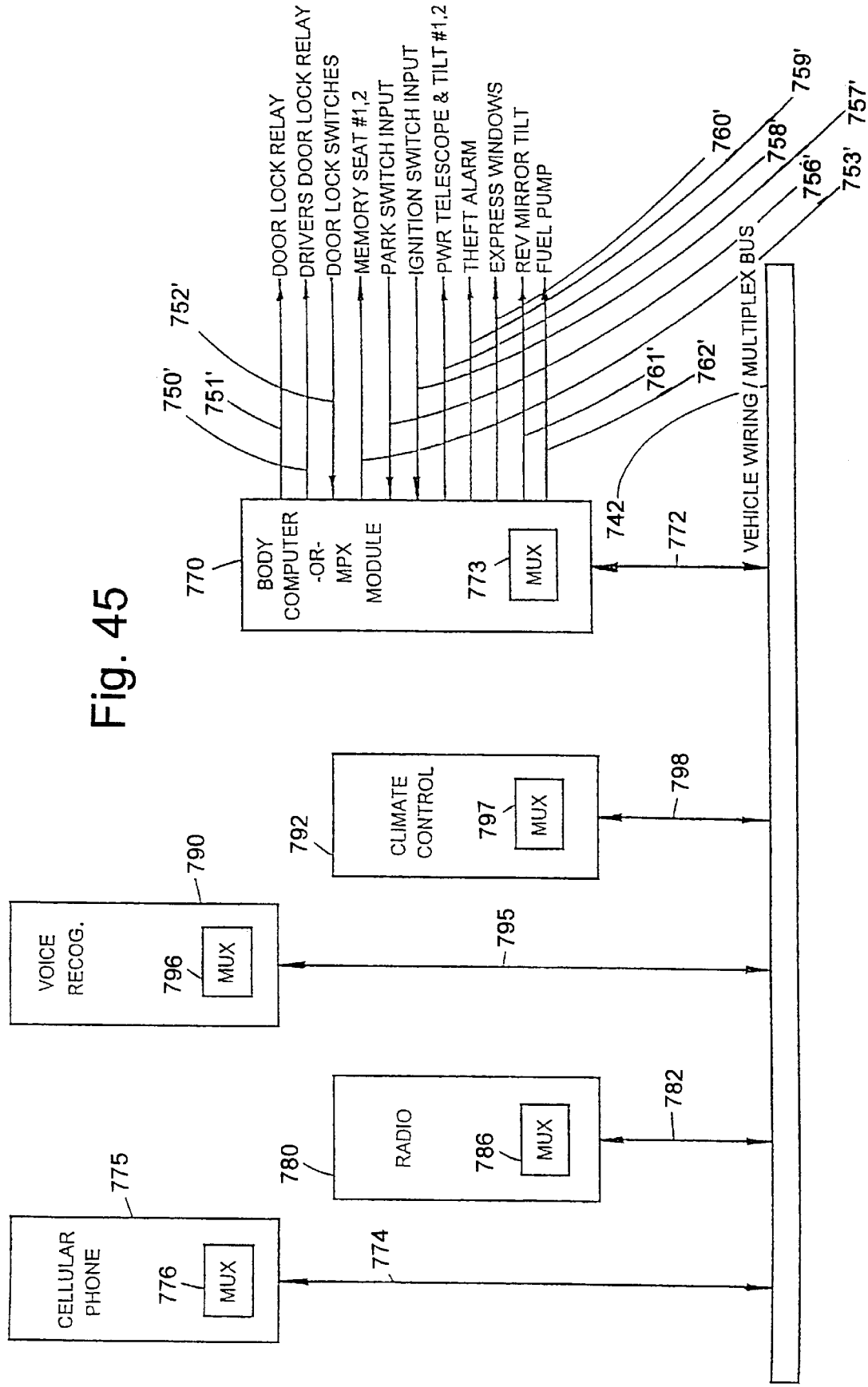
FIG. 45 is an electrical circuit diagram in block form of an optional interface circuit associated with the electrical circuit shown in FIG. 44.

Preferably, the vehicle electrical control system for performing the above functions is that described above and shown in FIGS. 3 or 5. An alternative vehicle electrical control system 730, is shown in FIGS. 44 and 45, and include, as shown in FIG. 44, a microcontroller 735 such as a Motorola MC68HC05, which receives demodulated signals from the receiver 724 shown enclosed within dotted lines in FIG. 44 via a data bus 727. The receiver 724 may be the receiving portion of the two-way pager module described above or the receiving portion of cellular transceiver 70 (FIG. 5), but may alternatively be a typical duo-conversion receiver having first and second local oscillators 721 and 723, appropriate bandpass filters and amplifiers, and a demodulator circuit 725 which provides digital data output on a data bus 727 to an input of microcontroller 735. Microcontroller 735 includes an integral non-volatile memory for retaining data when the vehicle is not in operation. In vehicles including a single wire multiplex bus 742, an output terminal 743 of microcontroller 735 is coupled to the input of a multiplex communication circuit 744 comprising a 728 pin integrated circuit which is coupled by output conductor 747 to a single wire data bus 742. The average data rate for the multiplex circuit 744 is 10.4 kilobits per second. Microcontroller 735 communicates with circuit 744 through its SPI serial interface port 743. When circuit 744 receives a message over the bus 742, it interrupts the microprocessor, which in turn initiates communication with the circuit through its SPI port. Microprocessor 735 then reads the data from the SPI register and acts upon the information. The multiplexing scheme is set forth in SAE standard J1850 and is universally used in the automotive industry.

The vehicle control system 730 includes a power supply 732 which supplies regulated 5- and 12-volt DC to the various individual circuit blocks shown in FIGS. 44 and 45 with the conventional power circuit interconnections not being shown for the sake of simplification of the drawings. Circuit 730 also includes a power control circuit 734 which is coupled to power supply 732 and between the microcontroller and receiver 724 to selectively activate and deactivate the receiver periodically in order to save power as described in greater detail below in connection with the flow diagram of FIG. 46. The vehicle electrical control circuit 730 further includes an alpha-numeric vacuum fluorescent-type display circuit 740 which is coupled to the microcontroller 735. Display circuit 740 includes suitable driver circuits as well as the display itself. A push-button lead switch 741 is coupled to microcontroller and a transmit control push-button switch 745 is also coupled to microcontroller 735. As will be described below, switches 741 and 745 are operator actuated switches which selectively scroll the information displayed on the display 740 and allow memory control of such information. In the case of an automatic telephone dialing system, the transmit switch 745 can be employed for activating a sequence of controls which can cause a cellular telephone, if installed in the vehicle, to automatically dial a number displayed on the vacuum fluorescent display 740.

Coupled to the microcontroller are a plurality of input/output ports 750–764 which provide control output signals or receive input status signals from a variety of vehicle interface controls and circuits identified in the drawings. Depending upon the specific microcontroller used, conventional interface circuits between the microcontroller and the input/output lines 750–764 may be required as is well-known in the art. In the system shown in FIG. 44, the output terminals 750–764 can be coupled directly to one or more of the variety of control systems shown such as the electrical fuel pump system shown by data bus 762, the ignition switch input 756, and the like. Similarly, instead of directly coupling the microcontroller as shown through the data buses 750–764, many vehicles will include a single wire data bus 742, which as seen in FIGS. 45 and 47, intercouples the same control information from microcontroller 735 in receipt of information through the data bus 742 instead of directly through conductors 750–764. In this instance, many of the conductors 750–764 can be eliminated and the controls are accomplished through an interface microcontroller 770 of the type disclosed in U.S. Pat. No. 5,113,182, the disclosure of which is incorporated herein by reference. For the sake of comparison, the output conductors of microcontroller 770 corresponding to those of microcontroller 735 are identified by similar reference numerals carrying a superscript prime symbol. Thus, the vehicle control circuit 735 shown in FIGS. 44, 45, and 47 will be capable of communicating through the data bus 742 or directly from microcontroller 735 to the various interface controls. Microcontroller 770 is coupled by conductor 772 to bus 742 through a multiplex chip 773 of the same type as circuit 744 to provide two-way communication between the two microcontrollers. In the event it communicates through the data bus 742, additional control circuits as now described are employed.

In the FIG. 45 embodiment of the control circuit 730, a cellular telephone 775 (FIG. 45) is mounted in the vehicle and communicates with bus 742 through a data link 774 and a multiplex interface chip 776. Similarly, the vehicle includes an AM/FM radio 780 coupled to bus 742 through data line 782 and also includes a multiplex interface chip 786. The vehicle may include a voice recognition system 790 of the type described in U.S. Pat. No. 4,827,520, issued May 2, 1989, and entitled VOICE ACTUATED CONTROL SYSTEM FOR USE IN A VEHICLE, the disclosure of which is incorporated herein by reference. In the event the system includes such a voice recognition and control system, data bus 742 is employed in connection with the voice recognition circuitry which operates in conjunction with microcontroller 770 to provide the desired control of the various vehicle functions. Voice recognition circuit 790 is coupled to a multiplex circuit 796 and conductor 795 to bus 742. The vehicle may also include an electronic climate control system 792 which has a multiplex interface chip 797 which couples to bus 742 via the conductor 798.

Figure 46A:
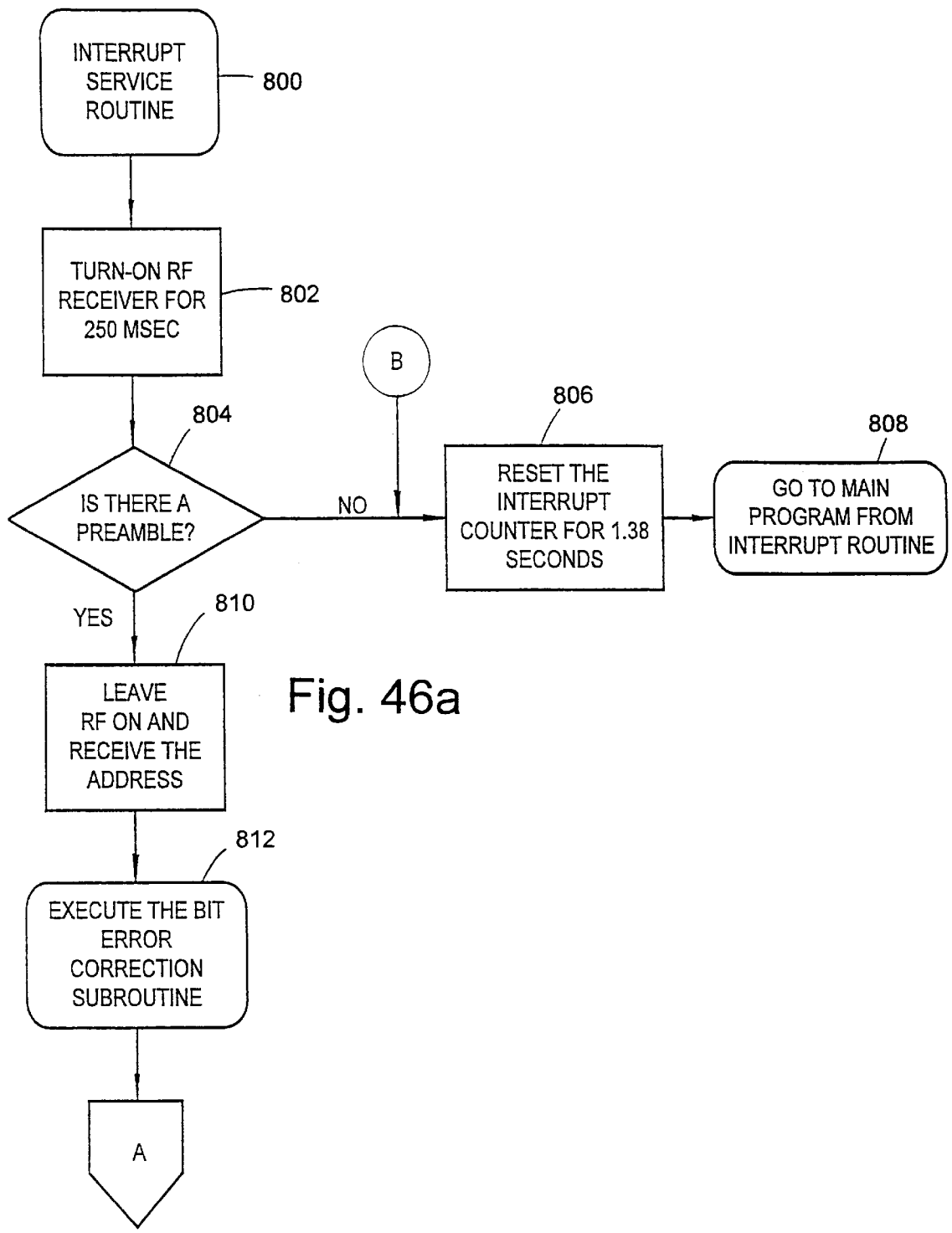
Figure 46B:
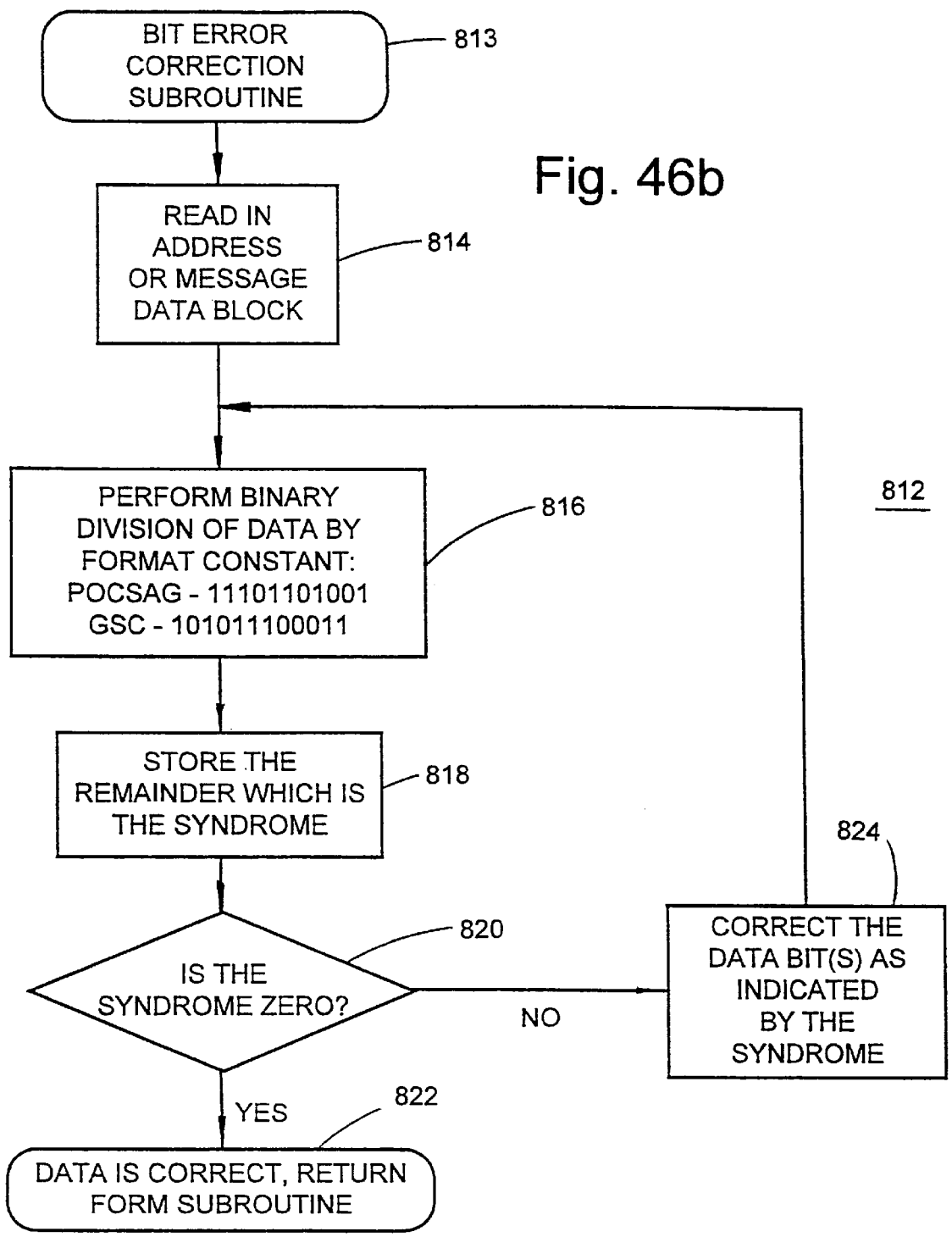
Figure 46D:
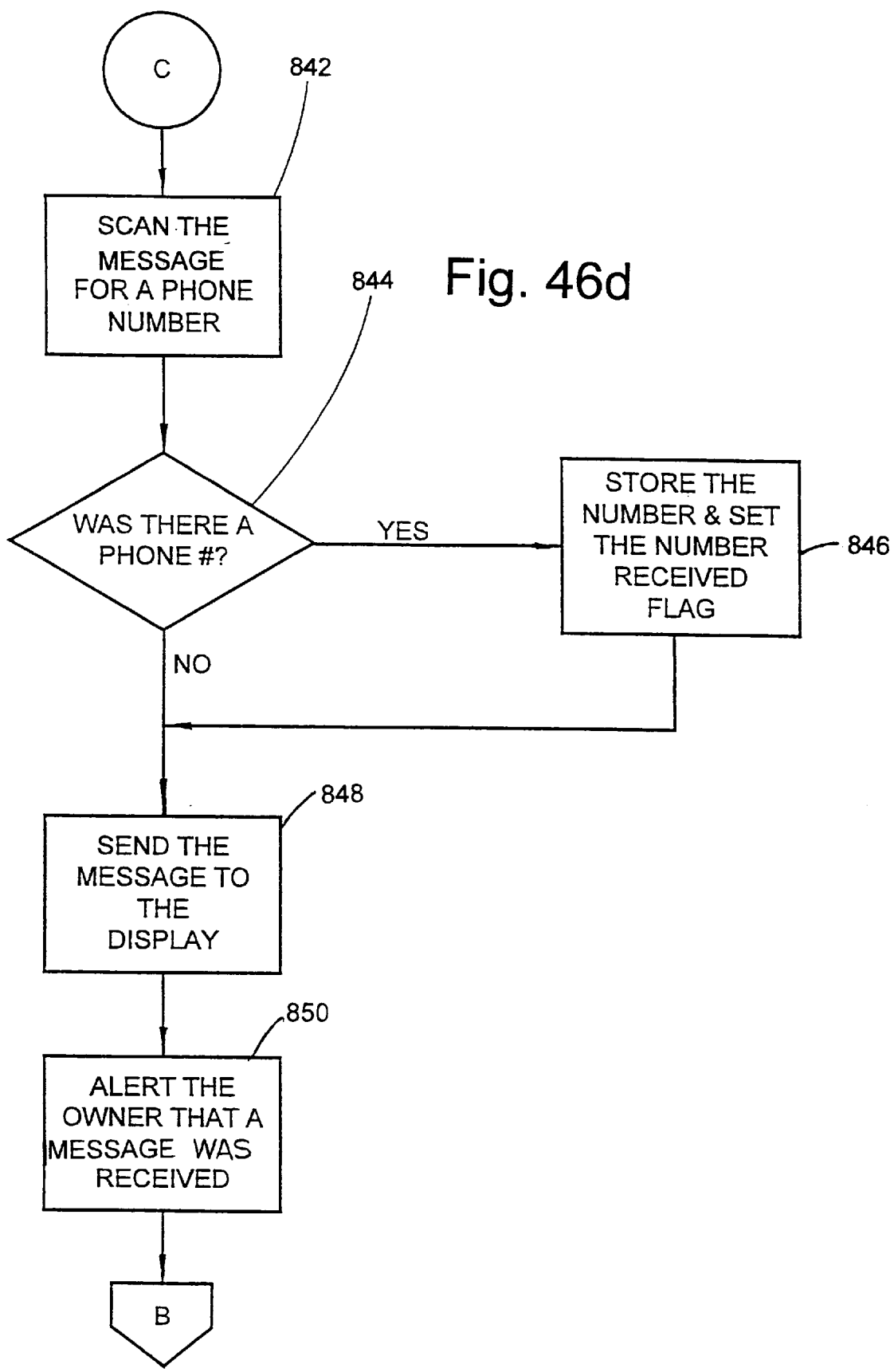

The software programming of the microcontroller 735 is shown in FIGS. 46A–46K. The main program routine includes an interrupt timer which periodically interrupts the main program routine to run an interrupt service routine shown in FIG. 46A. The interrupt service routine is initiated by block 800 upon expiration of the program timer and upon such event the power is applied to the receiver 724 as indicated by block 802 for sampling incoming signals for a period of 250 milliseconds. The demodulator looks for a preamble signal indicated by block 804. The RF signaling formats preferably provide a preamble digital signal and if one is not detected by the microcontroller, the interrupt counter is reset as indicated by block 806 and the interrupt subroutine and the program returns to the main program as indicated by block 808. The main program routine starts at block 852 as described below in connection with FIGS. 46E–46K. In the event a preamble is detected, however, as indicated by an affirmative decision in block 804, the receiver remains activated as indicated by block 810 for receiving one of two different vehicle addresses uniquely associated with the vehicle. If either of these addresses is received, as indicated by block 812, a correction subroutine as shown in FIG. 46B is conducted to assure that the address has been correctly received. The first vehicle address is one in which a vehicle option is to be changed by a subsequently-transmitted control signal. The second address is one which is followed by a telephone number or alphanumeric message to be displayed. Each of these addresses is uniquely associated with a single vehicle.

The error correction routine is a standard subroutine for the different RF messaging systems. The bit error correction subroutine is initiated as indicated by block 813 of FIG. 46B. The error correction subroutine 812 reads an address or message data block as indicated by block 814 and divides binary format constants indicated in block 816 for the respective paging formats and stores the remainder which is known as the syndrome as indicated by block 818. Then a test is conducted, as indicated by block 820, to determine whether the syndrome is zero. If it is, the data is correct and the program returns to the interrupt service routine from the bit error correction subroutine as indicated by block 822. If, however, the syndrome is not zero, the data is corrected by the bit indicated by the syndrome as shown by block 824 and the data is retested through the loop including blocks 816–820.

Once the bit error correction subroutine has been completed and a correct preamble detected, the interrupt service routine proceeds to test as indicated in FIG. 46C, block 830, whether one of the vehicle's addresses has been detected. If no address is received for the particular vehicle into which the preprogrammed addresses of microcontroller 735 are installed, the program returns to port B of FIG. 46A as indicated by block 832 and the interrupt counter is reset and the program returns to the main information display program described below.

If, however, one of the vehicle's addresses has been detected, the program tests, as indicated by block 834 (FIG. 46C), whether the address is an information address or an option personalization address. If the vehicle owner or operator has called the service dealer asking that an option be activated or deactivated, the transmission of the address corresponding to the personalization code (i.e., first address) and the data corresponding to the activation of the option selected will be received and the control command decoded to provide a control signal to effect the option change as indicated by block 836 of FIG. 46C. The signal is then either outputted by one of the conductors 750–764 shown in FIG. 44 of microcontroller 735 or through the multiplex circuit 744 to the multiplex bus 742 for subsequent receipt by the vehicle's microcontroller 770 shown in FIG. 45 to effect the change in the vehicle option. The details of changing a vehicle option are described below with reference to FIGS. 48–56. In most instances, a bit or bytes are set into the NVM of microcontroller 735 to cause the vehicle option to respond as requested. Thus, for example, line 760 may send a control signal upon the selection of the "express window" feature to cause the driver's window to fully lower or raise in response to the activation of the window control switch for a predetermined period of time. This feature can be activated or deactivated by the setting of a switch in the microcontroller memory. As indicated by block 838, the microcontroller also provides a display output signal which is applied to the alpha-numeric display 740 to indicate to the owner that the option requested has been changed as requested. The program then returns to the interrupt service routine input B of FIG. 46A.

The anti-theft feature of the system operates in the same manner as one of the vehicle option changes. Typically, if a vehicle is stolen, the owner will call the service center 11 indicating the theft. The service center operator then will transmit the first vehicle address and an anti-theft control command signal which the microcontroller responds to by outputting a signal on line 762 (FIG. 45) to deactivate the vehicle's fuel pump. For safety, the program responds to the anti-theft command to output the fuel pump disabling signal only after the ignition switch has been deactivated and thus the vehicle has come to rest. Alternative or additional anti-theft commands are also possible. Thus, a theft alarm signal output on line 759 (FIG. 45) could be activated to enable the vehicle's audible alarm. Also, instead of deactivating the vehicle's fuel pump, the vehicle's ignition could be interrupted. In some areas, the police department may provide the anti-theft signal transmission facilities such that the owner can report the theft and take affirmative action to protect the vehicle from damage through one telephone call.

If the vehicle address received is not a first address for an option change or anti-theft control but instead is an address identifying a text message (i.e., a second address) as opposed to a vehicle option control signal, the test in block 834 indicates an address and the program receives and decodes a text message as indicated by block 840 in FIG. 46C. Again, the bit error correction subroutine 812 of FIG. 46B is rum to assure the accuracy of the incoming preamble and subsequent address and data as indicated by the block 812 subroutine. Once the subroutine of FIG. 46B has been completed, the message of the incoming signal is placed in the memory as indicated by block 842 of FIG. 46C. The program then proceeds to scan the text message to determine whether or not a telephone number has been received as indicated by block 842 of FIG. 46D.

If a telephone number is detected in the incoming message as indicated by an affirmative response to the test of block 844, the number is stored in the stack as described below and the number received flag is set as indicated by block 846. The program then proceeds to block 848 and if a telephone number was present, it is displayed on the alpha-numeric display 740 of FIG. 44 in addition to being stored. This operation is indicated by block 848 of the flow diagram. Next, the microcontroller outputs a signal through the microcontroller indicated by block 850 to alert the owner that a message has been received. This can be a chime coupled to a vehicle multiplex bus 742 which is also used, for example, to alert the driver that a door is open with the key in the ignition, etc., or can be a flashing LED or the like. Subsequent to alerting the driver that a page has been received, the program proceeds to the interrupt routine at input B of FIG. 46A as previously described. In the event a two-way communication system is used, the microprocessor will display any choices of responses that were transmitted with the message, and will allow the user to select one of the predetermined responses to transmit back to the service center and to the originator of the first message.

The microcontroller program includes a main program routine which provides a variety of informational displays and message storing, erasing and display features for the vehicle operator in addition to the automatic remote vehicle option control described above. Thus, in addition to the interrupt routine described in connection with FIGS. 46A–46D, the main program routine for the microcontroller provides a variety of message storing, displaying, and controlling functions as now described.

Figure 46E:
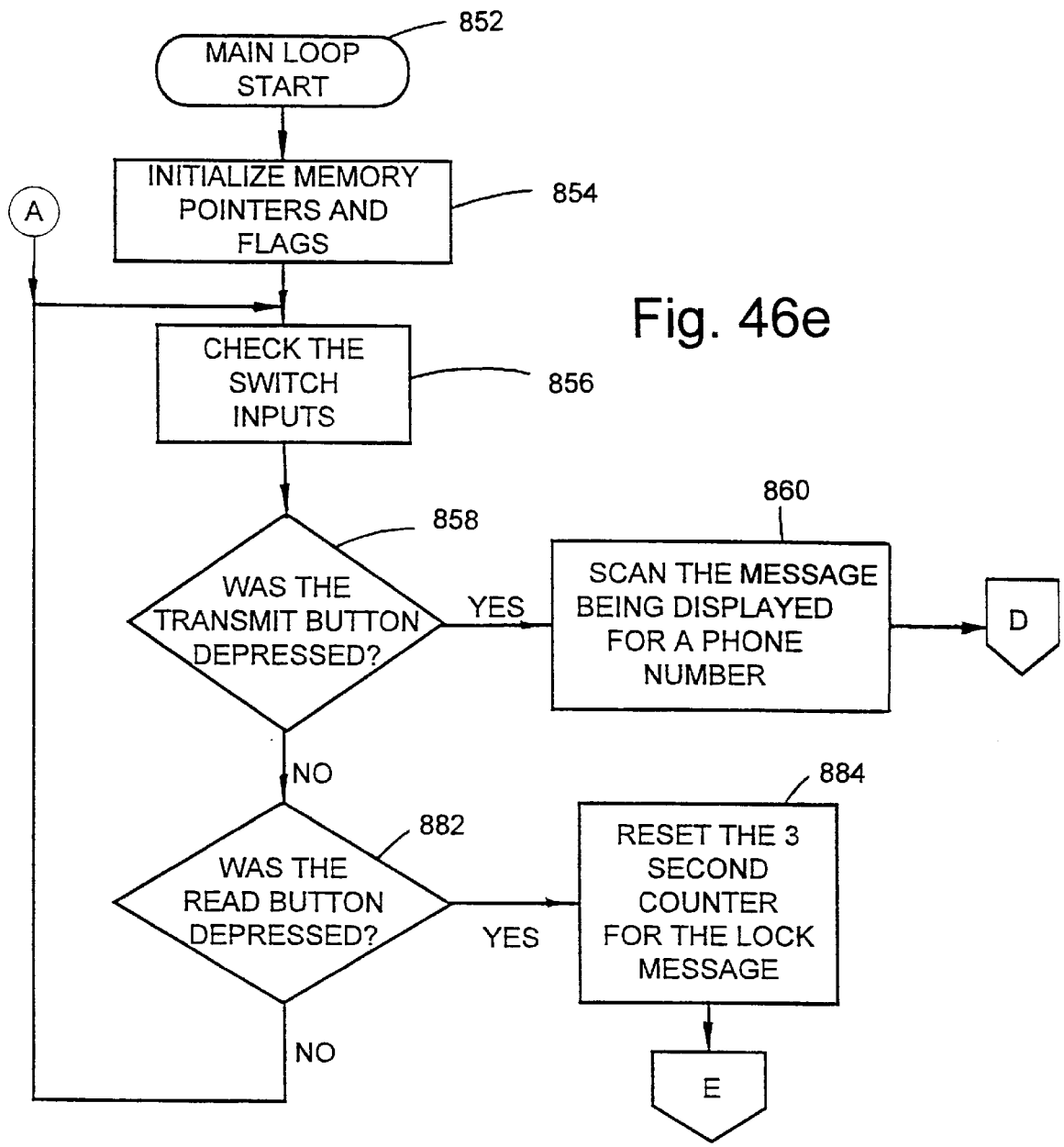
Figure 46F:
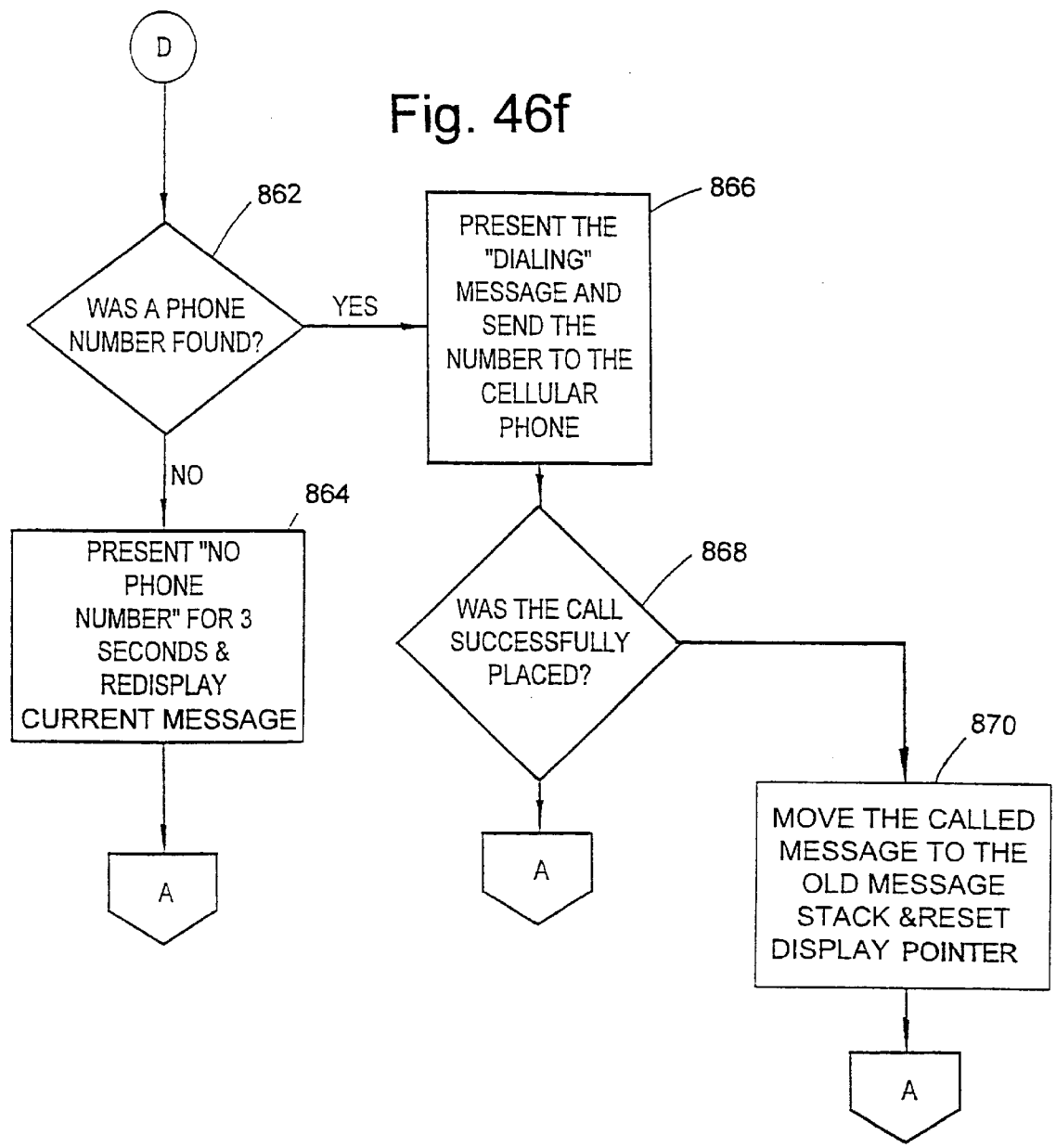
Figure 46H:
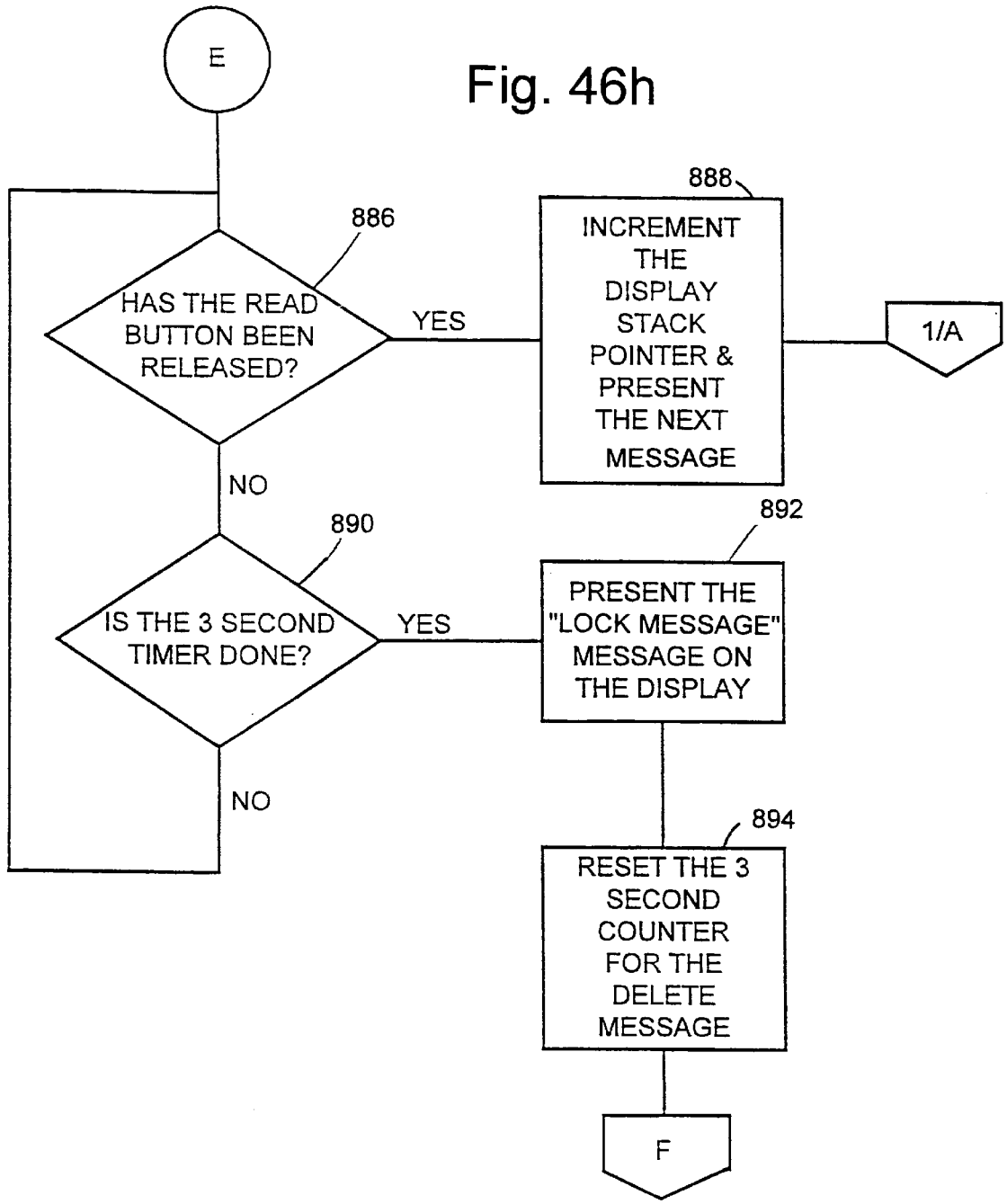

Referring to FIG. 46E, the main program routine of the microcontroller starts as indicated by block 852 upon power-up and initializes memory pointers and flags as indicated by block 854. The input port A from the interrupt routine indicated in FIG. 46A precedes the program test indicated by block 856 of the status of transmit and reads switches 745 and 741, respectively (FIG. 44). The program first tests to determine whether or not the transmit push-button switch was depressed as indicated by block 858 and if it was, it scans the information displayed to determine whether or not a telephone number exists. This is indicated by block 860 whereupon the program tests to determine whether a telephone number was found in the message as indicated by block 862 of FIG. 46F. It is noted that in FIGS. 46A–46K, the interconnections of the flow diagram ports are identified by corresponding letters.

If no telephone number was found, display 740 displays the no telephone number message as indicated by block 864 for three seconds and redisplays the current information, whereupon the program proceeds to input A of FIG. 46E and recycles. If a telephone number was found, as indicated by an affirmative test in block 862, and the vehicle includes a cellular telephone which is coupled through the multiplex bus 742 to the microcontroller 735, the vehicle operator can automatically dial the displayed telephone number. For this purpose, the program presents a dialing message to the vehicle operator as indicated by block 866. If the operator wants to auto-dial the displayed number, the transmit or call button was actuated as previously indicated by the test of block 858 in FIG. 46E and the detection and display of a telephone number in the message. The program then tests to determine whether or not telephone connection was made by the cellular telephone and if not, the program proceeds to block A of FIG. 46E and cycles through the test loop again. If a telephone call was successfully placed, the call message is advanced to the old stack as described in connection with FIG. 46G now described and the display pointer is reset thereupon the program returns to port A of FIG. 46E.

FIG. 46G illustrates the memory mapping for incoming messages. The program permits the vehicle operator to lock desired messages into a block of memory, for example, memory space for five alpha-numeric pages 871–875 is provided. These messages will be, depending upon the desired degree of sophistication for the system, numeric, or alpha-numeric messages having 24 characters. The information can displayed in the 20-character display 740 of FIG. 44 by sequentially displaying 12 characters at a time. This can be done automatically if desired, or the read switch 741 can be activated for scrolling to the second half of the displayed message. Incoming messages are displayed at the current memory location 876 while the system includes five old message memories in a first-in-last-out (FILO) storage system indicated by memory blocks 877–881. Locked messages, as discussed below, will remain in memory for future reference regardless of the number of incoming messages while the old messages, unless locked, will be sequentially dumped from the last memory location 881 upon receipt of incoming messages which bump the incoming message from the previous message from block 876 to block 877. This is indicated by block 870 of FIG. 46F of the flow diagram.

Returning now to FIG. 46E, if the transmit button has not been actuated as indicated by a negative decision on block 858, the program tests to determine whether or not the read switch 741 of FIG. 44 has been actuated as indicated by block 882. If the read switch was not depressed, the program cycles through tests 856, 858, and 882 with the periodic interrupt routine set forth in FIGS. 46A–46D being conducted to the interrupt to this main routine and checks for incoming option control or messages. If the read switch has been actuated, a three-second counter for locking the message is reset as indicated by block 884. The program then proceeds to port E of FIG. 46H. How long the read switch is being depressed determines a variety of functions of the system. If the read switch is momentarily depressed (i.e., released within three seconds as indicated by the test of block 886), the display stack pointer is incremented and the next message is displayed as indicated by block 888. If, however, the switch is held down beyond three seconds, as indicated by a negative test at block 886 and a positive result of test block 890, the program displays to the vehicle operator a lock message inquiry asking the operator if the message (i.e., displayed message) should be placed in one of the locked message memory locations 871–875 shown in FIG. 46G. If upon receiving this prompt the vehicle operator releases the read switch, the previously-displayed message information will be placed in a locked message memory location. At the time the lock message is displayed, the three-second counter for a delete message is reset as indicated by block 894 and the program proceeds to port F of FIG. 46I to determine whether or not the operator continues to depress the read switch. If the read switch has been released indicating the operator would like to lock the message into memory, test 896 of FIG. 46I will be affirmative and the program proceeds to port G of FIG. 46J.

The program then tests to determine if the locked stack (i.e., memory locations 871–875) is full as indicated by block 898. If not, the incoming message being displayed is stored in memory block 871 and the remaining locked memory messages are shifted downwardly as indicated by block 900 (FIG. 46J). The program then returns to port A of FIG. 46E. If the locked message memory stack is fall, an affirmative test at block 898 causes the message locked memory full to be displayed as indicated by block 902 to the vehicle operator and then the program returns to port A of FIG. 46E. This all occurs within the three- to six-second interval while the vehicle operator is holding the read button in a depressed condition.

Figure 46I:
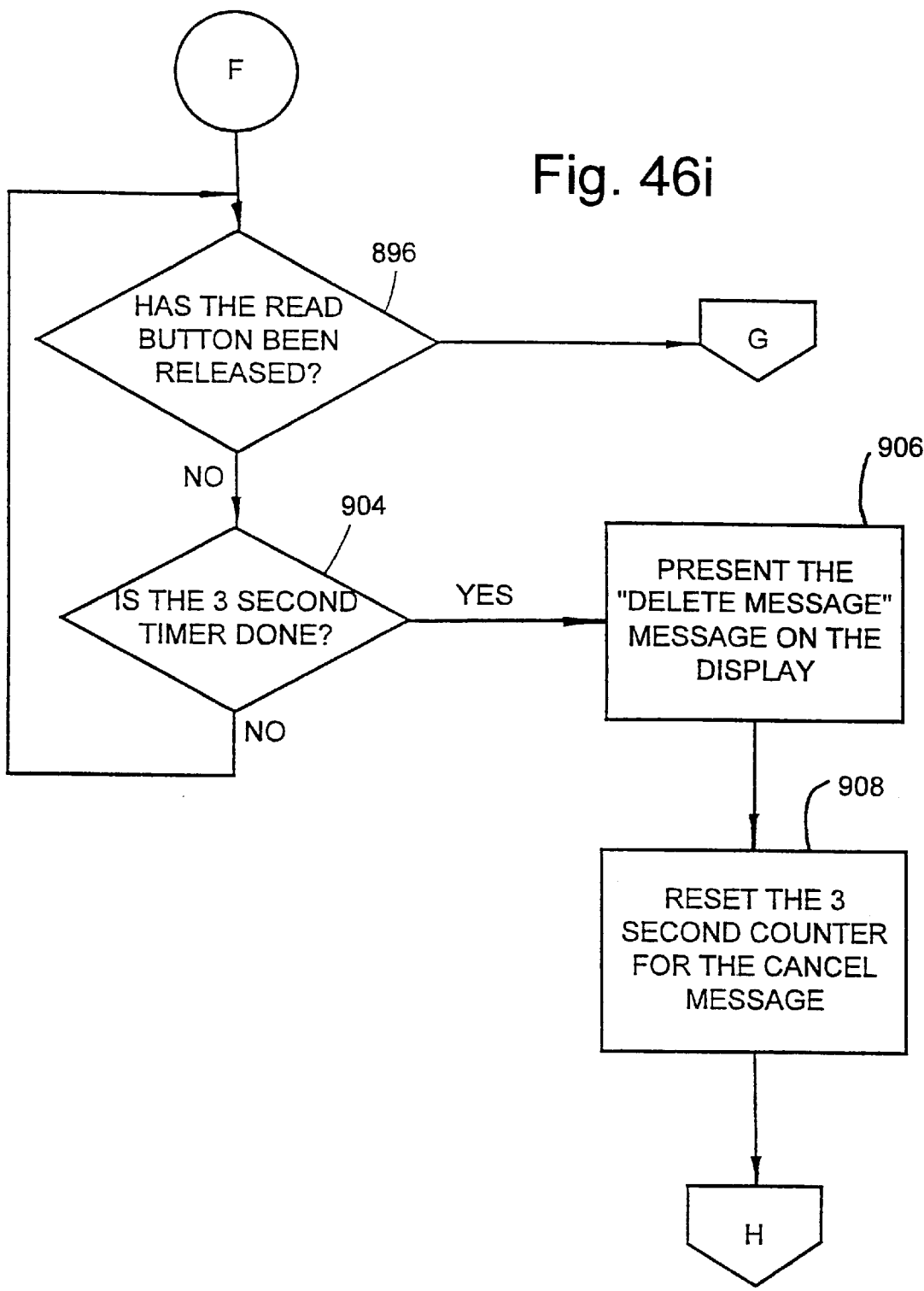
Figure 46J:
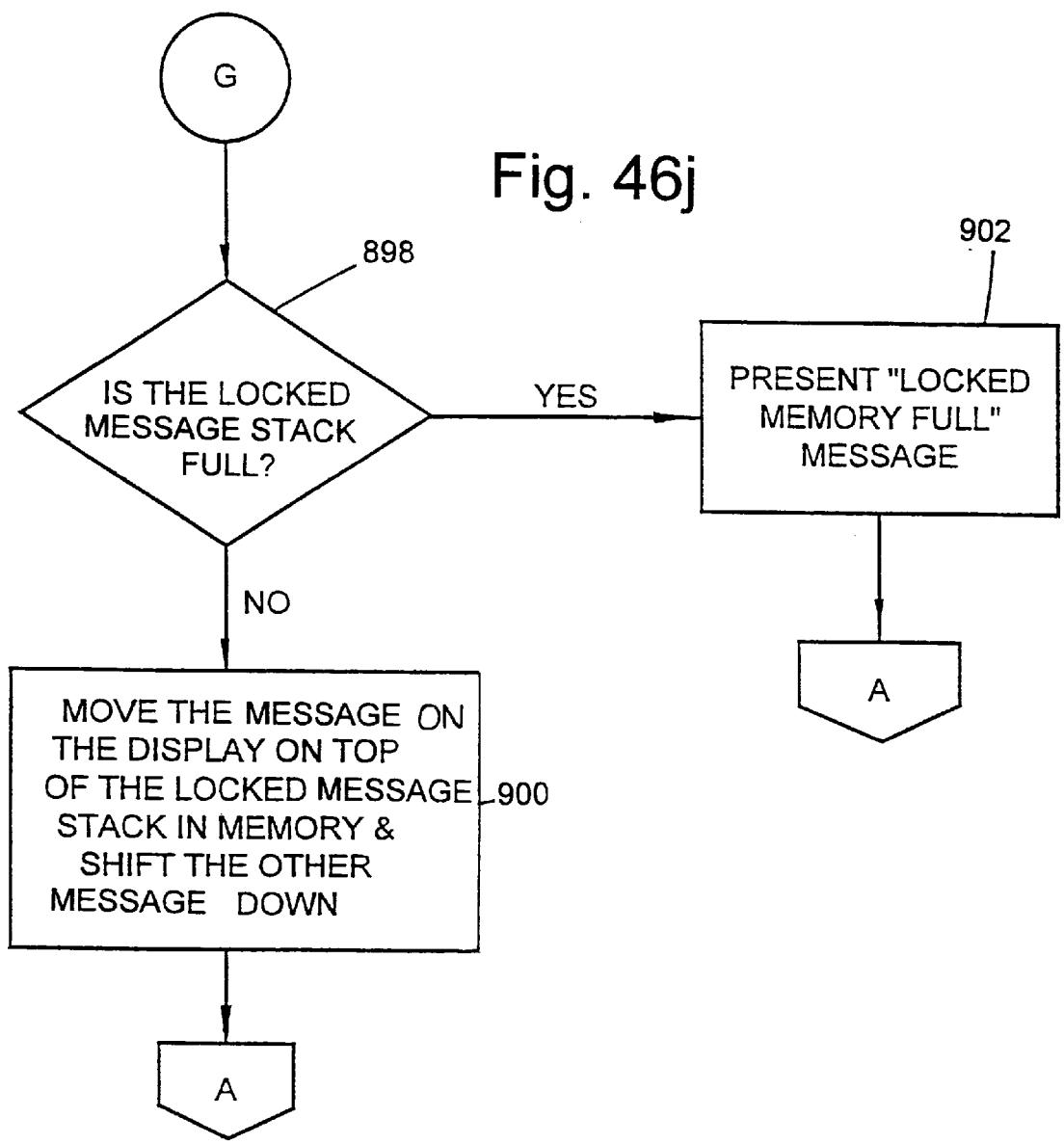
Figure 46K:
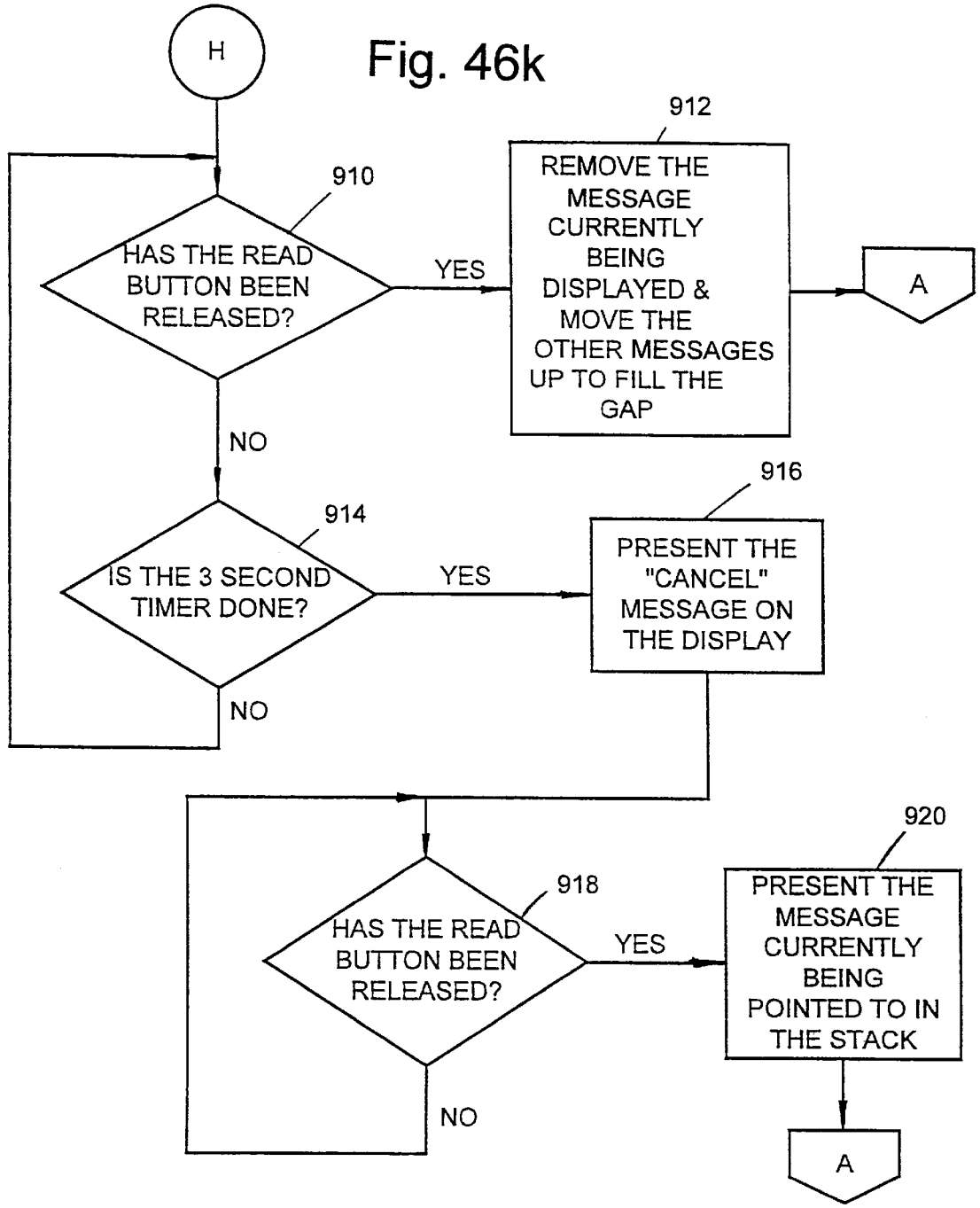

If the read switch remains depressed beyond six seconds, as indicated by block 904 of FIG. 46I, the program tests to see if the previously reset three-second timer has timed out, if not, it continues testing to determine whether or not the read switch has been released. If the three seconds (now six seconds total) has expired, the delete message indicator is displayed on the display 740 as indicated by block 906. This presents the vehicle operator a three-second interval between the six-and nine-second time period in which to, as described below, delete the message from the memory. Initially, the three-second counter for the "cancel" message is reset as indicated by block 908. The program proceeds to input H of FIG. 46K. At this time, the operator has held the read switch in for a period of six seconds and a message "delete message" is being displayed. If the read switch is released, as indicated by block 910 of FIG. 46K, the displayed message is deleted from memory and the remaining memory messages are advanced as indicated by block 912 and the program proceeds to port A of FIG. 46E. If the displayed message is not desired to be deleted, the operator can hold the read switch down, as indicated by block 914, until the six- to nine-second time period has been exceeded and the three-second timer again times out presenting a "cancel" message to the vehicle operator as indicated by block 916.

At this point in time, the vehicle operator can release the read switch 741 as indicated by block 918 and the current message is again displayed and the program returns to port A of FIG. 46E thus allowing the vehicle operator to cycle through the memory to determine whether or not the operator desires to insert a message into a locked memory location if the memory is full. Thus, by using a single switch 741, the vehicle operator can sequence through stored messages of display information including locked messages and insert messages into the locked message memory as desired. By only momentarily depressing the read button, the sequence of messages shown in FIG. 46G are displayed to the vehicle operator and, if desired, any telephone number contained in any of such messages can be automatically dialed by actuating the transmit button when the message is currently displayed on display 740.

Thus, the system of the present invention provides a vehicle with a receiver for receiving a vehicle option control address and command signals for changing a vehicle option remotely and one which can also receive a paging address and paging message. In one embodiment, the system is capable of both functions and the receipt of alpha-numeric messages which can be employed for automatically dialing a cellular telephone if the vehicle has a telephone installed and connected to the multiplex bus or otherwise directly wired to a serial data port such as an RS-232 port of microcontroller 735. Cellular telephones typically include input ports for such purpose. Similarly, the microcontroller interfaces with a plurality of vehicle accessories indicated by conductors 750–764 or through the multiplex computer 770 of FIG. 45 to such systems for activation or deactivation of a variety of vehicle options.

As shown in FIG. 47B, the vehicle may also include a plurality of other control modules $1000_1$-$1000_N$ each associated with a controlled vehicle accessory and having a multiplex interface chip $1010_1$-$1010_N$ coupled to bus 742 via conductors $1020_1$-$1020_N$, respectively. Control modules $1000_1$-$1000_N$ may be associated with one or more of the following vehicle accessories in various combinations thereof. The associated vehicle accessories may include: a door locking actuator for each door; a window opening actuator for each movable window; a sunroof actuator; vehicle headlights; horn; seat position actuators; seat heaters; mirror position actuators; a rearview mirror reflectivity adjusting circuit; a compass; vehicle gauges; vehicle displays; interior lighting; a rear defrost circuit; a fuel door locking mechanism; a trunk locking mechanism; and various circuits for producing an audible chime within the vehicle's interior.

In addition to those inputs to microcontroller 735 or microcontroller 770 as shown in FIGS. 44, 45, and 47, respectively, various other input signals may be provided including input signals from the following: each of the window switches; a circuit for detecting whether a key is in the ignition; a speedometer; an RPM detecting circuit; a battery voltage detecting circuit; a fuel level sensor; the turn signal circuit; ambient light sensors; a reverse gear switch input; a drive gear switch input; a park gear switch input; a rain sensor; an interior thermometer; an exterior thermometer; an engine temperature sensor; an oil pressure sensor; a rear defrost switch; door open/closed sensors; a driver's exterior door lock sensing circuit; and a headlight switch. As will be apparent from the following description of the operation of the foregoing system, microcontroller 735 and microcontroller 770 utilize various combinations of these input signals to control the various vehicle accessories associated with the control modules connected to multiplex bus 742 in a manner defined by a control program stored in a non-volatile memory of the respective microcontroller.

FIGS. 48–56 show an example of a main control program and its various subroutines that may be used to control the operation of various combinations of vehicle accessories. Upon reading this Specification, those skilled in the art will recognize that such a control program may be implemented in many different forms taking into account the large number of possible combinations of vehicle accessories that the main control program is responsible for controlling. Further, those skilled in the art will recognize that various functions of the exemplary main control program may be delegated to microcontroller 770 and/or the various control modules associated with the vehicle accessories. It should be noted that the previously-described main pager program routine described above with respect to FIGS. 46A–46K, may be incorporated into the main control program described below as an integral part or called subroutine.

In general, the main control program utilizes a modifiable data structure to determine which of several possible subroutines to execute in response to a given input signal. As exemplified in the main control program as described below, such a data structure may take the form of a plurality of tables, each associated with one of several vehicle operators, including a plurality of entries corresponding to flags read from these tables by the main control program to determine the desired accessory control operations to be executed in association with the current vehicle operator.

Figure 48A:
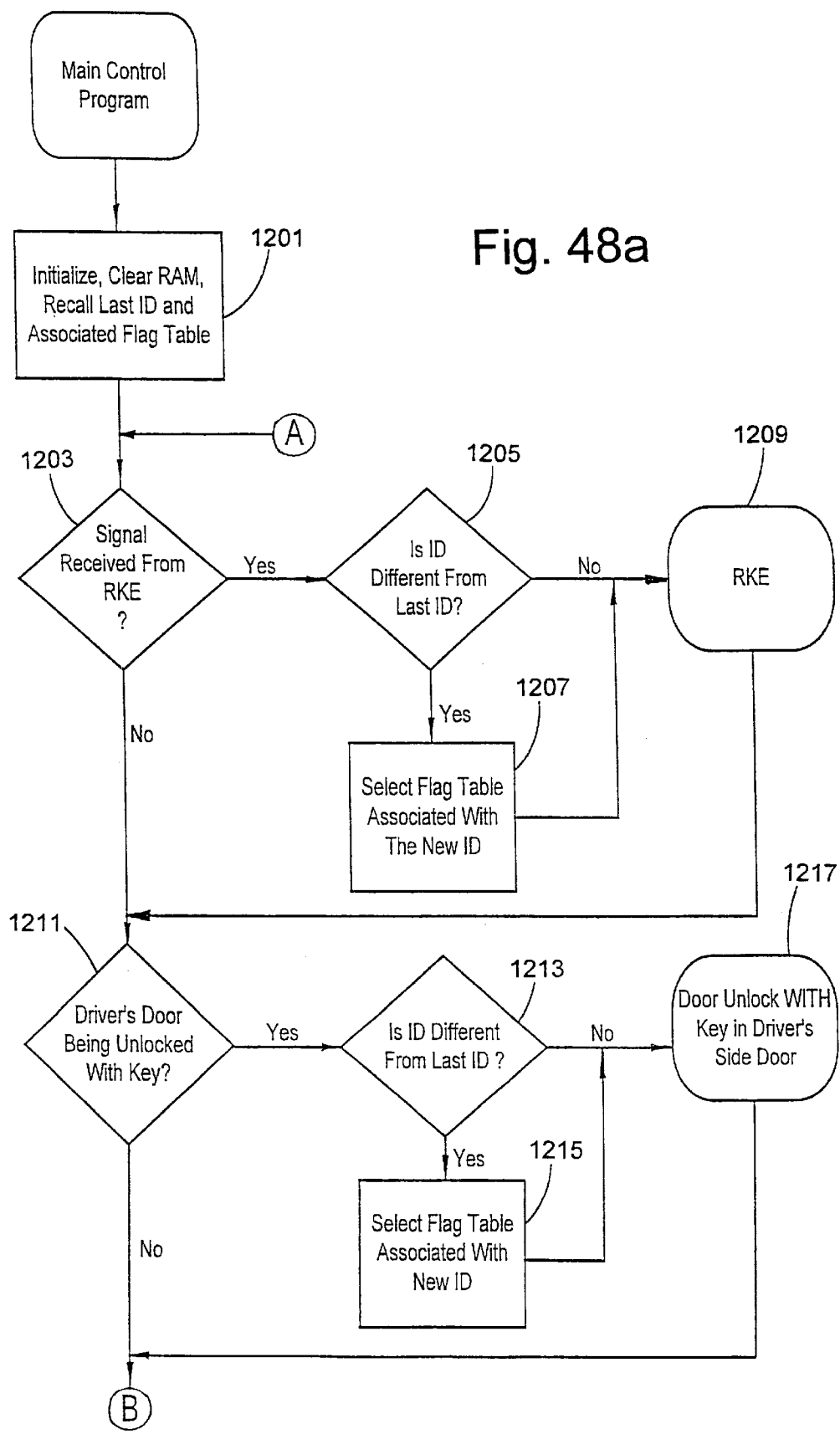

Referring to FIG. 48A during system initialization, microcontroller 735 begins the execution of the main control program by clearing its RAM, recalling the last user ID by reading the same from the non-volatile memory, and reading a flag table associated with the last ID (step 1201). Initially, the associated flag table may be set in the factory or by the dealer to specify default values. As described below, the flags in the flag table may subsequently be modified by a reprogramming signal included in either a paging signal or a cellular RF control signal having the vehicle's ID.

Following initialization, microcontroller 735 periodically wakes from a sleeping state to turn on its RF receiver to determine whether a signal is received from an RKE transmitter (step 1203). If the RKE transmitters associated with the vehicle each transmit different user IDs, microcontroller 735 may be programmed to read the ID from the signal transmitted from the RKE transmitter and compare the received ID with that stored in memory in association with the last user ID (step 1205). If a new ID has been received, microcontroller 735 selects the flag table associated with the new ID and sets a new ID flag for subsequent reference (step 1207) prior to executing an RKE subroutine (step 1209). On the other hand, if the received ID is the same as the last ID, or if the transmitted signal does not include a user ID, microcontroller 735 proceeds directly to the steps defining the RKE subroutine 1209.

Figure 49A:
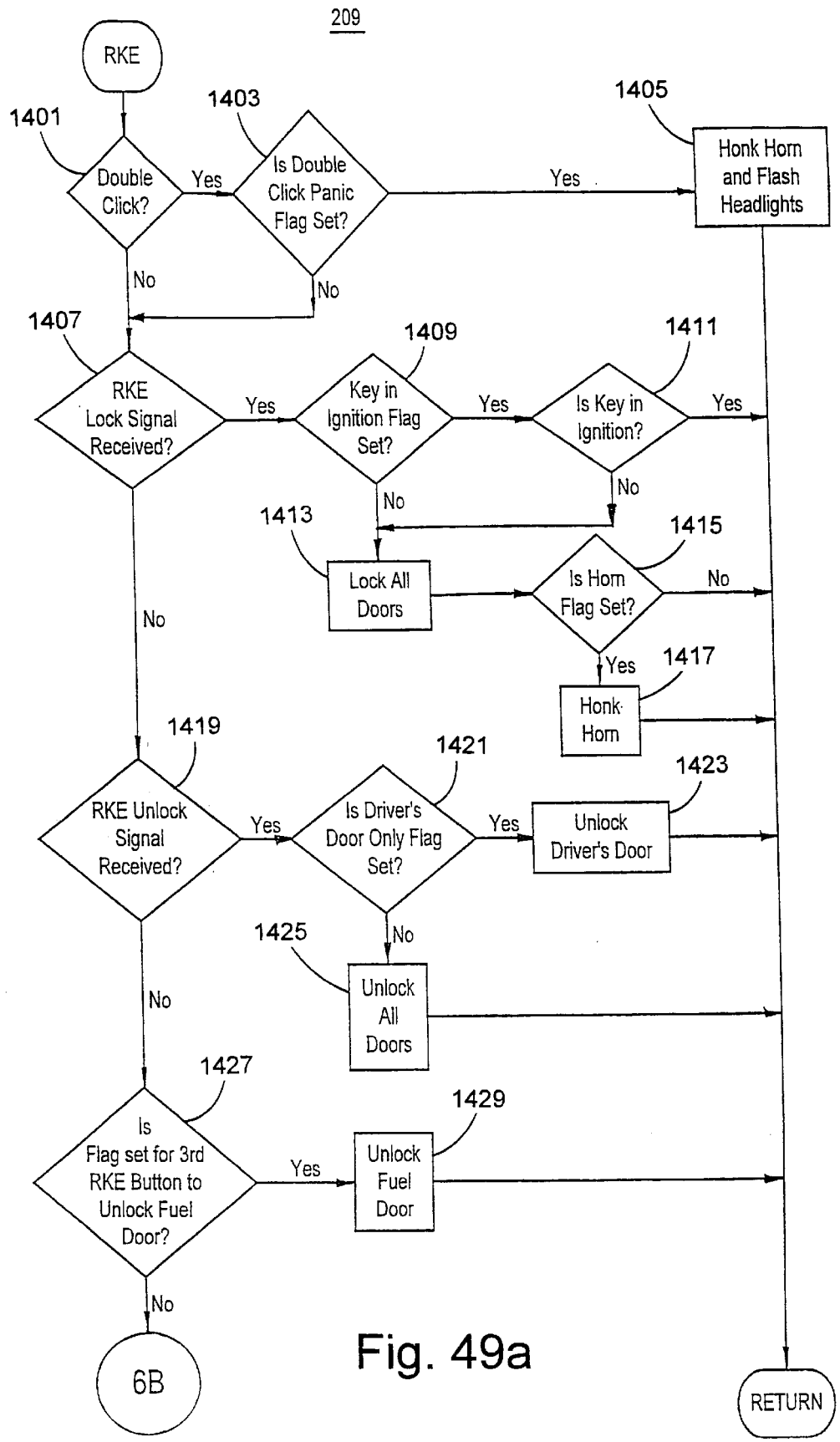
FIGS. 49A and 49B are flow diagrams of a first subroutine that may be called by the main control program.
Figure 49B:
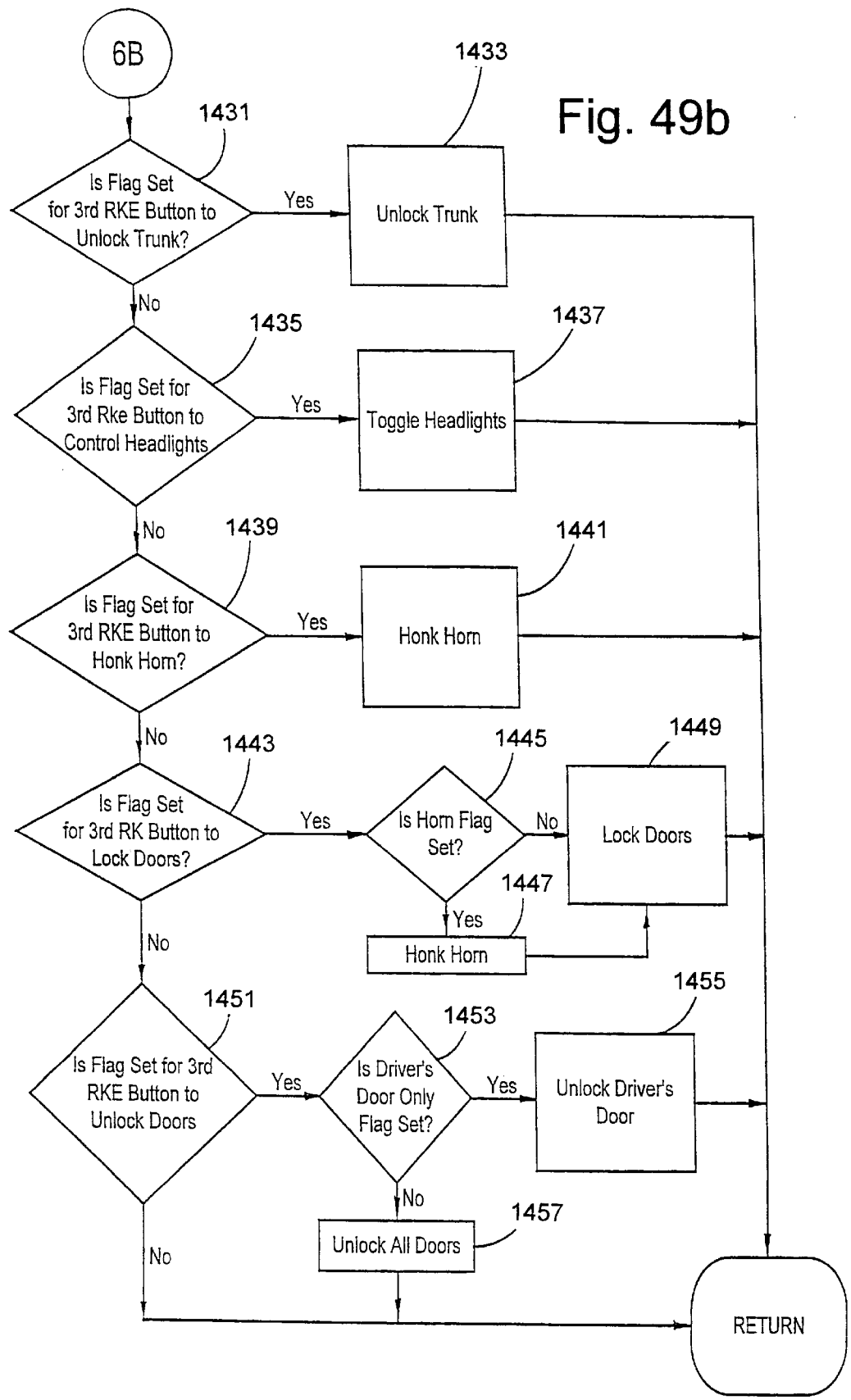

Referring to FIGS. 49A and 49B, which show the steps performed in RKE subroutine 1209, microcontroller 735 first will determine whether the person activating RKE transmitter double-clicked any of the RKE transmitter buttons (step 1401). If microcontroller 735 detects a double-click, it then checks a predefined location within the flag table associated with the user ID to determine whether a flag has been set to instruct microcontroller 735 to perform a panic routine in which microcontroller 735 responds to a double-click by honking the horn and flashing the headlights (step 1405) prior to returning to the main control program at step 1211 (FIG. 48A). If microcontroller 735 does not detect a double-click, or if the double-click panic flag is not set, microcontroller 735 determines whether the signal received from the RKE transmitter corresponds to a door lock signal (step 1407).

In the example shown in FIG. 49A, there are two options that may be set to change the manner by which the microcontroller 735 controls the vehicle accessories in response to an RKE lock signal. The first option prevents the user from locking the vehicle when a key is detected in the ignition. To implement this option, the RKE subroutine 1209 first checks whether the associated flag has been set in the flag table (step 1409) and then checks whether an input signal is received from an ignition key sensor (step 1411). If a key is in the ignition, microcontroller 735 will not lock the doors and will proceed to step 1211 in the main control program. If a key is not in the ignition, or if the flag is not set for this option, microcontroller 735 proceeds to lock all the doors of the vehicle (step 1413).

The second option associated with an RKE lock signal is to honk the horn after the doors have been locked as a confirmation to the vehicle operator. Thus, after locking all the doors in step 1413, microcontroller 735 next determines whether the flag associated with this second option has been set (step 1415). If the flag has not been set, microcontroller 735 proceeds to execute step 1211 in the main control program and the routine for honking the horn after locking all the doors would remain a dormant subroutine which could not be executed unless the flag associated with this option has been set in the flag table associated with the user.

If in step 1407 microcontroller 735 determines that the transmitted RKE signal is not a lock signal, it will then determine whether the receive signal is an unlock signal (step 1419). If the receive signal is an unlock signal, microcontroller 735 determines whether a flag has been set to instruct microcontroller 735 to unlock the driver's door (step 1421). If the flag has been set, microcontroller 735 only unlocks the driver's door in response to the RKE unlock signal (step 1423). However, if this flag has not been set, microcontroller 735 unlocks all the doors in response to a received RKE unlock signal (step 1425).

RKE subroutine 1209 provides for several selectable control routines that microcontroller 735 may execute in response to receiving an RKE signal from a third button on the RKE transmitter. Thus, if in steps 1407 and 1419, microcontroller 735 determines that the received RKE signal is not a lock or unlock signal, it assumes the receive signal is associated with a third RKE button and determines in steps 1427, 1431, 1435, 1439, 1443, and 1451 which control operation is to be performed in response to the received RKE signal by checking the associated flags at predetermined locations in the flag table. In response to a signal corresponding to the third RKE button, microcontroller 735 may unlock the fuel door (step 1429), unlock the trunk (step 1433), turn on and off the headlights (step 1437), honk the horn (step 1441), lock the doors (step 1449), or unlock either the driver's door (step 1455) or all the doors (step 1457). If the flag is set for the third RKE button to lock the doors, microcontroller 735 may determine whether the flag is set (step 1445) to honk the horn (step 1447) to confirm that all the doors have been locked (step 1449). Further, if the flag is set for the third RKE button to unlock the doors, microcontroller 735 can determine whether to unlock only the driver's door or all the doors by checking whether a flag is set in the flag table (step 1453).

Referring back to FIG. 48A, if microcontroller 735 determines in step 1203 that a signal has not been received from an RKE transmitter, or following completion of the RKE subroutine 1209, microcontroller 735 checks whether an input is received from a circuit detecting whether the driver's door is being unlocked from the exterior with a key (step 1211). If a user ID may be input from a keypad on the exterior surface of the door or from a key itself, microcontroller 735 determines whether a detected ID is different from the last ID stored in memory (step 1213). If the ID is not different, microcontroller 735 selects the flag table associated with the last ID stored in memory and proceeds to execute subroutine 1217. Otherwise, microcontroller 735 selects a flag table associated with the new ID (step 1215) prior to executing subroutine 1217.

Figure 50:
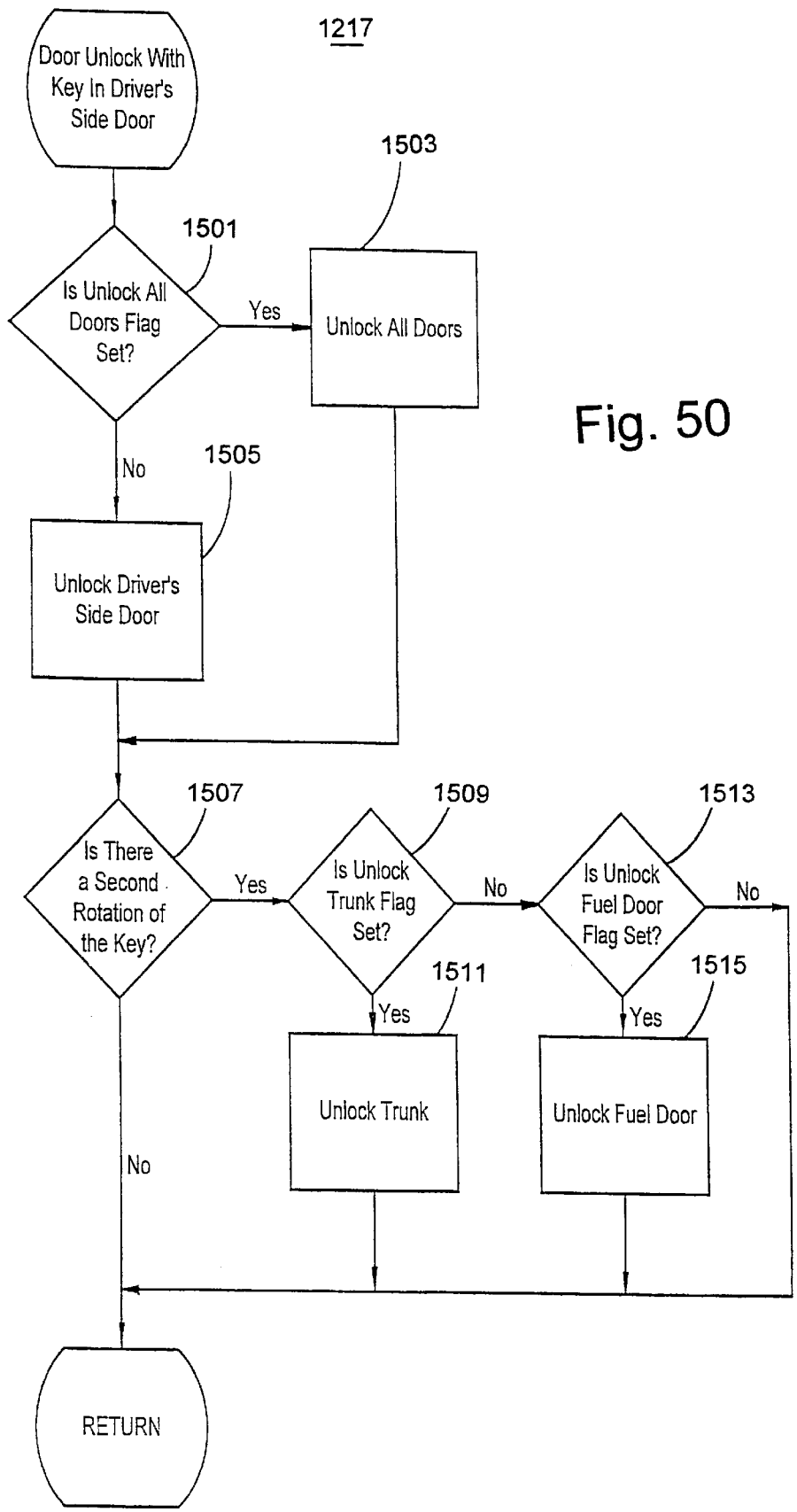
FIG. 50 is a flow diagram of a second subroutine that may be called by the main control program.
Figure 51:
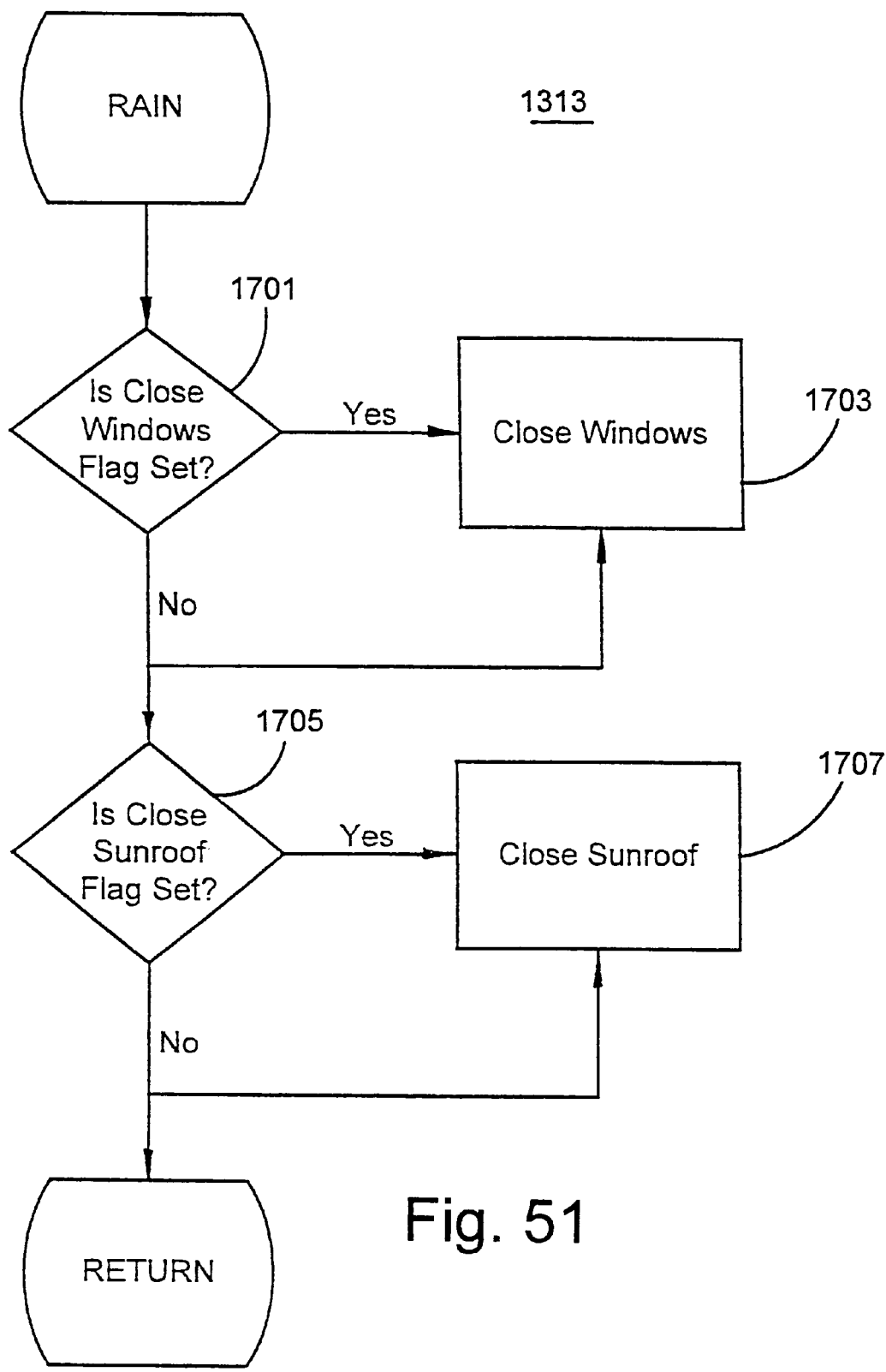
FIG. 51 is a flow diagram of a fourth subroutine that may be called by the main control program.
Figure 52:
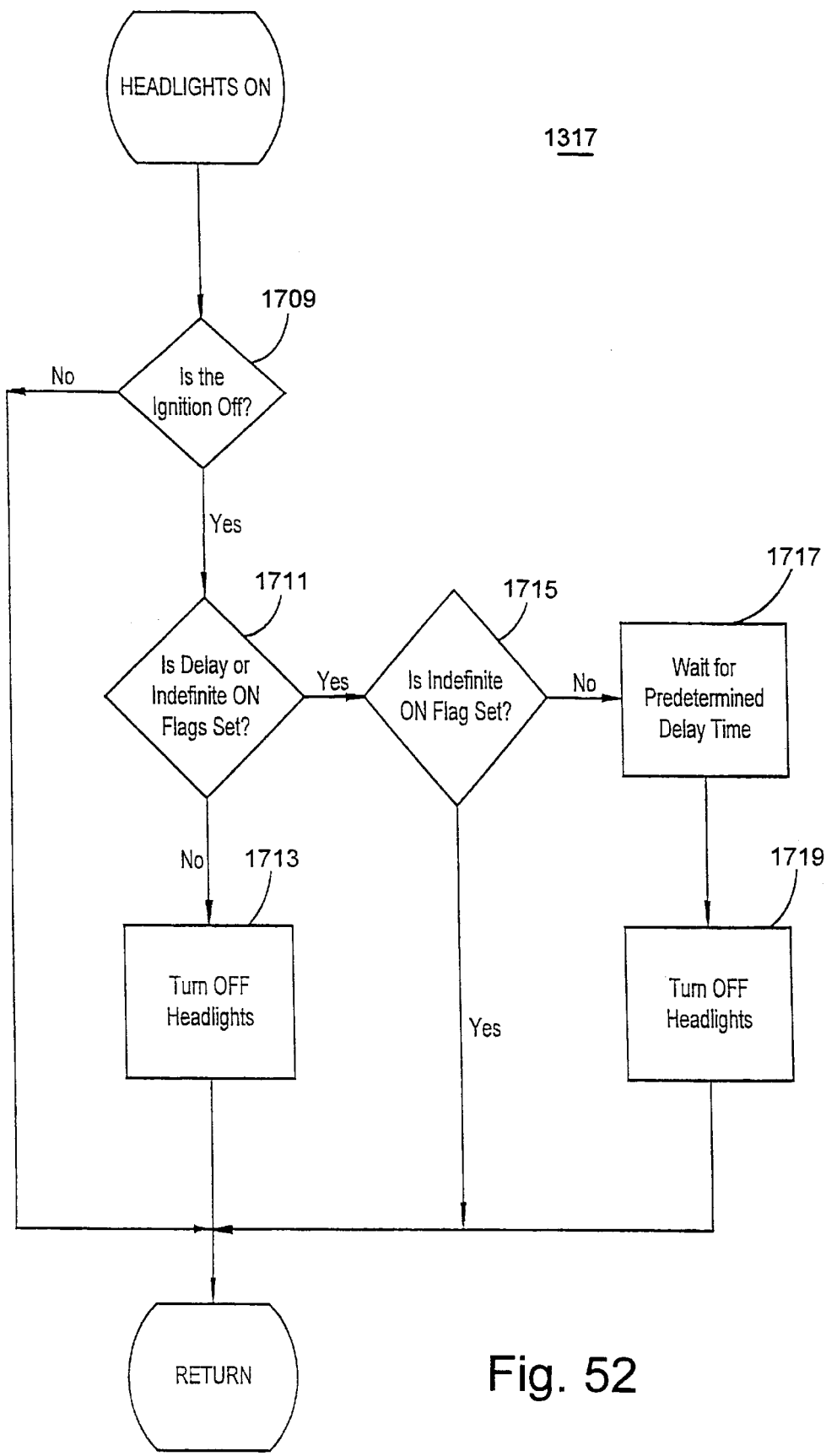
FIG. 52 is a flow diagram of a fifth subroutine that may be called by the main control program.
Figure 53:
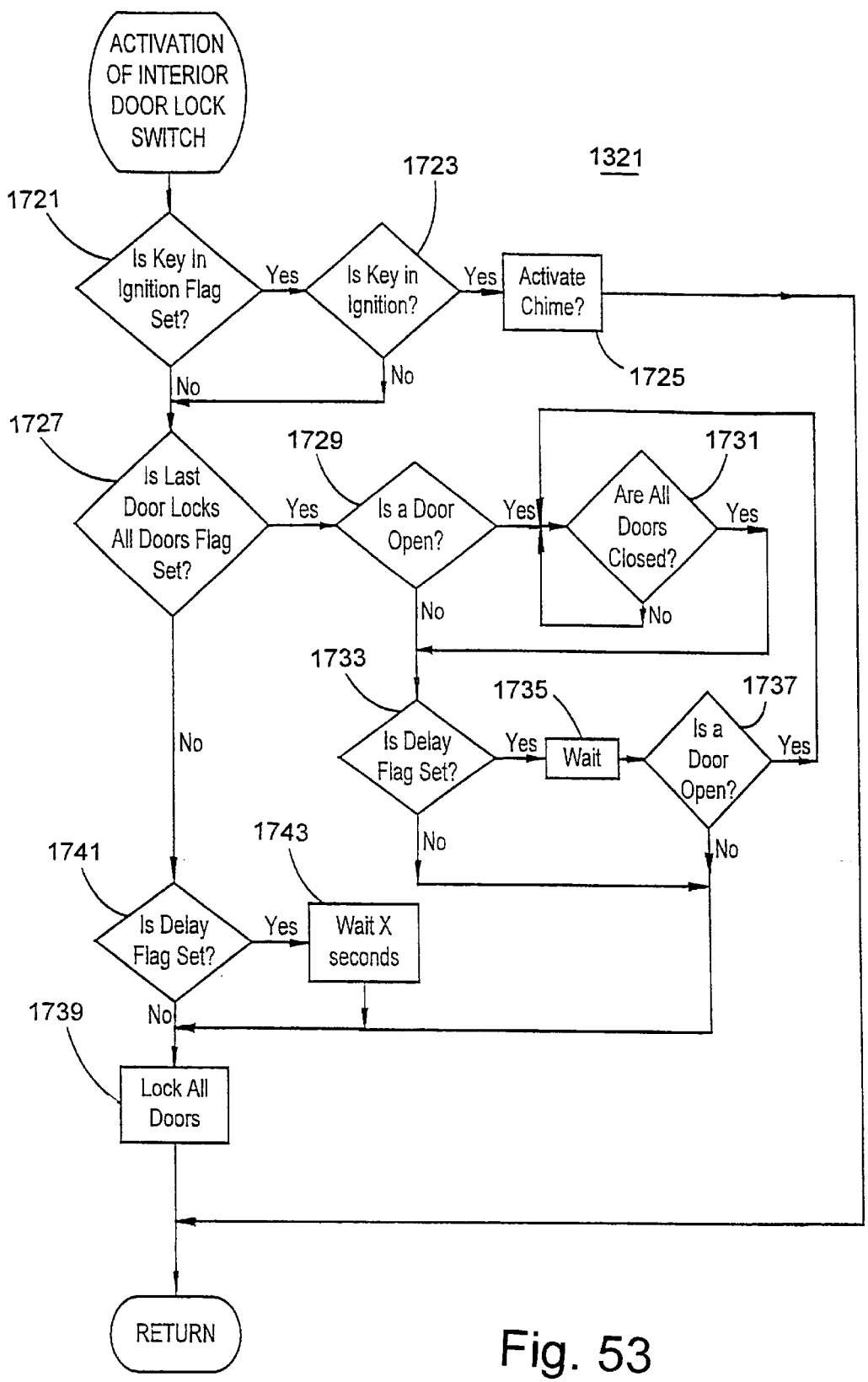
FIG. 53 is a flow diagram of a sixth subroutine that may be called by the main control program.
Figure 54:
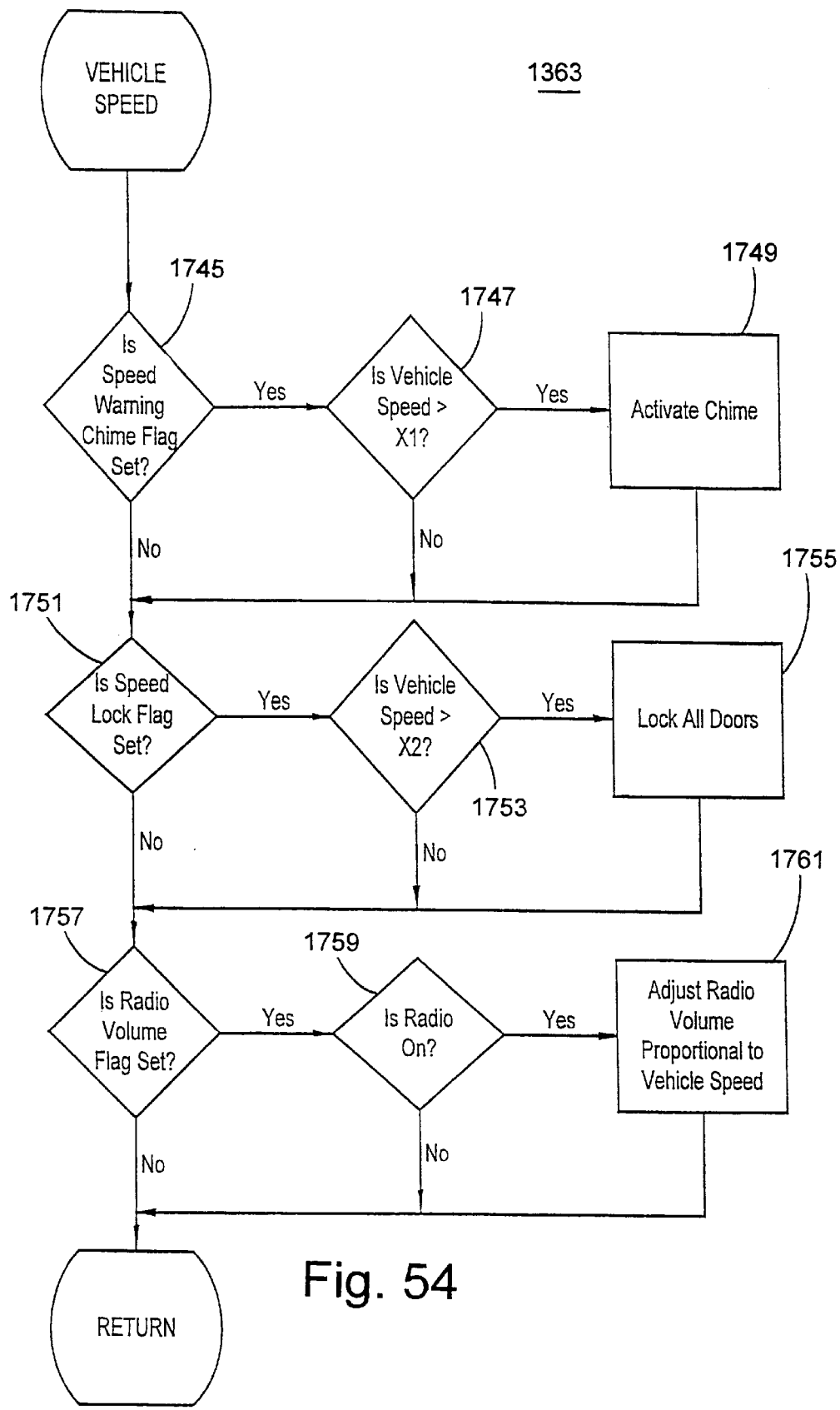
FIG. 54 is a flow diagram of a seventh subroutine that may be called by the main control program.
Figure 55:
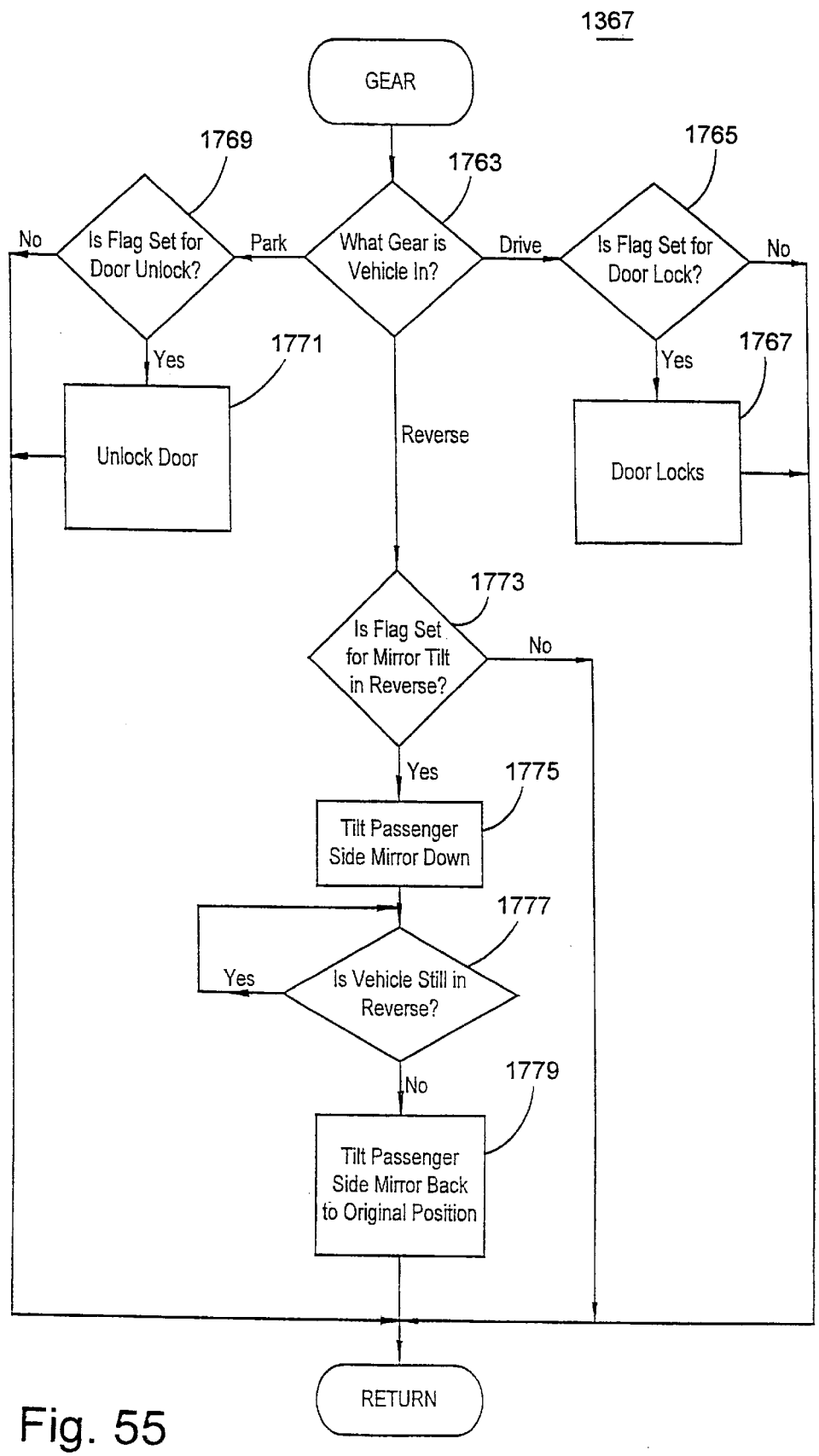
FIG. 55 is a flow diagram of an eighth subroutine that may be called by the main control program.

Subroutine 1217 is shown in FIG. 50 and begins with step 1501 in which microcontroller 735 checks whether an unlock all doors flag has been set. If this flag has been set, microcontroller 735 unlocks all the vehicle's doors (step 1503) in response to a door unlock signal received through the keyslot or keypad on the exterior of the driver's door. Alternatively, if the unlock all doors flag is not set, microcontroller 735 unlocks only the driver's door (step 1505).

In association with the keyslot on the driver's door, three different options may be selected upon a detection of a second rotation of the key in the keyslot (step 1507). If an unlock trunk flag is set (step 1509), microcontroller 735 unlocks the trunk (step 1511). If the unlock trunk flag is not set, but an unlock fuel door flag is set (step 1513), microcontroller 735 may unlock the fuel door (step 1515). If neither the unlock trunk nor the unlock fuel door flags are set, microcontroller 735 may do nothing in response to a detection of a second rotation of the key in the keyslot. If a second rotation is not detected, or after the preprogrammed function has been executed, microcontroller 735 proceeds to execute step 1219 in FIG. 48B.

Figure 48B:
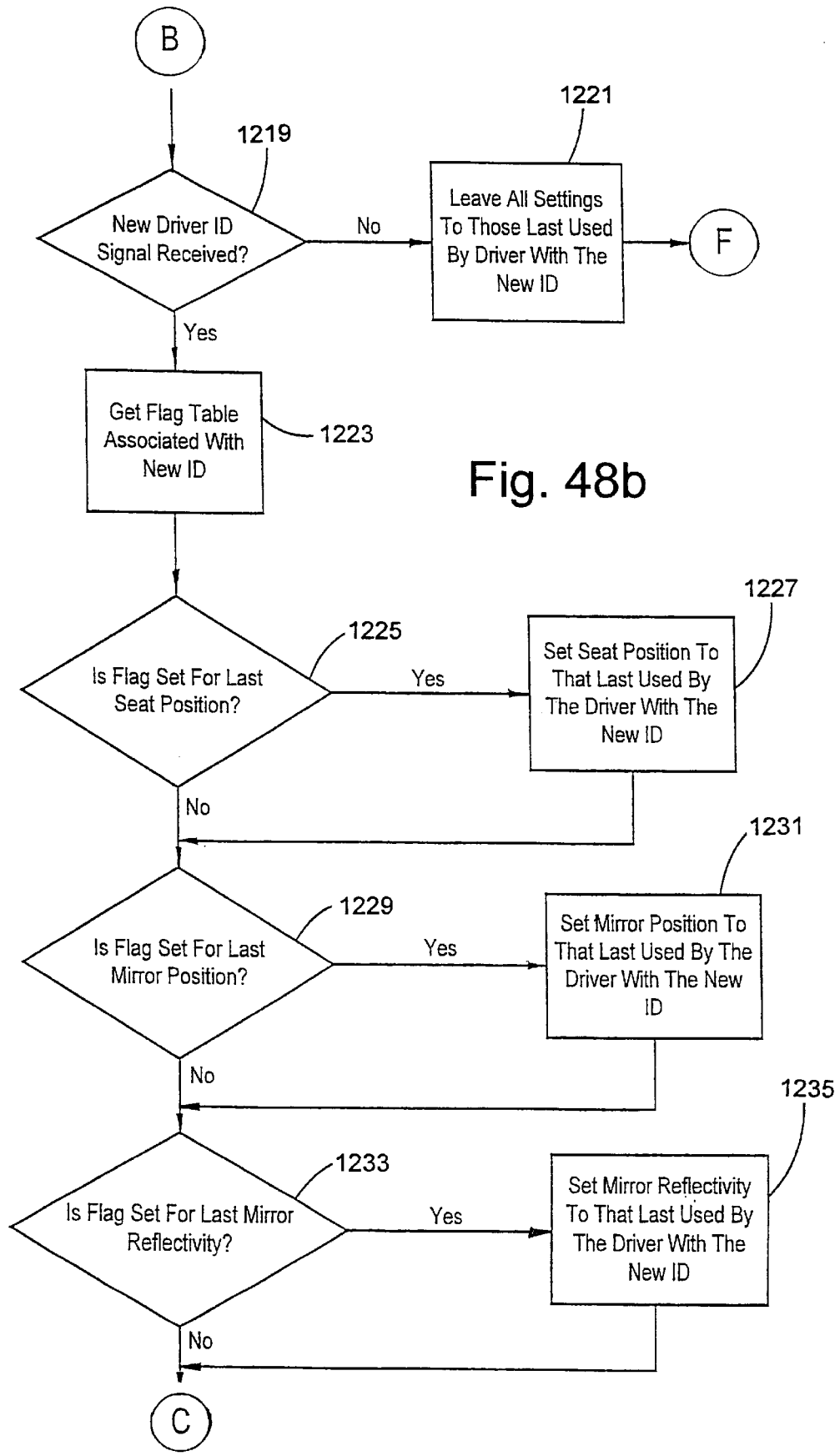
Figure 48C:
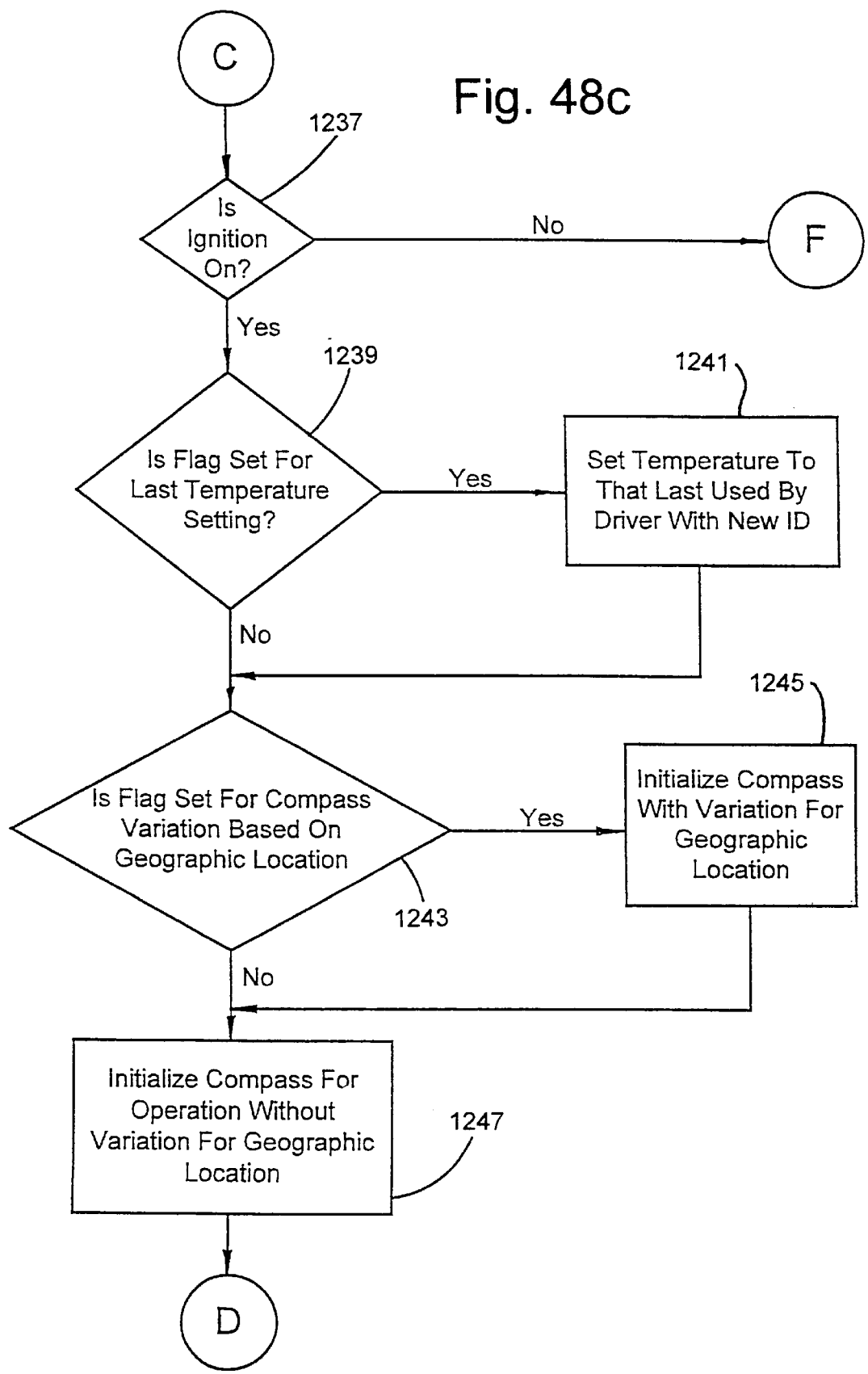
Figure 48D:
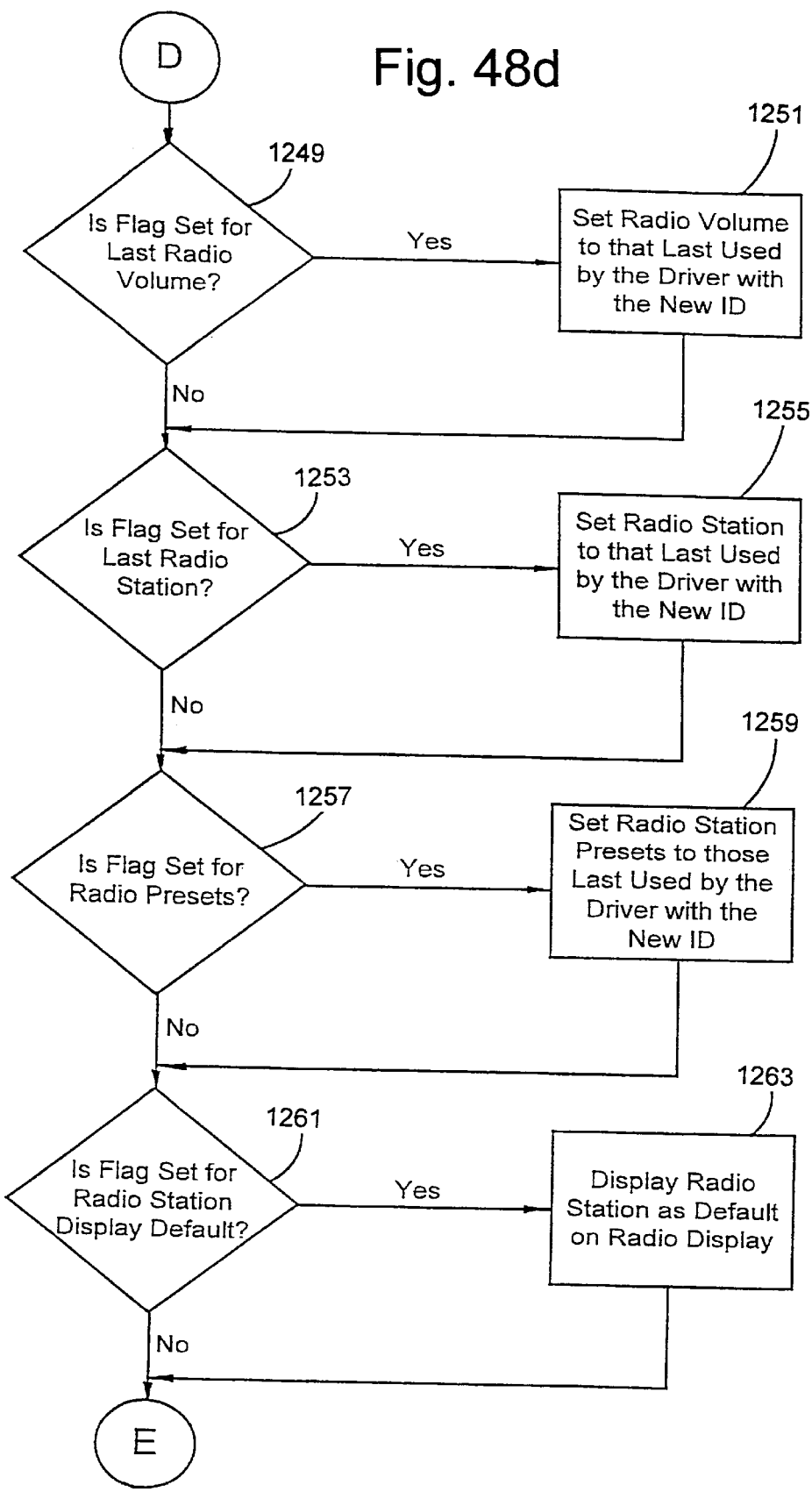

In step 1219 of FIG. 48B, microcontroller 735 checks whether a new driver ID signal has been received. Because various mechanisms may be used to input a driver's ID such as a keypad or a user ID dedicated push-button, it may be appropriate for microcontroller 735 to monitor such input mechanisms to determine whether a new driver ID signal has been received. If a driver ID signal is received that is the same as the last user ID stored in memory, or if no new driver ID signal is received, microcontroller 735 leaves all the settings in the vehicle to those last used by the driver with the last ID stored in memory (step 1221) and the program advances to step 1281 shown in FIG. 48F. If a new driver ID signal is received, microcontroller 735 executes a routine (steps 1223–1279, FIGS. 48B–48E) to initialize various vehicle accessories to those preferred and set by the driver with the received new driver ID utilizing the flag table associated with this new ID (step 1223).

A first vehicle accessory that may be initialized is the position of the driver's seat. Thus, if the driver with the new ID has selected the last seat position memory feature, microcontroller 735 will determine in step 1225 that the associated flag has been set and will set the seat position to that last used by the driver with the new ID by reading seat positioning parameters stored in non-volatile memory the last time this driver used the vehicle (step 1227). Next, microcontroller 735 will check whether a flag is set for a last mirror position feature (step 1229) which, if selected, causes microcontroller 735 to set the mirror positions to that last used by the driver with the new ID (step 1231). If this flag is not set, the routine for setting the mirror positions is dormant with respect to the driver with the newly detected ID.

If the vehicle includes mirrors with electronically adjustable reflectivity, microcontroller 735 may check whether a flag has been set for a last mirror reflectivity feature (step 1233). If the flag has been set for this feature, microcontroller 735 sets the mirror reflectivity to that last used by the driver with the new ID in step 1235.

In step 1237 (FIG. 48C) microcontroller 735 determines whether the vehicle ignition is on. If the vehicle ignition is not on, microcontroller 735 advances to step 1281 in FIG. 48F and skips the remaining portion of the new user initialization routine. If the ignition is on, microcontroller 735 proceeds in step 1239 to determine whether a flag has been set for a last temperature setting feature. If the flag has been set for this feature, microcontroller 735 will set the interior temperature for the climate control system to that last used by the driver with the new ID by retrieving the last used temperature setting from the non-volatile memory (step 1241).

If the vehicle includes a compass that allows for selection of a feature that computes variations in heading based on the geographic location of the vehicle, microcontroller 735 may determine in step 1243 whether the flag associated with this feature has been set. If the flag has been set, the compass will be initialized for variation based on geographic location (step 1245). Otherwise, the compass will be initialized for operation without variation for geographic location (step 1247).

Next in step 1249 (FIG. 48D), microcontroller 735 may check whether a flag has been set for a last radio volume feature (step 1249). If the last radio volume feature has been selected by the user with the detected ID, microcontroller 735 sets the radio volume to that last used by the driver with the new ID (step 1251).

If a flag has been set for a last radio station feature, microcontroller 735 will detect if the flag has been set (step 1253) and set the radio station to that last used by the driver with the new ID (step 1255). Similarly, if microcontroller 735 detects that a flag has been set for a radio preset memory feature (step 1257), microcontroller 735 sets the radio station presets to those last used by the driver with the new ID (step 1259).

If the vehicle radio includes a display that displays either the radio station or the time of day, a vehicle operator may wish to select what is displayed on the radio display as a default condition. Thus, microcontroller 735 may look for a flag corresponding to a radio station display default in step 1261 and display the radio station as a default on the radio display (step 1263) if the flag is set. Otherwise, the time of day will be displayed on the radio display as a default.

As vehicle sophistication improves, more and more vehicles will include alpha-numeric displays to convey information to the vehicle operator. Because such vehicles may be used in countries having different primary languages, it is advantageous to allow for different languages to be displayed on the vehicle's alpha-numeric display. Moreover, it would be even more advantageous to provide for a vehicle alpha-numeric display that can be programmed to display different languages for different drivers that may use the vehicle. To this end, the main control program includes a step (1265) that causes microcontroller 735 to check whether a flag for a non-default language (i.e., English) has been selected for the vehicle displays. If the flag has been set, microcontroller 735 sets the display language to that last used by the driver with the new ID (step 1267) by setting a pointer to a set of memory addresses at which the selected language display messages are stored.

A related feature provided by the present invention permits the vehicle operator to select display parameters such as Fahrenheit or Centigrade, miles or kilometers, miles per hour or kilometers per hour, and/or gallons or liters, to be displayed in the vehicle's gauges and other display screens. Thus, in step 1269, microcontroller 735 first checks whether a flag has been set for a non-default display parameter and then sets the display parameters to those last used by the driver with the new ID (step 1271) if the flag has been set.

The present invention further allows each vehicle operator to customize the vehicle's displays by reconfiguring message screens and, if desired, the message screen location. Thus, if a vehicle includes several message screen displays, a vehicle operator may reconfigure these displays such that a compass heading is displayed on a different message screen than that used in a default condition. Therefore, if microcontroller 735 determines in step 1273 that a flag is set for a non-default display configuration, it will set the display configuration to that last used by the driver with the new ID (step 1275).

If the vehicle employs a reconfigurable instrument panel display, the present invention allows for the vehicle operator to reconfigure the display gauges on the instrument panel display by changing their location, size, color, or existence as displayed on the instrument panel. To allow various vehicle operators to select their desired preference, microcontroller 735 determines in step 1277 whether a flag has been set for a non-default gauge configuration and sets the gauge configuration to that last used by the driver with the new ID in step 1279 if the flag has been set.

After completing steps 1277 and 1279, microcontroller 735 has completed the steps associated with initializing the vehicle for a driver having a new ID that is different from that of the last ID stored in memory. It will be appreciated by those skilled in the art that the settings associated with the last driver will be maintained and utilized during initialization provided a new user ID is not received. Following this initialization process, microcontroller 735 monitors a timer to determine when to interrupt the main program to look for an RF signal (step 1281). If it is time to interrupt the main program, microcontroller 735 executes interrupt service routine 1283, which is described above with reference to FIGS. 46A, 46B, and 46C.

If an RF signal is received and the detected address corresponds to a personalization address, microcontroller 735 receives and decodes the RF signal and corrects errors therein using the bit error correction subroutine and subsequently defines the function in the reprogramming signal that is to be changed (step 836). Microcontroller 735 may determine from the received reprogramming signal which function is to be changed by accessing a look-up table and identifying which flags correspond to the commands included in the reprogramming signal. After identifying the flags corresponding to these commands, microcontroller 735 modifies the data structure it utilizes in determining the manner in which to control vehicle accessories by setting or resetting the flags in the flag table corresponding to a user ID also transmitted in the personalization RF signal. In this manner, microcontroller 735 reprograms the main control program as used to control vehicle accessories for a particular vehicle operator.

As apparent from the foregoing and following description of the control program, the main control program includes both active and dormant subroutines which may be activated or deactivated by the setting or resetting of its associated flag. Upon reading this disclosure, those skilled in the art will recognize that various other data structures or mechanisms may be employed to reprogram the manner in which a vehicle accessory control system controls the operation of the vehicle accessories in response to detected conditions, parameters, or vehicle operator initiated activation signals. For example, the various selectable routines defining manners in which a vehicle accessory can be operated may be separately stored and executed by the control module associated with that vehicle accessory whereby the main control program either alters the data structure used by the routines in the control module or relays the reprogramming signal to the appropriate control module, which alters the data structure used by its associated control routine. In such a case, the various control modules may directly receive and act upon a sensed condition, parameter, or vehicle operator initiated activation signals. Thus, the various routines and subroutines of the main control program may be separated and delegated to the various accessory control modules and be independently executed. Alternatively, the main control program could modify the data structure it uses itself to determine a particular command to issue to a vehicle accessory control module to activate the desired one of the subroutines stored in the control module.

Figure 48F:
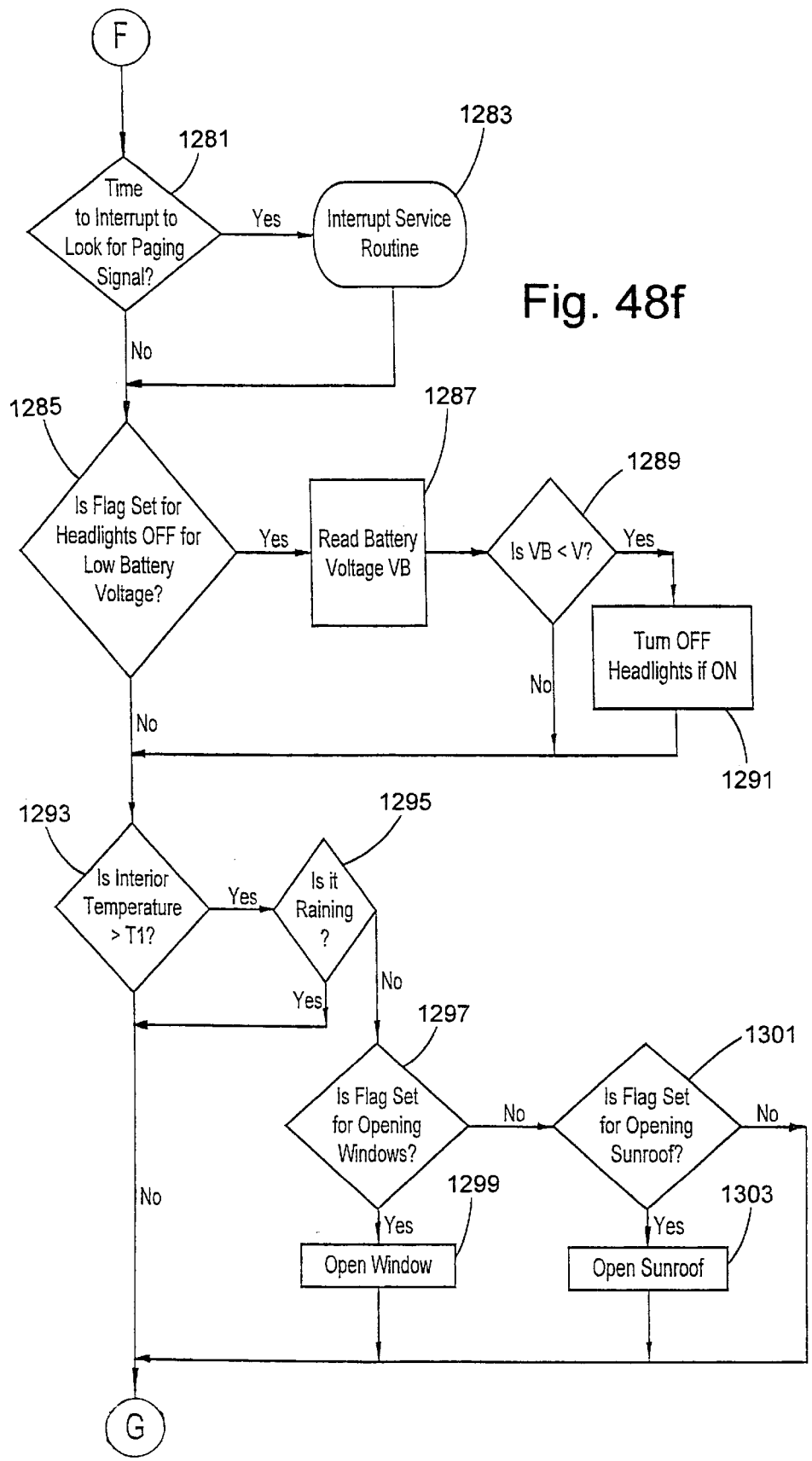
Figure 48G:
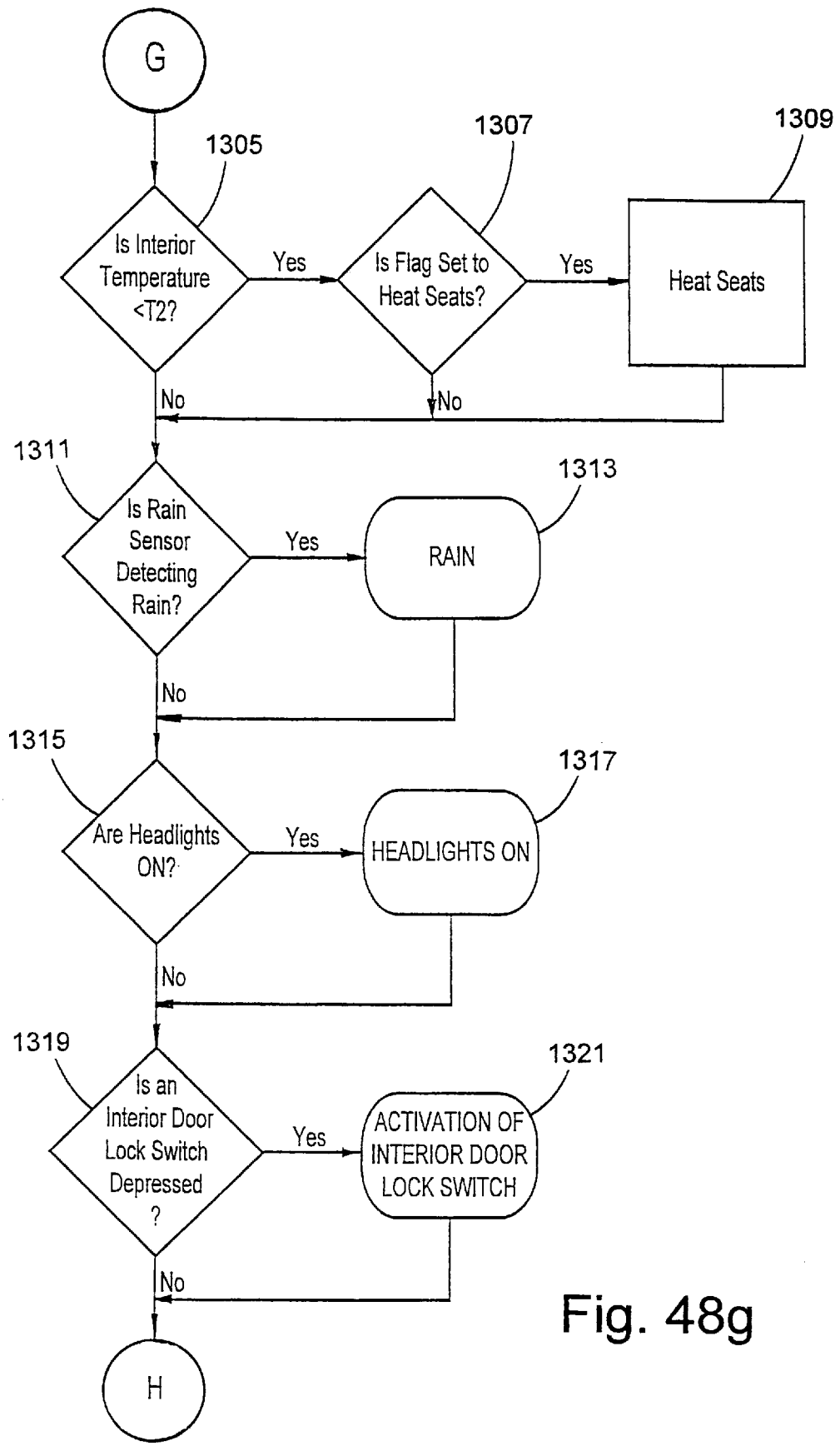
Figure 48H:
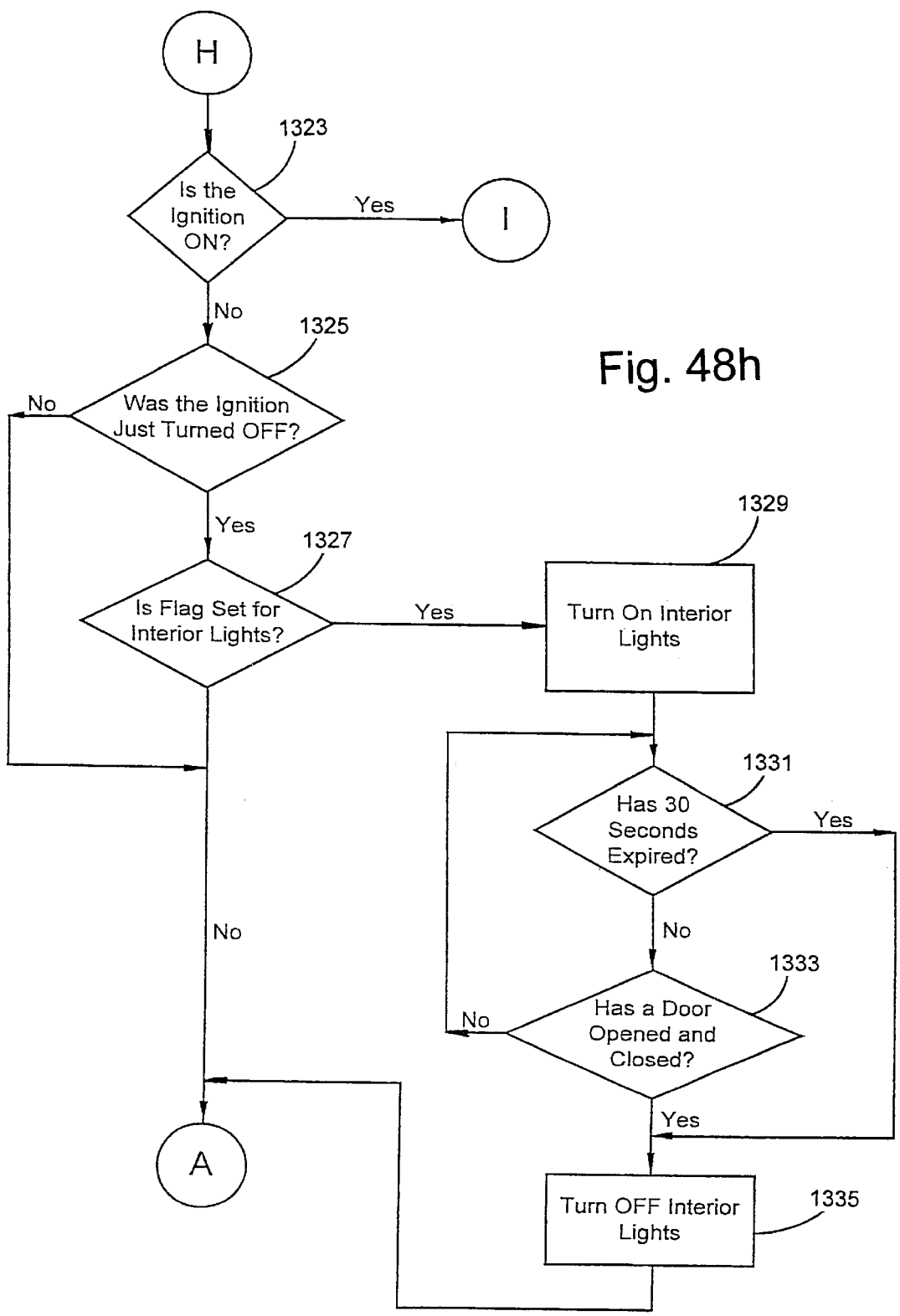

If it is not time for the interrupt service subroutine to be executed or if the interrupt service routine has been executed, microcontroller 735 proceeds to execute step 1285 in FIG. 48f. In step 1285, microcontroller 735 checks whether a flag has been set to turn off the headlights if the battery voltage is low. If the flag is set, microcontroller 735 reads the detected battery voltage VB and compares the detected battery voltage VB to a threshold voltage V to determine whether the battery voltage is below a low voltage threshold (step 1289). If the battery voltage is below this threshold, microcontroller 735 will turn off the headlights if they were on (step 1291) to prevent further drain on the vehicle's battery.

Another feature that may be selected is to open the windows or a sunroof if the temperature in the interior of the vehicle exceeds a threshold temperature T1 to keep the interior of the vehicle relatively cool. Although this feature may be desirable for some individuals, it may be undesirable to other individuals who, for example, may frequently park their vehicles in a high crime area. Thus, the present invention provides the flexibility for each vehicle operator to select how microcontroller 735 will respond when (in block 1293) the interior temperature of the vehicle exceeds a threshold temperature T1. To prevent the windows or sunroof from being opened when it is raining, microcontroller 735 may first determine whether rain is sensed by a rain sensor in step 1295. If it is raining, microcontroller 735 will not open the windows or sunroof. However, if it is not raining, microcontroller 735 will then check whether a flag has been set to open the windows when the interior temperature exceeds the threshold (step 1297). If the flag has been set, microcontroller 735 will open the windows by a predetermined amount (step 1299). If the flag for opening the windows has not been set, microcontroller 735 will check whether the flag has been set to open the sunroof (step 1301). If the flag has been set, microcontroller 735 will issue the appropriate signal via multiplex bus 742 to an actuator for opening the sunroof (step 1303). If the flag has not been set, microcontroller 735 will proceed to step 1305 (FIG. 48G) without opening the windows or the sunroof.

If the interior temperature of the vehicle is below a lower, second temperature threshold T2, as may be the case during winter time (step 1305), microcontroller 735 checks whether a flag has been set to heat the vehicle seats when the interior temperature falls below the second threshold T2 (step 1307). If the flag has been set, microcontroller 735 will cause the vehicle's seats to heat (step 1309). If the flag is not set, the routine associated with heating the seats is effectively disabled and the program advances to step 1311 where microcontroller 735 determines whether the rain sensor has detected rain. If rain is detected, microcontroller 735 executes a rain subroutine 1313 which will now be described in detail with reference to FIG. 51.

If rain is detected, microcontroller 735 checks whether a flag is set to close the windows (step 1701). If the flag is set, microcontroller 735 will issue the appropriate control signals to the window actuators to close the windows (step 1703). Then, microcontroller 735 will check whether a flag has been set to close the vehicle's sunroof (step 1705). If the flag has been set, microcontroller 735 will issue the appropriate command to close the sunroof (step 1707). Following execution of the rain subroutine 1313, microcontroller 735 executes step 1315 (FIG. 48G) to determine whether the vehicle's headlights are presently on. If the headlights are on, microcontroller 735 executes a headlights ON subroutine 1317, which is described in detail below with reference to FIG. 52.

In the headlights ON subroutine 1317, microcontroller 735 first tests whether the vehicle ignition is off (step 1709). If the ignition is off, microcontroller 735 exits the headlights ON subroutine and returns to step 1319 (FIG. 48G) of the main control program. If, on the other hand, the vehicle ignition is off and the headlights are on, microcontroller 735 determines in step 1711 whether a delay flag or an indefinite ON flag has been set. If neither flag has been set, microcontroller 735 turns off the headlights (step 1713) and returns to the main control program. If one of these flags are set, microcontroller 735 then determines whether the flag that is set is the indefinite ON flag (step 1715). If the indefinite ON flag is set, microcontroller 735 returns to the main control program without turning off the headlights. If the indefinite ON flag is not set, microcontroller 735 assumes that the delay flag has been set and waits for the predetermined delay time (step 1717) before turning off the headlights (step 1719) and returning to the main control program.

The next step in the main control program instructs microcontroller 735 to determine whether an interior door lock switch has been depressed (step 1319). If an interior door lock switch has been depressed, microcontroller 735 executes an associated subroutine 1321, which is described below with reference to FIG. 53.

The subroutine 1321 associated with the activation of an interior door lock switch begins with step 1721 which causes microcontroller 735 to determine whether a flag has been set for a feature preventing the doors from being locked when a key is in the ignition. If this flag is set, microcontroller 735 determines whether there is a key in the ignition (step 1723). If a key is in the ignition, microcontroller 735 activates a chime (step 1725) and returns to the main control program without locking the doors in response to the activation of the interior door lock switch. If the key is not in the ignition or if the flag associated with this feature has not been set, microcontroller 735 next determines whether a flag has been set for a last door locks all doors feature (step 1727). If this flag has been set, microcontroller 735 determines whether a door is presently open (step 1729). If a door is presently open, microcontroller 735 will wait until all the doors are closed (step 1731) before advancing to step 1733 in which microcontroller 735 determines whether a flag is set to delay the activation of the locks for a predetermined time after all of the doors are closed. If this flag has been set, microcontroller 735 will wait for this predetermined time period (step 1735) and again check whether a door has subsequently been opened (step 1737). If a door has been reopened, microcontroller 735 returns to step 1731 where it waits until all doors are closed. Once all the doors are closed and remain closed for the predetermined time period, microcontroller 735 locks all the doors (step 1739) and returns to the main control program. If, in step 1733 the delay flag is not set, microcontroller 735 immediately proceeds to step 1739 and locks all the doors without rechecking whether a door is subsequently opened.

If, in step 1727 microcontroller 735 determines that the flag for the last door locks all doors feature has not been set, microcontroller 735 then checks whether a flag has been set to delay the locking of the doors following the activation of an interior door lock switch (step 1741). If the delay flag has not been set, microcontroller 735 immediately locks all doors (step 1739). On the other hand, if the flag has been set, microcontroller 735 waits a predetermined time period (step 1743) before locking all doors (step 1739) and returning to the main control program.

The main control program resumes at step 1323 (FIG. 48H) where it is determined whether the vehicle ignition is on. If the vehicle ignition is on, the main control program advances to step 1337 in FIG. 48I and if the ignition is off, microcontroller 735 determines whether the ignition was just turned off (step 1325). If the ignition was not just turned off, the main control program returns to its beginning at step 1203 in FIG. 48A as denoted by connection port A.

If the vehicle ignition was just turned off, microcontroller 735 checks whether a flag has been set for controlling the interior lights in response to the vehicle ignition being turned off (step 1327). If the flag has not been set, the main control program returns to step 1203 (FIG. 48A) of the main control program. If, however, the flag has been set, microcontroller 735 turns on the vehicle's interior lights (step 1329) and starts a timer. The interior lights remain on until one of the following events takes place—the expiration of a predetermined time period of, for example, thirty seconds (step 1331) or the detection that a door has been opened and subsequently closed (step 1333). Once one of these events has occurred, microcontroller 735 turns off the interior lights (step 1335) and the program returns to step 1203 at the beginning of the main control program.

Figure 48I:
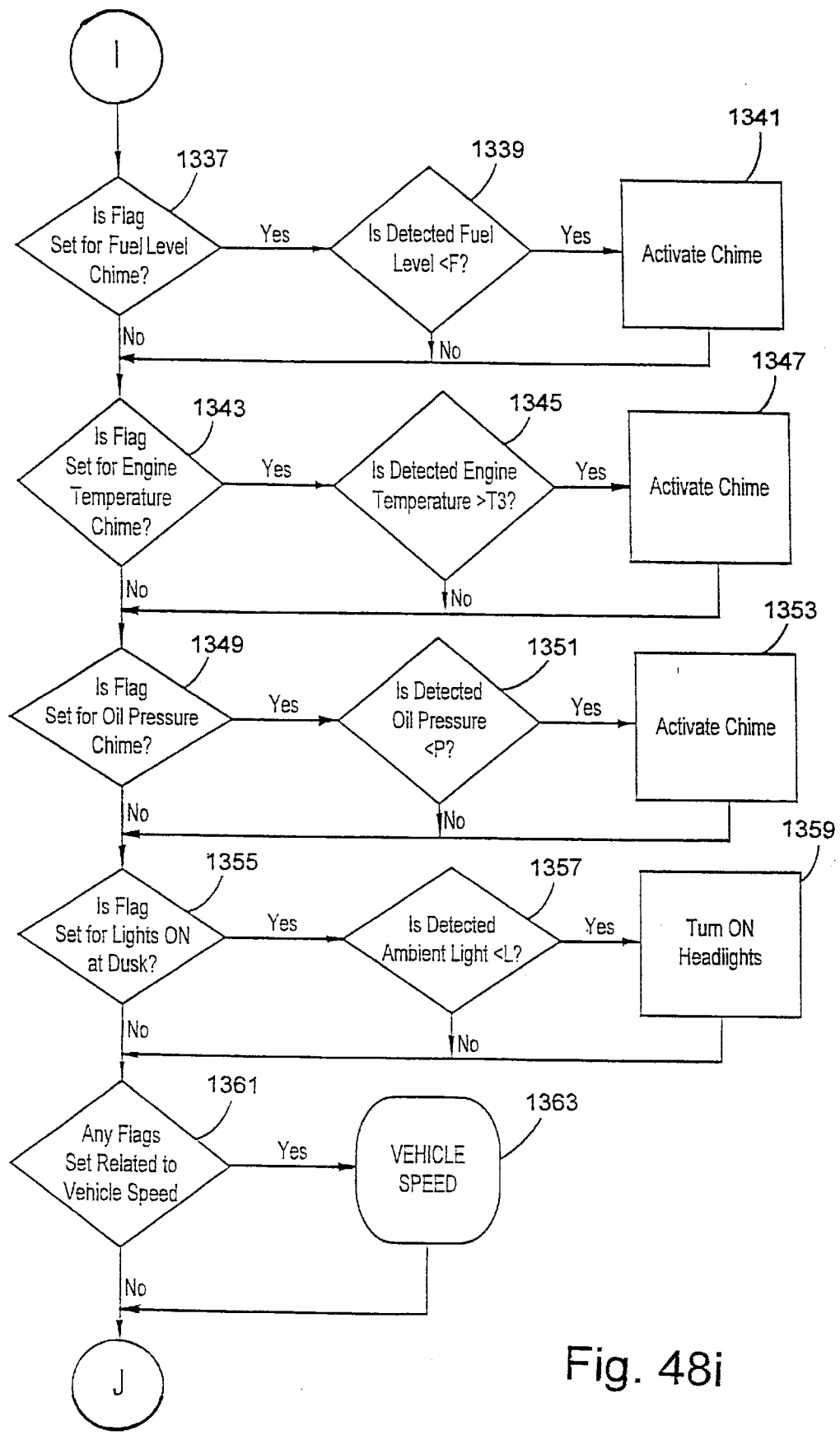

As described above, if the vehicle ignition is detected as being on in step 1323, the main control program advances to step 1337 in FIG. 48I where microcontroller 735 determines whether a flag has been set for a low fuel level warning chime. If this flag has been set, microcontroller 735 checks the fuel level on the associated input line and determines in step 1339 whether the detected fuel level is below a low fuel level threshold F. If the fuel level is low, microcontroller 735 will activate a warning chime (step 1341) which may chime once or at a predetermined interval of, for example, once every five minutes.

Next, microcontroller 735 checks whether a flag has been set for an engine temperature warning chime (step 1343). If this flag has been set, microcontroller 735 obtains the detected engine temperature from the associated input terminal and determines whether the engine temperature exceeds a threshold temperature T3 (step 1345). If the detected engine temperature T3, microcontroller 735 will activate a warning chime (step 1347) once or at periodic intervals.

Another warning chime that may be set corresponds to a low oil pressure. Because this feature is optional, as are the other features relating to warning chimes, microcontroller 735 first determines whether the flag has been set for the oil pressure warning chime (step 1349). If the flag has been set, microcontroller 735 reads the detected oil pressure from the associated input terminal and determines whether the detected oil pressure is less than a predetermined threshold P (step 1351). If detected oil pressure is less than this threshold pressure, microcontroller 735 activates a warning chime (step 1353).

Yet another feature that may be selected is to have your headlights automatically turn on at dusk or whenever an exterior ambient light level falls below a threshold level. To perform this feature, microcontroller 735 first checks whether a flag has been set for this feature (step 1355) and retrieves the detected ambient light level from an associated input terminal and determines whether the detected ambient light level is below a threshold level L (step 1357). If the detected level is below threshold L, microcontroller 735 will turn on the vehicle's headlights (step 1359).

The present invention allows various accessories to be controlled in response to a detection of the vehicle speed. Thus, as the next step, microcontroller 735 may check whether any of the flags have been set that are related to the vehicle speed (step 1361). If any of these flags have been set, microcontroller 735 will execute a vehicle speed subroutine 1363, which is described below with reference to FIG. 54.

The vehicle speed subroutine 1363 begins at step 1745 at which microcontroller 735 determines whether a flag has been set for a speed warning chime. If this flag has been set, microcontroller 735 reads the vehicle speed from the associated input terminal and determines whether the speed exceeds a first speed threshold X1 (step 1747). If the vehicle speed exceeds this threshold, which may be set manually to correspond to the speed limit, for example, microcontroller 735 activates a warning chime (step 1749), which chimes periodically until the vehicle speed falls back below the first speed threshold X1.

Next, microcontroller 735 may check whether a flag has been set for a feature by which the doors lock when the speed of the vehicle exceeds a threshold level (step 1751). If the flag has been set, microcontroller 735 reads the vehicle speed from the associated input terminal and determines whether this speed exceeds a second speed threshold X2 (step 1753). If the second speed threshold X2 is exceeded, microcontroller 735 proceeds to lock all the doors of the vehicle (step 1755). Typically, the second speed threshold X2 will be set at a relatively low speed to insure the safety of the vehicle's occupants.

As the vehicle's speed increases, the interior noise level within the vehicle will also increase. Therefore, another feature that may be selected adjusts the radio volume proportional to the vehicle's speed. If, in step 1757 microcontroller 735 determines that the radio volume flag has been set, it will then determine whether the radio is on in step 1759. If the radio is on, microcontroller 735 will obtain the vehicle speed from the appropriate input line and adjust the radio volume proportionally to any changes in vehicle speed and will return to the main control program at step 1365 in FIG. 48J.

In step 1365, microcontroller 735 checks whether any flags have been set relating to gear position. If any such flags have been set, microcontroller 735 executes a gear position subroutine 1367, which is shown in detail in FIG. 55. In the gear position subroutine 1367, microcontroller 735 first determines what gear the vehicle is in (step 1763). If the vehicle is in drive, microcontroller 735 next determines whether a flag has been set for a feature in which the doors are automatically locked when the vehicle is put in drive (step 1765). If the flag has been set, microcontroller 735 locks all the doors (step 1767) before returning to step 1369 (FIG. 48J) of the main control program.

If the vehicle is in park, microcontroller 735 checks whether a flag has been set to automatically unlock the doors (step 1769). If this flag has been set, microcontroller 735 automatically unlocks the doors when the vehicle is in park (step 1771).

If the vehicle is in reverse, microcontroller 735 determines whether a flag has been set to automatically tilt the passenger side exterior mirror downward when the vehicle is in reverse (step 1773). If this flag has been set, microcontroller 735 tilts the passenger side mirror downward to a predetermined angle (step 1775) and determines whether the vehicle is still in reverse (step 1777). When the vehicle is no longer in reverse, microcontroller 735 tilts the passenger side mirror back to its original position (step 1779) before returning to the main control program. This mirror tilting feature is particularly suited for vehicle operators who frequently parallel park their vehicles next to a curb.

Figure 56:
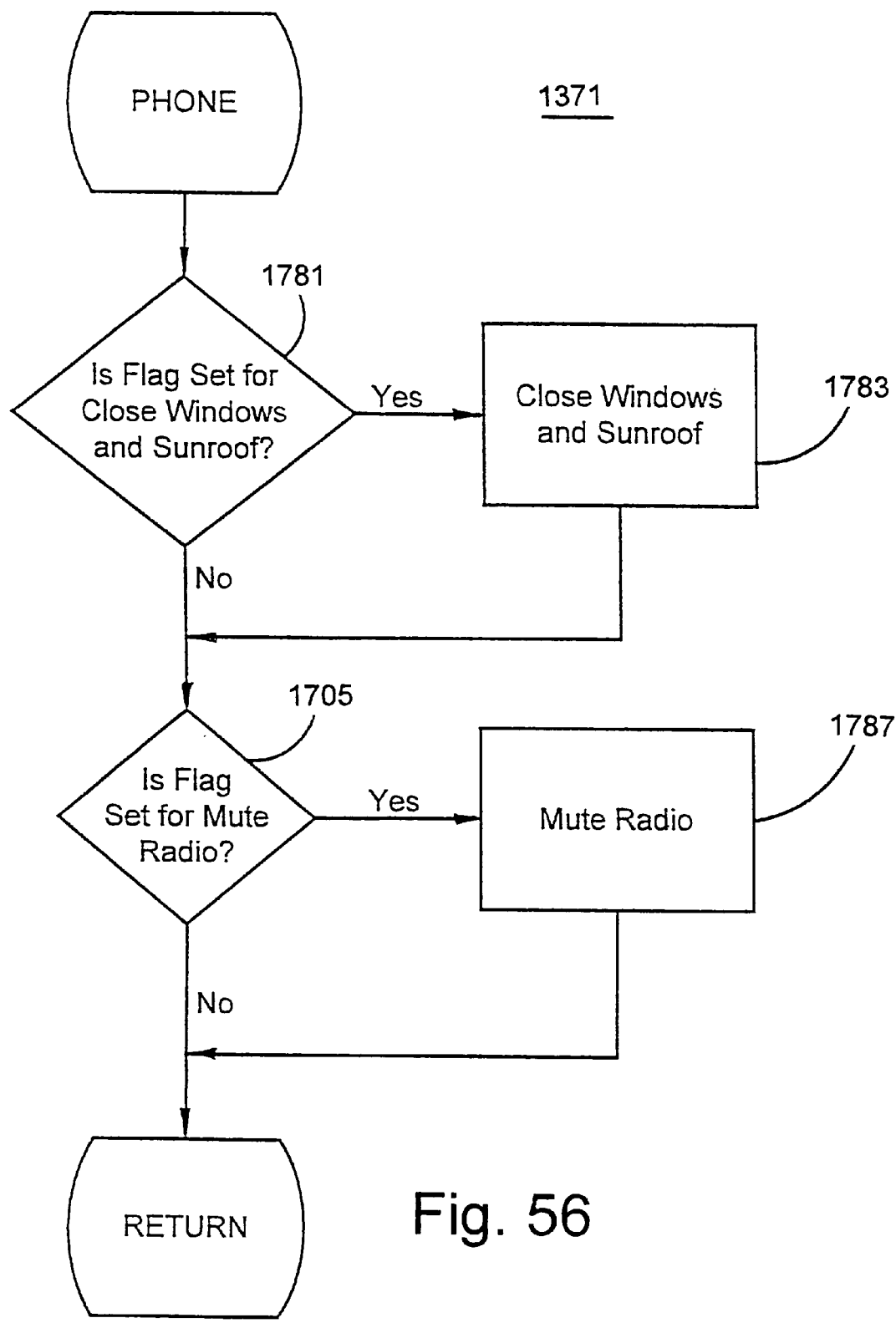
FIG. 56 is a flow diagram of a ninth subroutine that may be called by the main control program.

At the next step in the main control program, microcontroller 735 checks whether there is an incoming telephone call (step 1369). If there is an incoming telephone call, microcontroller 735 executes a phone subroutine 1371 that identifies several selectable features relating to vehicle accessory operation in response to an incoming telephone call. Phone subroutine 1371 is shown in FIG. 56 and begins with microcontroller 735 determining whether a flag is set for a closed windows and sunroof feature (step 1781). If this flag has been set, microcontroller 735 will close the windows and sunroof in response to an incoming telephone call (step 1783). By automatically closing the windows and sunroof when an incoming telephone call is received, the vehicle operator will not have to fumble around to close all the windows and sunroofs to cut down on the interior noise so that the vehicle operator may subsequently answer the incoming telephone call.

Another option that may be selected to make receiving a telephone call much easier for a vehicle operator is a feature which automatically mutes the radio when an incoming telephone call is received. If microcontroller 735 determines in step 1785 that the flag is set for this feature, microcontroller 735 will automatically mute the radio (step 1787) in response to the detection of an incoming telephone call.

Figure 48J:
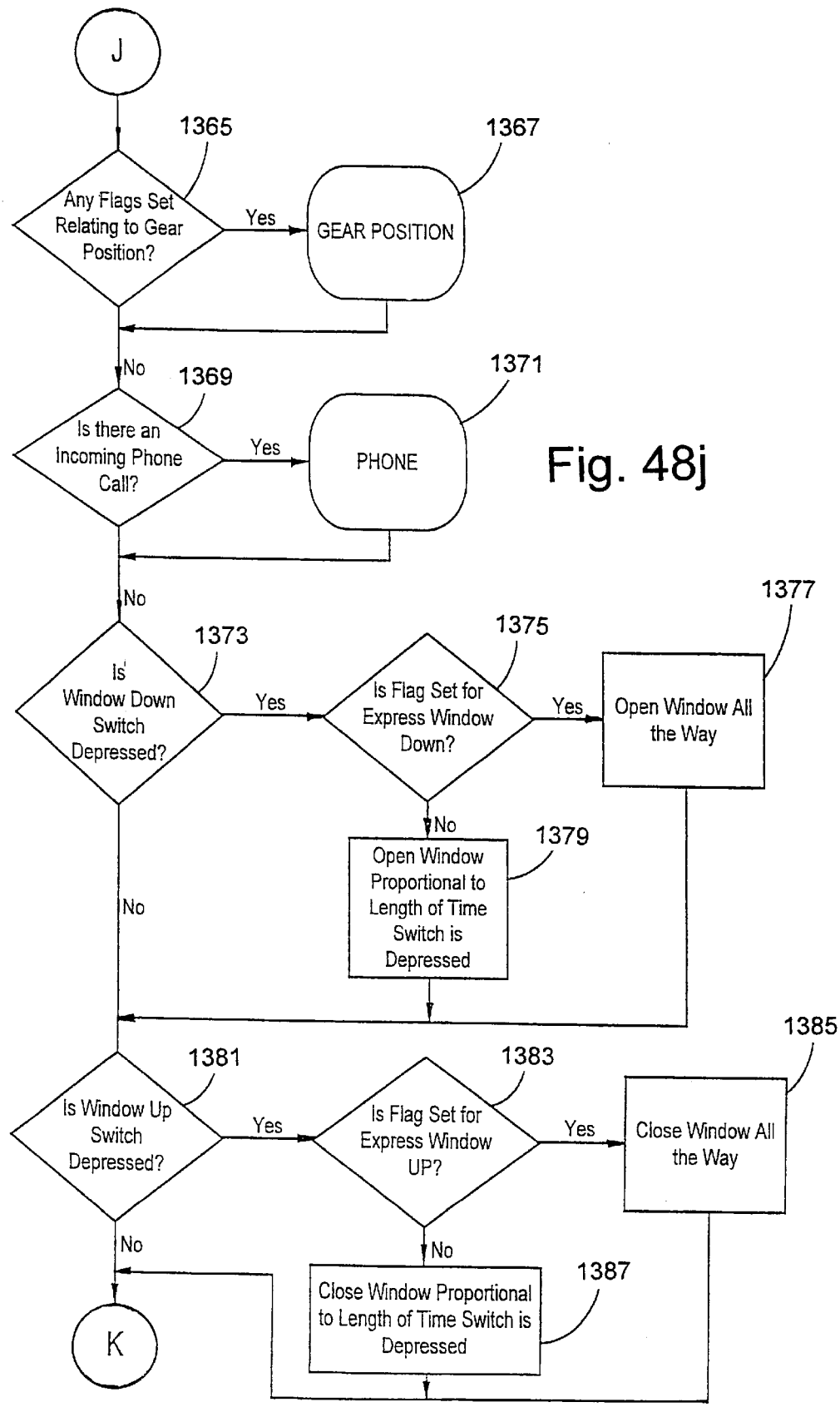

After determining that there is no incoming telephone call or executing the phone subroutine 1371, microcontroller 735 continues in the main control program by determining whether a window down switch has been depressed (step 1373, FIG. 48J). If the vehicle operator has depressed the window down switch, microcontroller 735 will check a flag to determine the manner in which the window actuator is to be controlled in response to this vehicle operator-initiated activation signal associated with a window down function (step 1375). If the flag has been set for an express window feature, microcontroller 735 will automatically open the window all the way without regard to the length of time the button is depressed (step 1377). If the flag has not been set, microcontroller 735 opens the window an amount proportional to the length of time the switch is depressed (step 1379). Similarly, if a window up switch is depressed (step 1381), microcontroller 735 determines whether a flag has been set for an express window up feature (step 1383). If this flag has been set, microcontroller 735 closes the window all the way (step 1385). Otherwise, microcontroller 735 will close the window an amount proportional to the length of time the switch is depressed (step 1387).

Figure 48K:
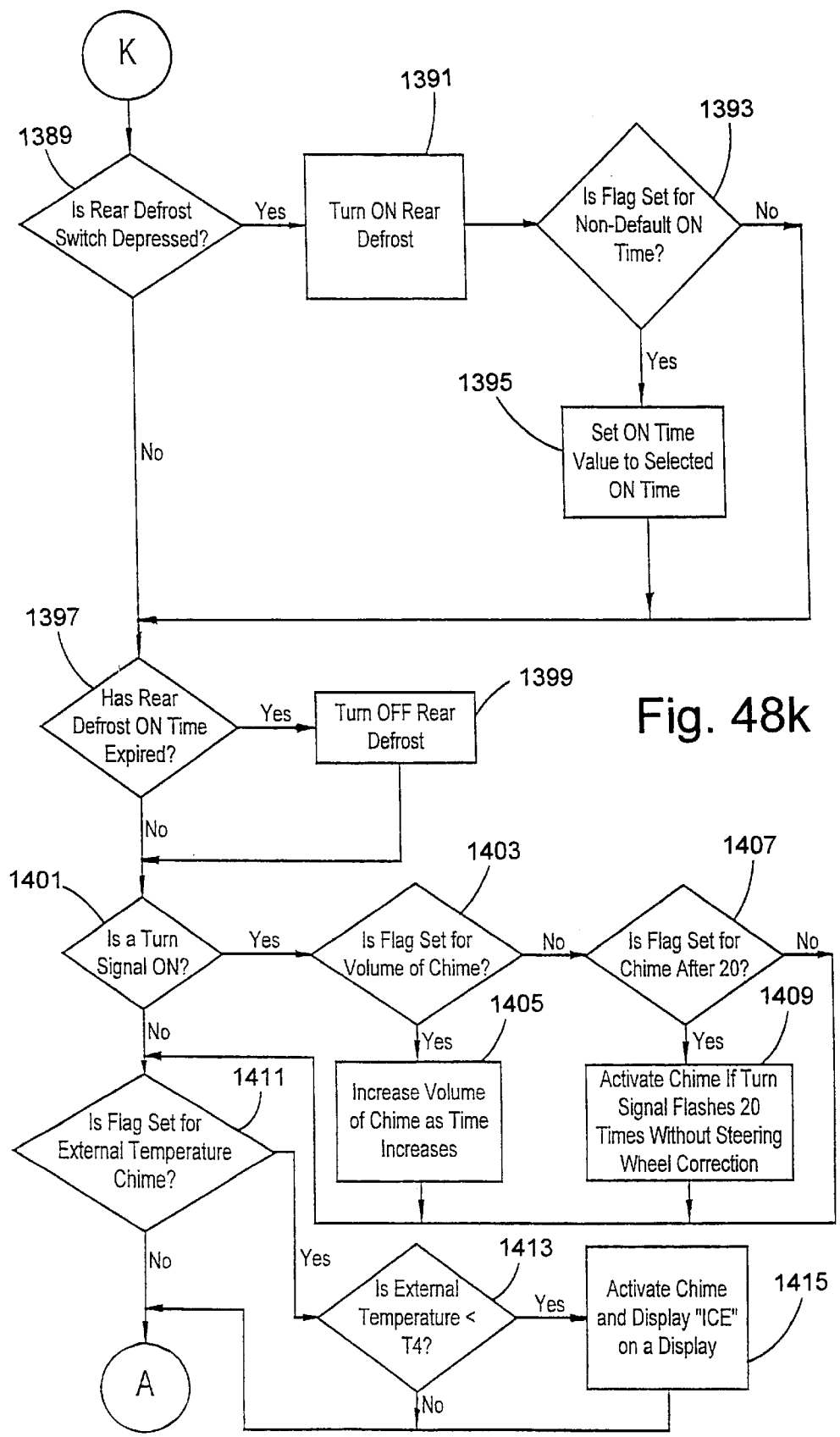

The main control program then advances to step 1389 in FIG. 48K, in which microcontroller 735 determines whether the rear defrost switch has been depressed. If this switch has been depressed, microcontroller 735 will turn on the rear defrost and start a timer (step 1391) and will check whether a flag has been set for a non-default ON time (step 1393). If the flag has been set, microcontroller 735 will set and store an ON time value to the selected ON time (step 1395). Otherwise, the stored and set ON time value will correspond to the default ON time for the rear defrost circuit. Then, microcontroller 735 will check whether the rear defrost ON time has expired (step 1397) and will turn off rear defrost if the time has expired (step 1399).

Next, microcontroller 735 checks whether a turn signal is on (step 1401) and checks the flags for features associated with the turn signal. The first feature that may be selected increases the volume of a chime associated with the turn signal as the time the turn signal is on increases. Thus, if the associated flag is set for this feature (step 1403), microcontroller 735 will increase the volume of the chime as the length of time that the turn signal is on increases in order to alert the driver if the turn signal did not turn off following a turn or lane change. If the flag is not set for this feature, microcontroller 735 will check whether a flag is set for a feature which activates a chime after a turn signal has flashed twenty times without a steering wheel correction being made (step 1407). If this flag is set, microcontroller 735 will count the number of times the turn signal has flashed and will activate a chime after twenty flashes without a steering wheel correction being made (step 1409).

Next, microcontroller 735 checks a flag associated with a feature for activating a chime upon the detection of a low exterior temperature (step 1411). If the flag has been set, microcontroller 735 reads the external temperature from the associated input terminal and determines whether this temperature is less than a threshold T4, which may be, for example, 32° F. or 0° C. (step 1413). If the external temperature is less than threshold T4, microcontroller 735 will activate a chime and display "ICE" on one of the vehicle's displays (step 1415). The control application then returns to step 1203 in FIG. 48A as denoted by connection port A.

Those skilled in the art will recognize that the main control program described above may be modified to include or eliminate or rearrange various steps associated with the control of the vehicle's accessories to accommodate various combinations of vehicle accessories and their control options. Further, the control program may be reprogrammed by invoking a program editing routine in response to a reprogramming signal, which edits the main control program by adding or deleting command lines in the main control program that call the various subroutines relating to selectable control functions. Also, a vehicle owner may personalize his or her vehicle using a home or office PC that is connected to the Internet or programmed to allow the owner to select certain options in a user-friendly manner.

7. Alternative Integrated Vehicle Systems Control

In some vehicles, not all devices and accessories are connected to the vehicle system bus and in these and other vehicles, it is conceivable that the circuitry of the present invention as described above will not have access to the vehicle system bus. If the system of the present invention does not have access to the vehicle system bus, or if the door locks cannot be activated via the vehicle system bus, there would be no way to remotely lock or unlock the vehicle's doors from a remote location using a paging signal or cellular RF signal. Thus, in this event, if the vehicle owner accidentally locked their keys in the car, or if the vehicle owner wished to make sure the vehicle's doors are locked from a remote location, the present invention as described above would be incapable of serving these needs. To this end, an alternative embodiment of the present invention includes a trainable transmitter coupled to the above-described system that may be used to learn the frequency and code of the signal transmitted from an RKE transmitter, such that upon reception of an appropriate RF command signal, the trainable transmitter may be instructed to transmit the RKE control signal to the RKE receiver in the vehicle causing the doors to lock or unlock depending upon the instructions provided in the RF control signal.

The integrated vehicle systems controller constructed in accordance with this alternative embodiment of the present invention includes an RF receiver or transceiver module 1817 coupled to an antenna 1815 for receiving RF signals sent over a telephone 1820 via a transmitter station 1825, and for transmitting signals back to the transmitter station 1825 provided the receiver module is a two-way transceiver. Receiver module 1817 may be coupled to a microprocessor 1830 via an interface board 1835 for sending received RF messages to microprocessor 1830. A trainable transmitter 1840 is coupled to receiver module 1817 and microprocessor 1830 via interface board 1835. Thus, when an RF control signal is received by receiver module 1817, instructing the system to lock or unlock the doors, microprocessor 1830 sends a control signal to trainable transmitter 1840 causing it to transmit a control signal having learned characteristics via antenna 1845 to an antenna 1850 of a RKE receiver/actuator 1855. When RKE receiver/actuator 1855 receives this control signal, it unlocks or locks the vehicle's doors in accordance with the control signal in the same manner that it would operate when receiving the control signal from a key fob transmitter 1857.

Trainable transmitter 1840 preferably is constructed in accordance with the teachings of U.S. Pat. No. 5,661,804 entitled TRAINABLE TRANSMITTER CAPABLE OF LEARNING VARIABLE CODES, filed on Jun. 27, 1995, the disclosure of which is incorporated herein by reference. Alternatively, trainable transmitter 1840 may be the trainable transmitter disclosed in U.S. Pat. No. 5,442,340, U.S. Pat. No. 4,479,155, or U.S. Pat. No. 5,475,366, the disclosures of which are incorporated herein by reference. Because the trainable transmitter may be used to learn and transmit RF signals to garage door openers, gates, house light modules, house appliances, and any RF actuated door locks, the integrated vehicle system's controller may be used to remotely close or open a garage door or turn lights on or off in response to an RF cellular or paging signal, provided the vehicle is parked in the near vicinity of these devices.

Figure 57:
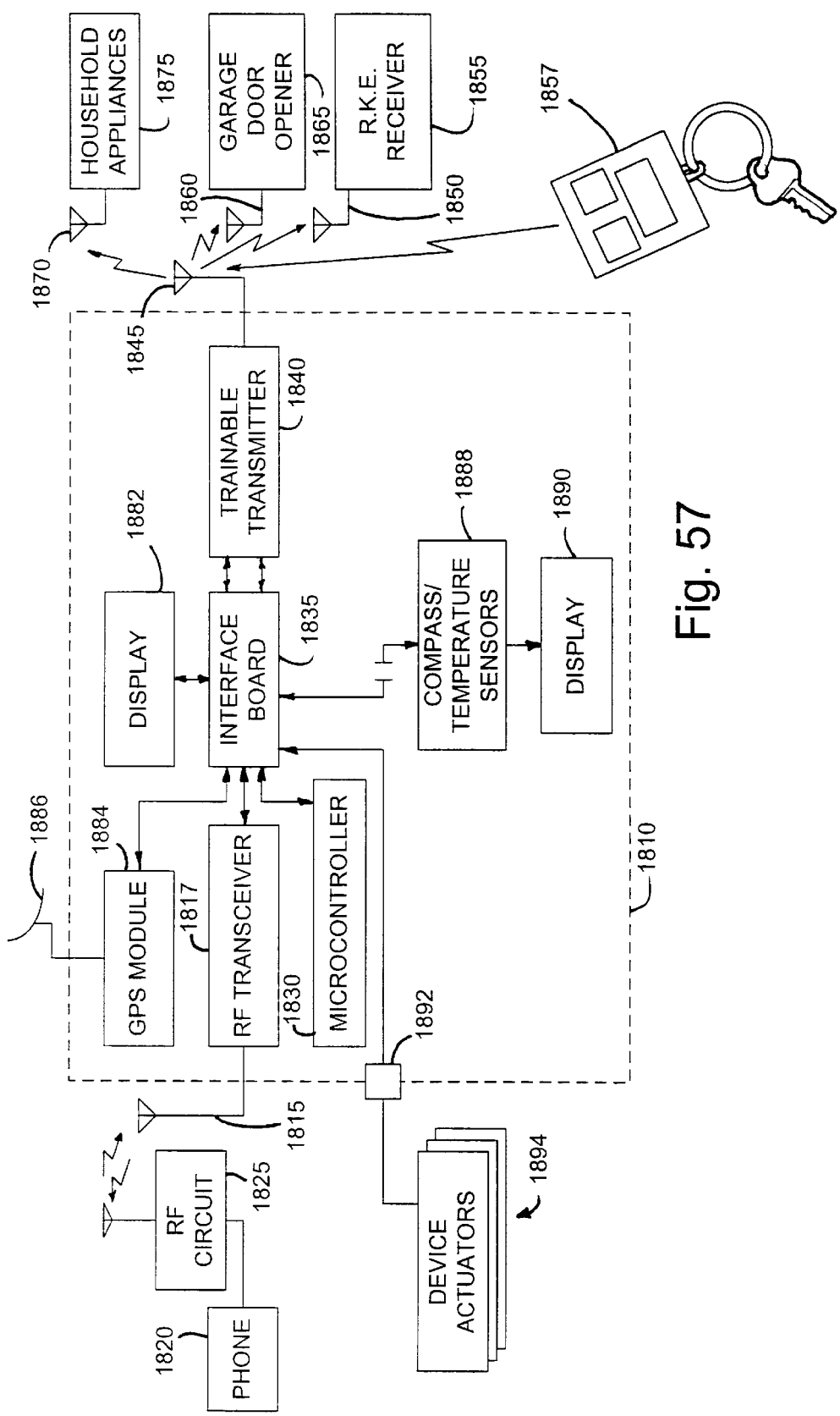
FIG. 57 is an electrical schematic diagram of an integrated vehicle systems controller constructed in accordance with another embodiment of the present invention.
Figure 58A:
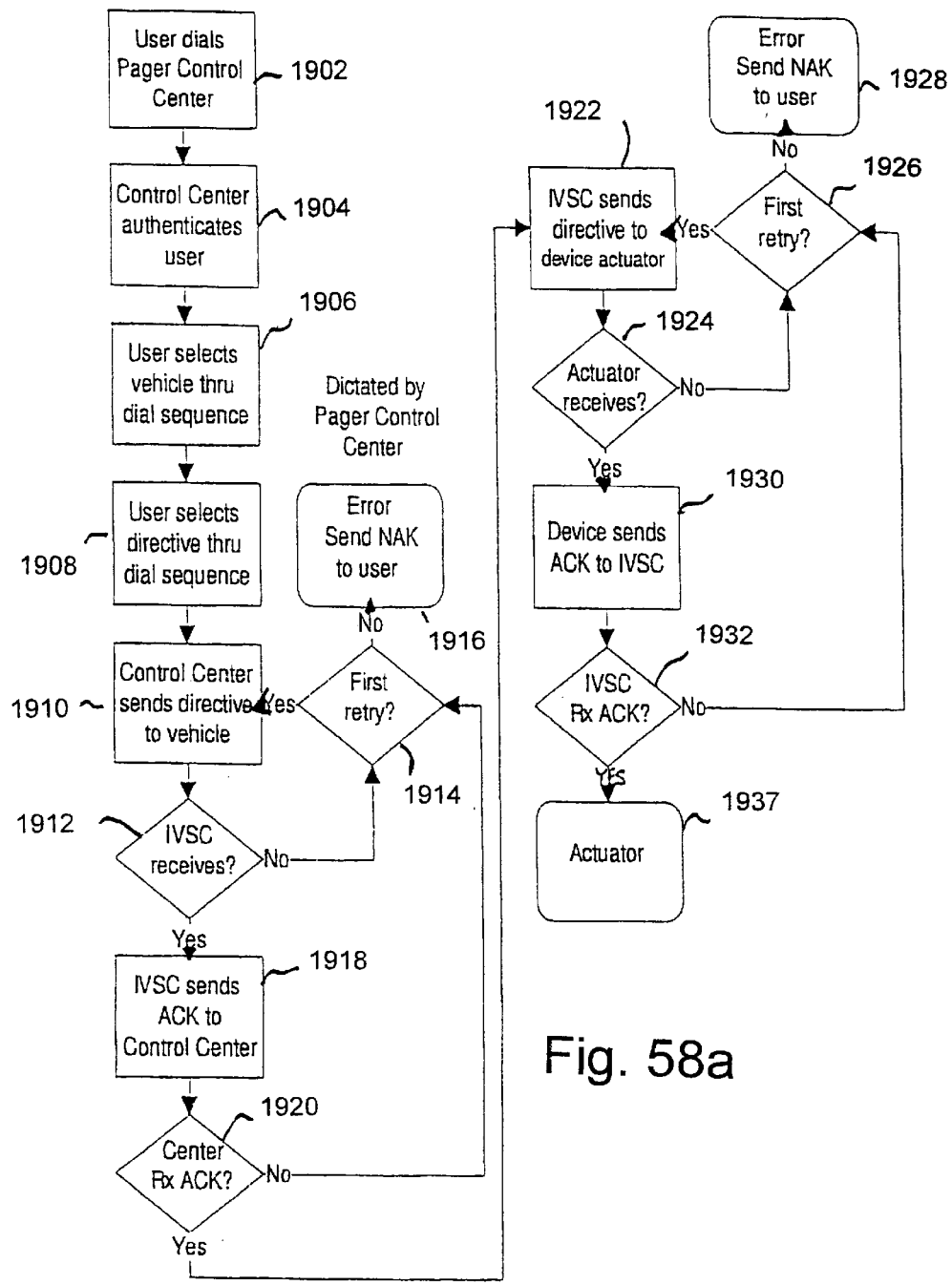
FIGS. 58A and 58B are flow diagrams illustrating the flow of operations utilizing the integrated vehicle systems controller shown in FIG. 57.
Figure 58B:
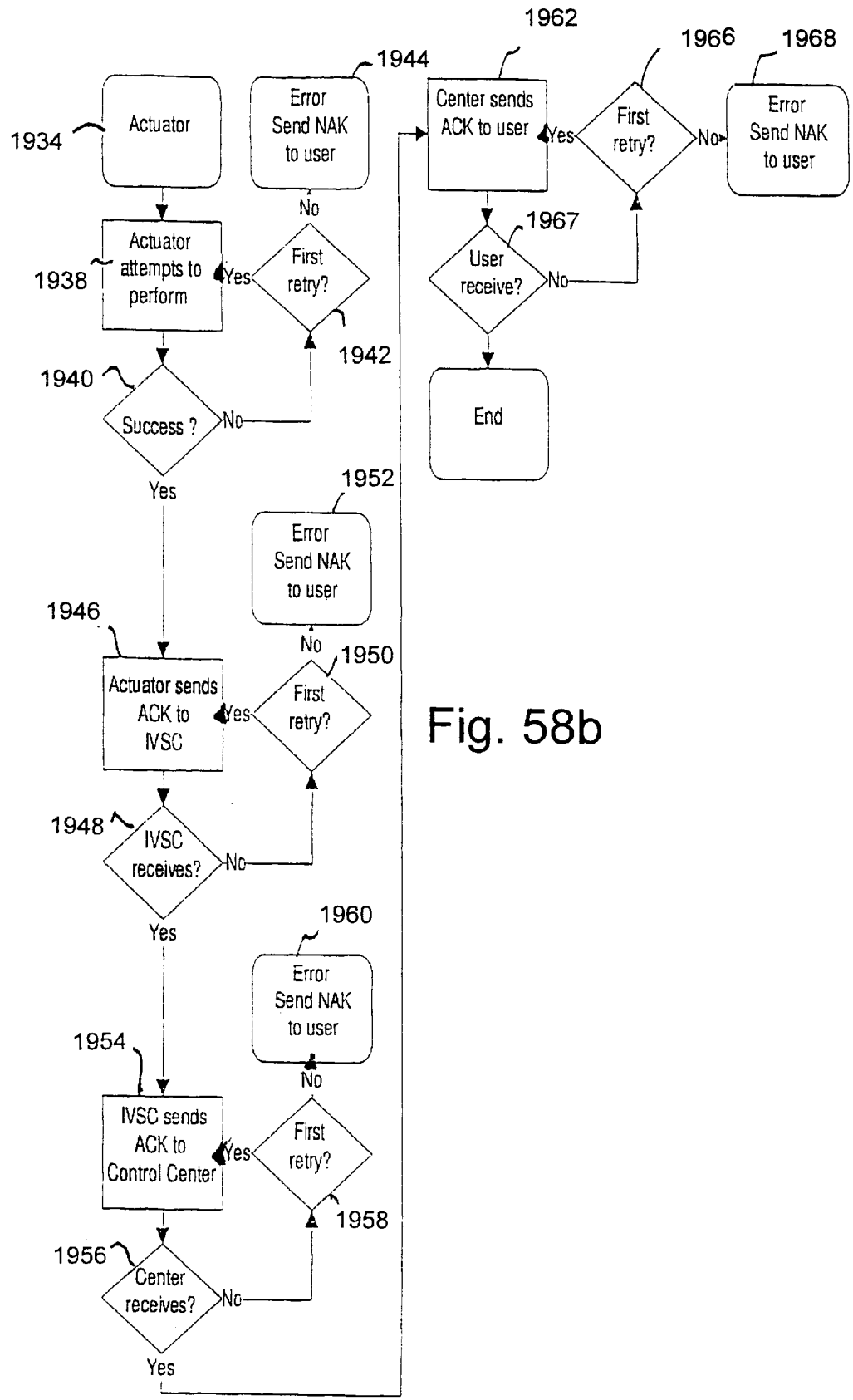

As shown in FIG. 57, the integrated vehicle system's controller 1810 may further include a display 1882 for displaying received messages, a GPS module 1884 connected to a GPS antenna 1886 and to interface board 1835, a compass/temperature circuit 1888, which may optionally include its own display 1890. Integrated vehicle systems controller 1810 may optionally include a vehicle system bus interface 1892 to couple the device other vehicle accessories and devices 1894 coupled to the vehicle system bus. Optionally, microprocessor 1830 may be eliminated by programming the microprocessor in the trainable transmitter 1840 to perform the functions recited above in the preceding sections.

If receiver module 1817 is a two-way communication transceiver, a confirmation signal may be transmitted back to transmitting station 1825 after trainable transmitter has transmitted the control signal to the RKE receiver/actuator. Further, if the remotely actuated device is capable of transmitting a confirmation signal back to the trainable transmitter, a microprocessor in the trainable transmitter may be programmed to look for such a confirmation signal after transmitting a control signal and to cause a confirmation RF signal to be transmitted back to the transmitting station 1825 to confirm that the desired function has been carried out.

The integrated vehicle systems controller circuit 1810 may be mounted in a rearview mirror, sun visor, overhead console, or other accessory. As such, the integrated vehicle systems controller 1810 may be sold as an after-market device and allow for the remote locking and unlocking of the vehicle's doors using an RF signal provided the vehicle is equipped with an RKE receiver.

Having described the structure of this alternative embodiment of the present invention, a more detailed description of the operation thereof is provided below.

The process begins in step 1902, when a user dials the service control center to request, for example, that the vehicle's doors be unlocked. The control center would first authenticate the user's identity (step 1904) and the user would subsequently select the vehicle to which the RF signal is to be transmitted through a dialing sequence (step 1906). Then, the user selects a directive (i.e., unlocking the vehicle's doors) through a dialing sequence in step 1908. The control center then sends the directive to the vehicle (step 1910) via the transmitting station 1825. Upon receiving this RF control signal, the integrated vehicle systems controller 1810 would transmit back an acknowledgement that the RF control signal was received (steps 1912 and 1918). If, on the other hand, the integrated vehicle systems controller did not receive the RF control signal and no acknowledgement is received by the control center between a predetermined time period, the control center will retry to transmit the control signal in step 1910 provided that it is a first attempt to retry to transmit the signal (step 1914). If the control center unsuccessfully attempts to transmit the RF control signal more than twice, the control signal will send an error signal indicating that no acknowledgement was received to the user (step 1916). Also, if the integrated vehicle system controller 1810 sends the acknowledgement to the control center, but the center does not receive the acknowledgement (step 1920), the control center will retransmit the control signal to the vehicle. After transmitting an acknowledgement to the control center, the integrated vehicle system controller 1810 sends a directive to the device actuator 1855 (step 1922). If the actuator 1855 receives the directive (step 1924), the device actuator sends an acknowledgement back to the integrated vehicle system controller 1810 (step 1930). If the actuator does not receive the directive or if the acknowledgment is not received by the integrated vehicle system controller, the integrated vehicle system controller will attempt to retransmit the directive (step 1922) provided it has not already attempted to retransmit the directive (step 1926). If, after a second attempt, the actuator device does not receive the directive or an acknowledgement is not received back from the actuator device, the integrated vehicle system controller sends the signal back to the control center informing the control center that an acknowledgement had not been received (step 1928).

If the actuator device receives the directive and selectively sends the acknowledgement back to the integrated vehicle system controller, the actuator attempts to perform the directive (step 1938), and if successful (step 1940), the actuator sends a second acknowledgment signal back to the integrated vehicle system controller (step 1946). If the actuator device is unsuccessful in performing the directive, it will reattempt to perform it (step 1938) provided it is only the second attempt to do so (step 1942). If it is subsequently unsuccessful in performing the directed function, the actuator transmits a signal to the integrated vehicle system controller representative of this fact whereby the integrated vehicle system controller then sends a signal to the control center indicating that no acknowledgement has been received. If, following step 1946, the integrated vehicle system controller does not receive a second acknowledgement from the actuator that it performed its function (step 1948), the actuator will attempt to resend the acknowledgement to the integrated vehicle system controller in step 1946 provided it is only its second attempt to do so (step 1950). Again, if it is unsuccessful in transmitting this acknowledgment to the integrated vehicle system controller, the end user is informed that an error occurred in step 1952.

If the integrated vehicle system controller receives the second acknowledgement that the actuator device successfully performed the directed function, it sends the acknowledgement to the control center (step 1954). If the control center does not receive this acknowledgement signal (step 1956), the integrated vehicle system controller will again send the acknowledgement to the control center (step 1954) provided it is not its second attempt to do so (step 1958). If the control center does not receive an acknowledgement within a predetermined time period, it notifies the end user that an error has occurred (step 1960). On the other hand, if the control center receives this acknowledgement signal (step 1956), the control center sends an acknowledgement to the user (step 1962) which the user may then acknowledge receiving. If the user does not acknowledge receiving this acknowledgement (step 1964) the control center will resend the acknowledgement to the user provided as a first attempt to do so (step 1966), otherwise it may send an error signal to the user (step 1968).

8. Transceiver Wake-Up System

Vehicle communication systems such as that described above with reference to FIGS. 3, 5, and 57 and cellular telephones include transceivers that consume significant amounts of energy while in a standby mode. To conserve power, these transceivers may be shut down completely when the vehicle ignition is turned off. However, a party sending a paging message or making a call to the cellular telephone will not know whether the vehicle's ignition is on or off and will send the message regardless of whether the transceiver is capable of receiving the message. Thus, a trade-off exists between keeping the receiver in a standby mode at all times to receive all messages that are sent, or to turn off the receiver with the vehicle ignition to conserve energy and prevent undue drain on the vehicle's battery.

It is therefore an object of the present invention to provide a transceiver wake-up system that prevents the transceiver from unnecessarily consuming power when no one is in the vehicle to receive the message while operating in such a manner that any messages that originated during such period are not lost. Additional features and advantages of the present invention will be apparent from the following description.

To achieve these features and advantages, the transceiver wake-up system includes at least the microprocessor 26, vehicle bus interface 36, pager module 34, antenna 22, power supply 32, and bus 24 of the system shown in FIG. 3. As will be appreciated by those skilled in the art, the additional elements shown in FIG. 3 may also be included in this system. In operation, microprocessor 26 selectively connects and disconnects power supply 32 from pager module 34 depending upon the mode of operation. Specifically, a sleep mode is entered when microprocessor 26 determines that the vehicle ignition has been turned off for a predetermined time period or that all of the vehicle occupants have exited the vehicle and closed the doors. Alternatively, the sleep mode could also be entered when the vehicle alarm is activated. Microprocessor 26 would receive signals representing the occurrence of these events over the vehicle bus via vehicle bus interface 36.

In the sleep mode, microprocessor 26 disconnects power supply 32 from pager module 34 via any appropriate switching mechanism. Microprocessor 26 then monitors inputs received from vehicle bus interface 36 to determine whether one of the vehicle's door handles has been moved. If one of the vehicle's door handles has been moved, microprocessor 26 wakes up pager module 34 by supplying power from power supply 32 through the pager module 34. By keying upon these inputs, microprocessor 26 may disable the pager module when it is unlikely that there is anyone in the vehicle to receive a paging message while activating the pager module just prior to someone entering or attempting to enter the vehicle. Thus, any transmitted messages will be received and available to the vehicle occupant as the occupant enters the vehicle.

In the event a third party attempts to transmit a paging signal to the sleeping pager module 34, the pager transmitting station 19 (FIG. 1A) will initially attempt to transmit the paging signal while awaiting an acknowledgment signal from the two-way paging module 34. If such an acknowledgement signal is not received, transmitting station 19 will store the paging message for later retrieval and transmission to pager module 34. Subsequently, upon being woken up by microprocessor 26, pager module 34 transmits a signal to transmitting station 19 to inform it that the pager module 34 is now awake. Upon receiving such a signal, transmitting station 19 retrieves and transmits any stored messages to pager module 34.

In an alternative implementation, microprocessor 26 would instruct pager module 34 to transmit a paging signal to transmitting station 19 to inform transmitting station 19 that pager module 34 is about to enter a sleep mode prior to disrupting the power supply to pager module 34. Transmitting station 19 would then store all messages received until a paging message is subsequently received indicating that pager module 34 is no longer in a sleep mode. In the event that pager module 34 is not a two-way pager module and a cellular telephone is coupled in some manner to microprocessor 26, microprocessor 26 may cause the cellular telephone to call the transmitting station 19 to inform it when the paging receiver has entered and been awaken from a sleeping mode.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

APPENDIX A

GSC Paging Format

The GSC code format consists of a preamble, a start code, an address and one or more blocks of data. The blocks of data are transmitted at twice the bit rate as the start code and address.

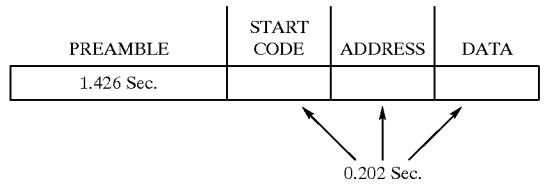

Preamble

The preamble begins with a comma which is 14 bits of a reversal pattern, alternating zeroes and ones. The comma is followed by 18 repetitions of the same 23-bit pattern. There exist 10 different bit patterns in use today. This divides the population of GSC receiving pagers into ten groups. If a pager detects the bit pattern of its group, it will continue to receive the address otherwise it will return to its low current mode. This way, the receiver need only sample often enough to assume that the preamble is detected and pages won't be missed.

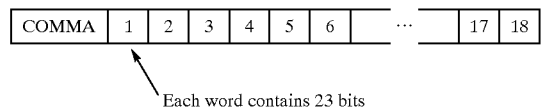

Start Code:

The start code marks the end of the preamble and signals that an address is to follow. It also provides timing information when pages are being sent in batches.

Address:

The start code and address begin with a comma followed by two 23-bit words. These bits are transmitted at 300 bits per second. The two words provide enough data to uniquely define 100,000 different addresses and correct errors in transmission.

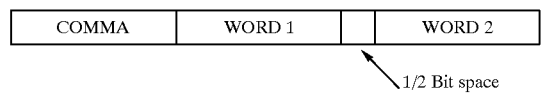

Word Format:

Each 23-bit word begins with 12 information bits followed by 11 parity bits. The parity bits are included to provide a way of detecting bit errors and correcting them. Eleven parity bits are sufficient to correct at most 3-bit errors per word.

WORD FORMAT:
| Information - 12 bits | Parity - 12 bits |
|---|---|

Data Block Format:

Each block of data begins with a half bit space followed by 8 words of 15 bits each. These bits are transmitted at 600 bits per second which is twice as fast as start code and address bits. The information in each word contains error detection and correction bits but only allows for upper case characters when sending alpha-numeric data.

POCSAG Paging Format:

The POCSAG code format consists of a preamble and one or more batches of data codewords. The batches are separated by a frame synchronization code.

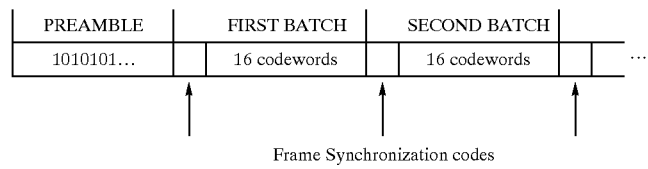

Preamble:

The preamble is 576 bits of a reversal pattern, alternating zeros and ones. It is included to alert the receiver that data is to follow. This way, the receiver need only sample often enough to assure that the preamble is detected and pages won't be missed.

Preamble:
| 10101010101 . . . for a total of 576 bits |
|---|

Frame Synchronization Code:

The frame synchronization (FS) code is a unique combination of 32 bits. The FS is used to identify the beginning of each batch of and to provide a starting point by which the frames of data within each batch can be counted.

Frame Synchronization Code (32 bits):
| 01111100110100100001010111101100 |
|---|

Batch:

Each batch of data begins with a FS and is followed by 8 frames of data. Each frame of data must contain 2 codewords. Each codeword is 32 bits long. If a page requires an odd number of codewords, an extra idle codeword is used to complete the frame. The idle codeword is a unique pattern like the FS.

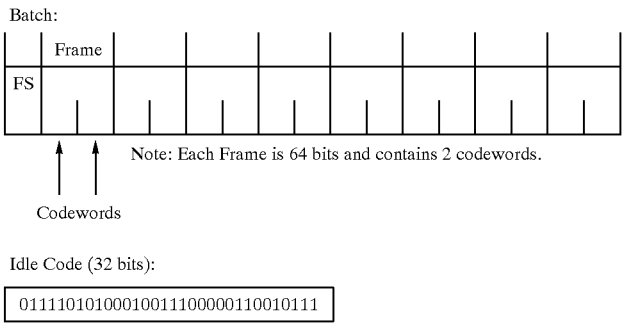

Note: Each Frame is 64 bits and contains 2 codewords.

Idle Code (32 bits):

| 01111010100010011100000110010111 |
|---|

Codeword Structure:

Each codeword is 32 bits in length. The first bit indicates the type of data that the codeword contains. A zero in the first bit indicates that the codeword contains address data. A one in the first bit indicates that the codeword contains message data. In each type of codeword, the data is in bits 2 through 21. Bits 22 through 32 are used as parity bits for error detection and correction algorithms.

Codeword Bit number:

| 1 | 2 through 19 | 20 | 21 | 22 through 31 | 32 |
|---|---|---|---|---|---|

Address Codeword:

| 0 | Address bits | Source Id | Parity bits | Even |
|---|---|---|---|---|

Message Codeword:

| 1 | Message bits | Parity bits | Even |
|---|---|---|---|

Address Codeword:

This codeword contains an address in bits 2 through 19 which makes this page specific to one pager within the population of pagers. Included in the 18-bit address are three bits which define the frame (0 through 7) in which the next codeword will be found. The next 2 bits 20 and 21, identify the source as being from one of four groups of sources within an area. The next 10 bits (22 through 31) are included for error detection and correction and the last bit (32) provides even parity.

Message Codeword:

This codeword contains a 20-bit message of any information in bits 2 through 21. The integrity of these information bits is protected by the error detection and correction routines as the address codewords above. The information bits contain alpha-numeric data encoded as 7-bit ASCII characters.

The invention claimed is:

1. A vehicle communication and control system comprising:
   a transceiver for sending and receiving RF signals including messages, location data, information requests, and control codes;
   a processor coupled to said transceiver for supplying messages, location data, information requests, and control codes to said transceiver for transmission from the vehicle, and for receiving and processing messages, location data, information requests, and control codes intended for the vehicle;
   a location identifying sensor coupled to said processor for supplying vehicle location data representing a current detected location of the vehicle;
   a user interface coupled to said processor for providing information to a user, and for enabling a user to input commands to be executed by said processor; and
   vehicle bus interface for coupling said processor to a vehicle bus to enable said processor to issue and receive commands and other information from vehicle accessories and components coupled to the vehicle bus,
   wherein said processor is adapted to:
      transmit an emergency message in response to a received command through said transceiver, the emergency message including the vehicle location data received from said location identifying sensor,
      transmit vehicle location data through said transceiver in response to a tracking request signal received by said transceiver,
      request and receive diagnostic data from a diagnostic database connected to the vehicle bus through said vehicle bus interface and transmit the received diagnostic data through said transceiver in response to a request for such diagnostic data,
      transmit a request for roadside assistance through said transceiver in response to a roadside assistance command, the request including the vehicle location data received from said location identifying sensor,
      transmit an accessory control signal through said vehicle bus interface to control a designated accessory connected to the vehicle bus in response to a command received from a remote source through said transceiver.

2. The system as defined in claim 1, wherein said transceiver includes a cellular transceiver for enabling two-way voice and data communication over a cellular network.

3. The system as defined in claim 2, wherein said user interface includes a speaker coupled to said cellular transceiver for enabling audio messages to be heard by a user.

4. The system as defined in claim 2, wherein said user interface includes a microphone coupled to said cellular transceiver to allow a user to communicate with a remote location.

5. The system as defined in claim 2 and further including audio recording means coupled to said processor and said cellular transceiver for digitizing, storing, and playing back audio messages received through said cellular transceiver.

6. The system as defined in claim 5, wherein said user interface includes a microphone for receiving audio messages from a user and recording received audio messages in said audio recording means.

7. The system as defined in claim 2 and fixer including a cellular modem coupled between said processor and said cellular transceiver.

8. The system as defined in claim 1 and further including audio recording means coupled to said processor for digitizing, storing, and playing back audio messages.

9. The system as defined in claim 8, wherein said user interface includes a microphone for receiving audio messages from a user and recording received audio messages in said audio recording means.

10. The system as defined in claim 9, wherein said user interface includes a dedicated user-actuated switch for commanding said audio recording means to begin recording an audio message received through said microphone.

11. The system as defined in claim 8, wherein said user interface includes a dedicated user-actuated switch for commanding said audio recording means to play back stored audio messages.

12. The system as defined in claim 1, wherein said user interface includes a speaker for enabling audio messages to be heard by a user.

13. The system as defined in claim 1 and further including a handset coupling port for coupling a telephone handset to said transceiver for making and receiving telephone calls through said transceiver.

14. The system as defined in claim 1, wherein said processor is further adapted to transmit a request for navigational routing instructions through said transceiver in response to a command received from said user interface, said request including a destination and the vehicle location data received from said location identifying sensor, and to generate and supply navigational routing instructions to said user interface for review by a user in response to the receipt of such navigational routing instructions through said transceiver.

15. The system as defined in claim 1 and further including an electronic compass coupled to said processor for generating vehicle heading data, wherein said processor supplies vehicle heading information to said user interface for output to a user.

16. A vehicle communication and control system comprising:
   a transceiver for sending and receiving RF signals including messages, location data, vehicle-identification data, information requests, and control codes;
   a processor coupled to said transceiver for supplying messages, location data, vehicle-identification data, information requests, and control codes to said transceiver for transmission from the vehicle, and for receiving and processing messages, location data, vehicle-identification data, information requests, and control codes intended for the vehicle;
   a location identifying sensor coupled to said processor for supplying vehicle location data representing a current detected location of the vehicle;
   memory means coupled to said processor for storing and supplying vehicle-identification data to said processor for transmission;
   a user interface coupled to said processor for providing information to a user, and for enabling a user to input commands to be executed by said processor, said user interface including a display coupled to said processor for displaying information to a user;
   an electronic compass system coupled to said processor for generating vehicle heading data, wherein said processor supplies vehicle heading information to said user interface for output to a user; and
   vehicle bus interface for coupling said processor to a vehicle bus to enable said processor to issue and receive commands and other information from vehicle accessories and components coupled to the vehicle bus, wherein said processor is adapted to:
   transmit an emergency message in response to a received command through said transceiver, the emergency message including the vehicle location data received from said location identifying sensor,
   transmit vehicle location data through said transceiver in response to a tracking request signal received by said transceiver,
   request and receive diagnostic data from a diagnostic database connected to the vehicle bus through said vehicle bus interface and transmit the received diagnostic data through said transceiver in response to a request for such diagnostic data,
   supply text messages that are received through said transceiver to said user interface for retrieval by a user,
   transmit text messages through said transceiver in response to commands received from said user interface,
   transmit a request for roadside assistance through said transceiver in response to a roadside assistance command, the request including the vehicle location data received from said location identifying sensor,
   transmit an accessory control signal through said vehicle bus interface to control a designated accessory connected to the vehicle bus in response to a command received from a remote source through said transceiver, and
   transmit vehicle-identification data stored in said memory means through said transceiver in response to a received command.

17. The system as defined in claim 16, wherein said transceiver includes a cellular transceiver for enabling two-way voice and data communication over a cellular network.

18. The system as defined in claim 17, wherein said user interface includes a speaker coupled to said cellular transceiver for enabling audio messages to be heard by a user.

19. The system as defined in claim 17, wherein said user interface includes a microphone coupled to said cellular transceiver to allow a user to communicate with a remote location.

20. The system as defined in claim 17 and further including audio recording means coupled to said processor and said cellular transceiver for digitizing, storing, and playing back audio messages received through said cellular transceiver.

21. The system as defined in claim 20, wherein said user interface includes a microphone for receiving audio messages from a user and recording received audio messages in said audio recording means.

22. The system as defined in claim 16 and further including audio recording means coupled to said processor for digitizing, storing, and playing back audio messages.

23. The system as defined in claim 22, wherein said user interface includes a microphone for receiving audio messages from a user and recording received audio messages in said audio recording means.

24. The system as defined in claim 23, wherein said user interface includes a dedicated user-actuated switch for commanding said audio recording means to begin recording an audio message received through said microphone.

25. The system as defined in claim 22, wherein said user interface includes a dedicated user-actuated switch for commanding said audio recording means to play back stored audio messages.

26. The system as defined in claim 16, wherein said user interface includes a speaker for enabling audio messages to be heard by a user.

27. The system as defined in claim 16 and further including a handset coupling port for coupling a telephone handset to said transceiver for making and receiving telephone calls through said transceiver.

28. The system as defined in claim 16, wherein said processor is further adatped to transmit a request for navigational routing instructions through said transceiver in response to a command received from said user interface, said request including a destination and the vehicle location data received from said location identifying sensor, and to generate and supply navigational routing instructions to said user interface for review by a user in response to the receipt of such navigational routing instructions through said transceiver.

* * * * *